(12) United States Patent
Rho et al.

(10) Patent No.: US 12,058,426 B2
(45) Date of Patent: Aug. 6, 2024

(54) CAMERA MODULE AND ELECTRONIC DEVICE INCLUDING THE SAME

(71) Applicant: SAMSUNG ELECTRONICS CO., LTD., Suwon-si (KR)

(72) Inventors: Hyungjin Rho, Suwon-si (KR); Kwangseok Byon, Suwon-si (KR); Bongchan Kim, Suwon-si (KR); Jaeheung Park, Suwon-si (KR); Hyosang An, Suwon-si (KR); Kihuk Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 134 days.

(21) Appl. No.: 17/678,941

(22) Filed: Feb. 23, 2022

(65) Prior Publication Data

US 2022/0272237 A1   Aug. 25, 2022

Related U.S. Application Data

(63) Continuation of application No. PCT/KR2022/002291, filed on Feb. 16, 2022.

(30) Foreign Application Priority Data

Feb. 23, 2021  (KR) .................. 10-2021-0024276
Aug. 9, 2021   (KR) .................. 10-2021-0104785

(51) Int. Cl.
*H04N 5/335*    (2011.01)
*H04N 23/51*    (2023.01)
(Continued)

(52) U.S. Cl.
CPC ............. *H04N 23/51* (2023.01); *H04N 23/54* (2023.01); *H04N 23/55* (2023.01); *G02B 27/646* (2013.01); *G03B 13/36* (2013.01)

(58) Field of Classification Search
CPC ....................................................... H04N 23/51
See application file for complete search history.

(56) References Cited

U.S. PATENT DOCUMENTS 8,818,181 B1   8/2014 Hwang et al.
9,438,801 B2   9/2016 Hwang et al.
(Continued)

FOREIGN PATENT DOCUMENTS

KR   10-2015-0138034    12/2015
KR   10-2016-0045382    4/2016
(Continued)

OTHER PUBLICATIONS

Extended European Search Report dated May 8, 2024 issued in European Patent Application No. 22759971.9.

*Primary Examiner* — Gary C Vieaux
(74) *Attorney, Agent, or Firm* — Nixon & Vanderhye, P.C.

(57) ABSTRACT

An electronic device according to an embodiment of the disclosure includes: a housing and a camera module, at least part of which is disposed in the housing. The camera module includes a camera housing, a sensor assembly including an image sensor and is fixed to the camera housing, and a lens unit, at least part of which is accommodated in a space formed by the camera housing and the sensor assembly, the lens unit being configured such that all or part of the lens unit moves relative to the camera housing and the sensor assembly. The lens unit includes a lens assembly including a lens, a first carrier to which the lens assembly is coupled, a second carrier in which the first carrier is accommodated to be movable in a direction perpendicular to an optical axis of the lens, a stopper coupled to the second carrier to cover at least part of the first carrier, and a first damper, at least part of which is disposed between the stopper and the first carrier.

16 Claims, 32 Drawing Sheets

(51) Int. Cl.
  *H04N 23/54* (2023.01)
  *H04N 23/55* (2023.01)
  *G02B 27/64* (2006.01)
  *G03B 13/36* (2021.01)

(56) References Cited

U.S. PATENT DOCUMENTS

| | | | |
|---|---|---|---|
| 9,578,242 B2 | 2/2017 | Kang et al. |
| 9,832,383 B2 | 11/2017 | Hwang et al. |
| 9,848,126 B2 | 12/2017 | Kang et al. |
| 9,854,144 B2 | 12/2017 | Park et al. |
| 10,425,563 B2 | 9/2019 | Park et al. |
| 10,656,375 B2 | 5/2020 | Kim et al. |
| 10,715,730 B1 | 7/2020 | Xu et al. |
| 10,747,013 B2 | 8/2020 | Lim |
| 11,044,388 B2 | 6/2021 | Park et al. |
| 11,119,333 B2 | 9/2021 | Miller et al. |
| 11,280,979 B2 | 3/2022 | Kim et al. |
| 11,330,182 B2 | 5/2022 | Xu et al. |
| 11,630,322 B2 | 4/2023 | Kim |
| 11,681,158 B2 | 6/2023 | Miller et al. |
| 2015/0296143 A1 | 10/2015 | Kang et al. |
| 2016/0353029 A1 | 12/2016 | Hwang et al. |
| 2020/0096782 A1 | 3/2020 | Miller et al. |
| 2020/0344417 A1 | 10/2020 | Xu et al. |
| 2020/0341291 A1 | 11/2020 | Lim |
| 2021/0281725 A1 | 9/2021 | Park et al. |
| 2022/0163089 A1 | 5/2022 | Kim |
| 2022/0264011 A1 | 8/2022 | Xu et al. |

FOREIGN PATENT DOCUMENTS

| | | |
|---|---|---|
| KR | 10-2017-0126165 | 11/2017 |
| KR | 10-2019-0110412 | 9/2019 |
| KR | 10-2020-0141416 | 12/2020 |
| KR | 10-2021-0009495 | 1/2021 |

CAMERA MODULE AND ELECTRONIC DEVICE INCLUDING THE SAME

CROSS-REFERENCE TO RELATED APPLICATIONS

This application is a continuation of International Application No. PCT/KR2022/002291 designating the United States, filed on Feb. 16, 2022, in the Korean Intellectual Property Receiving Office and claiming priority to Korean Patent Application No. 10-2021-0024276, filed on Feb. 23, 2021, in the Korean Intellectual Property Office and Korean Patent Application No. 10-2021-0104785, filed on Aug. 9, 2021, in the Korean Intellectual Property Office, the disclosures of all of which are incorporated by reference herein in their entireties.

BACKGROUND

Field

The disclosure relates to a camera module and an electronic device including the same.

Description of Related Art

A mobile electronic device, such as a smartphone, may include a camera module. The camera module may include lenses, a lens barrel surrounding the lenses, and an image sensor. The camera module may receive light reflected from an external subject. The light reflected from the subject may travel into the lens barrel, may pass through the lenses, and may travel to the image sensor. The image sensor may convert the received light signal into a related electrical signal.

The camera module may support various functions. For example, the camera module may support functions related to image stabilization (e.g., optical image stabilization (OIS), digital image stabilization (DIS), or electrical image stabilization (EIS)) and auto focus. The camera module may be configured to provide an image stabilization function and an auto focus function by moving the lenses relative to the image sensor. For example, the camera module may be configured to move the lenses in a direction perpendicular to the optical axis relative to the image sensor. The camera module may be configured to move the lenses in the direction of the optical axis relative to the image sensor.

For example, a lens shift type OIS structure that moves a lens may have a limitation in correction corresponding to large shake or hand shaking because a correction angle for correction of shake is limited to a specified angle (e.g., about 1.5°) or less. Furthermore, the camera module may have a limitation in reduction of high-frequency noise because the camera module does not include a separate damping member for reducing strong impact and/or large movement.

SUMMARY

Embodiments of the disclosure provide a camera module and an electronic device including the same, in which a damping member is disposed between a fixed structure having an image sensor disposed thereon and a movable structure having a lens disposed therein or is disposed inside the movable structure.

The technical problems addressed by the disclosure are not limited to the aforementioned problems, and any other technical problems not mentioned herein will be clearly understood from the following description by those skilled in the art to which the disclosure pertains.

An electronic device according to an example embodiment of the disclosure includes: a housing and a camera module comprising a camera, at least part of which is disposed in the housing. The camera module includes a camera housing, a sensor assembly including an image sensor and fixed to the camera housing, and a lens unit comprising at least one lens, at least part of which is accommodated in a space formed by the camera housing and the sensor assembly, the lens unit being configured to move in whole or in part relative to the camera housing and the sensor assembly. The lens unit including a lens assembly including a lens, a first carrier to which the lens assembly is coupled, a second carrier in which the first carrier is accommodated to be movable in a direction perpendicular to an optical axis of the lens, a stopper coupled to the second carrier covering at least part of the first carrier, and a first damping member comprising a vibration or shock absorbing material, at least part of which is disposed between the stopper and the first carrier.

A camera module according to an example embodiment of the disclosure includes a fixed structure including a camera housing and an image sensor fixed to the camera housing, a lens unit comprising at least one lens, at least part of which is accommodated in the camera housing, the lens unit being configured to move all or part relative to the fixed structure, and a driving member configured to move all or part of the lens unit and includes a plurality of coils disposed on the camera housing and a plurality of magnets disposed on the lens unit. The lens unit includes a lens assembly including a lens, an autofocus (AF) carrier disposed in the camera housing to be movable in a direction of an optical axis of the lens, and an optical image stabilization (OIS) carrier to which the lens assembly is coupled and that is disposed inside the AF carrier to be movable in a direction perpendicular to the optical axis. The plurality of coils include an AF coil disposed on a first sidewall of the camera housing and a plurality of OIS coils disposed on a second sidewall, a third sidewall, and a fourth sidewall of the camera housing, respectively. The plurality of magnets include an AF magnet disposed on the AF carrier to face the AF coil and a plurality of OIS magnets disposed on the OIS carrier to face the plurality of OIS coils, respectively. Each of the plurality of OIS magnets includes a first area in which a facing surface facing the plurality of OIS coils has a first polarity, a second area having a second polarity different from the first polarity, and a third area having the first polarity. Each of the plurality of OIS coils includes a first coil having one portion facing the first area and another portion facing the second area and a second coil having one portion facing the second area and another portion facing the third area.

In the electronic device according to the various example embodiments of the disclosure, the camera module may include the damping member, and thus a reduction in noise (e.g., vibration or shake in a high-frequency band) and alleviation and/or reduction of external shock may be achieved in an AF operation and an OIS operation of the camera module.

In the electronic device according to the various example embodiments of the disclosure, the OIS driving members of the camera module may be formed to be widely disposed in directions substantially perpendicular to the optical axis, and thus a driving force for improving an OIS correction angle may be secured without an increase in the height of the camera module.

In addition, the disclosure may provide various effects that are directly or indirectly recognized.

BRIEF DESCRIPTION OF THE DRAWINGS

The above and other aspects, features and advantages of certain embodiments of the present disclosure will be more apparent from the following detailed description, taken in conjunction with the accompanying drawings, in which.

In the following description made with respect to the accompanying drawings, similar components will be assigned with similar reference numerals.

DETAILED DESCRIPTION

Hereinafter, various example embodiments of the disclosure may be described with reference to accompanying drawings. Accordingly, those of ordinary skill in the art will recognize that modifications, equivalents, and/or alternatives on the various example embodiments described herein can be variously made without departing from the scope and spirit of the disclosure.

Figure 1:
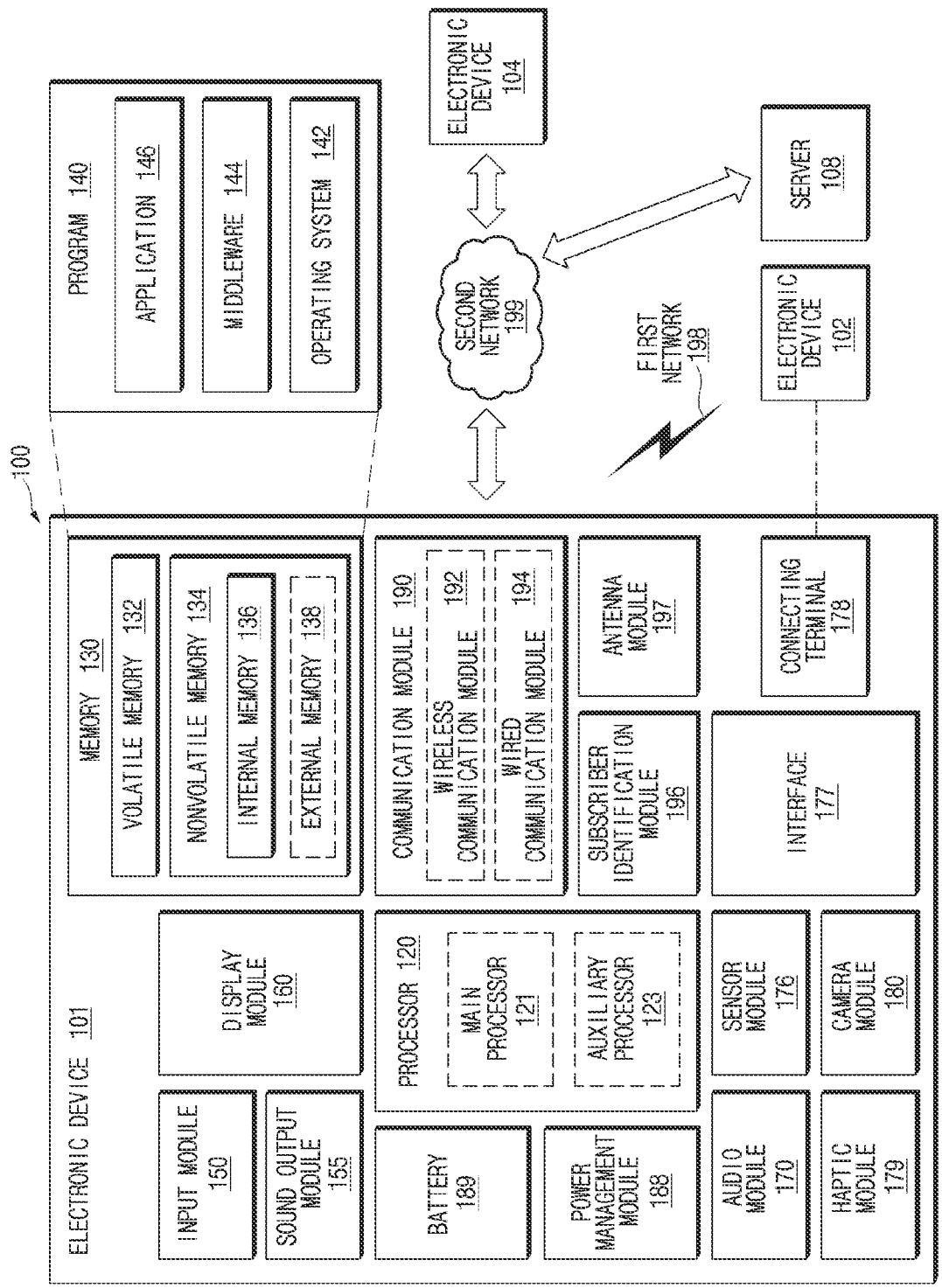
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
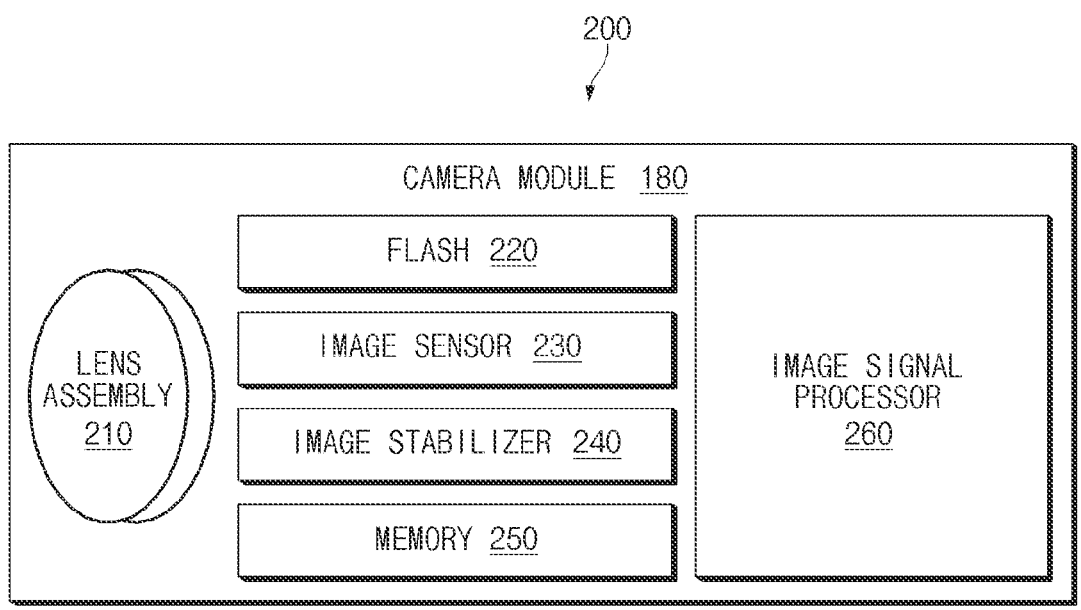
FIG. 2 is a block diagram illustrating an example configuration of a camera module according to various embodiments.

FIG. 2 is a block diagram 200 illustrating an example configuration of the camera module 180 according to various embodiments.

Referring to FIG. 2, the camera module 180 may include a lens assembly (e.g., including at least one lens) 210, a flash 220, an image sensor 230, an image stabilizer 240, memory 250 (e.g., buffer memory), and/or an image signal processor (e.g., including processing circuitry) 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer. The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display module 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display module 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display module 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may forma telephoto camera. Similarly, at least one of the plurality of camera modules 180 may form, for example, a front camera and at least another of the plurality of camera modules 180 may forma rear camera.

Figure 3A:
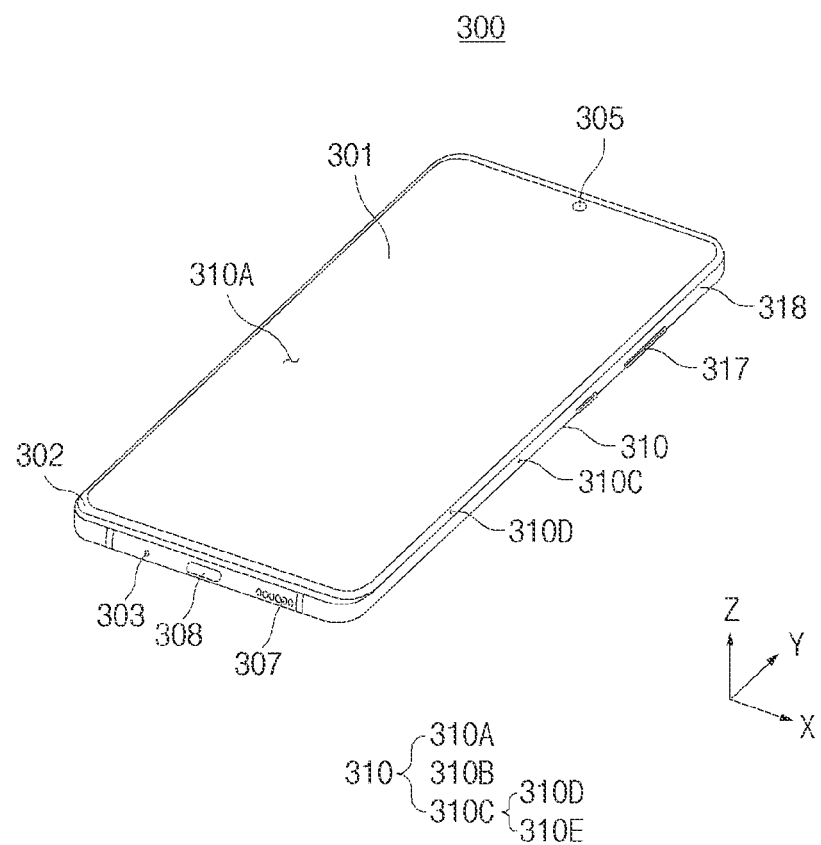
FIG. 3A is a front perspective view of an electronic device according to various embodiments.
Figure 3B:
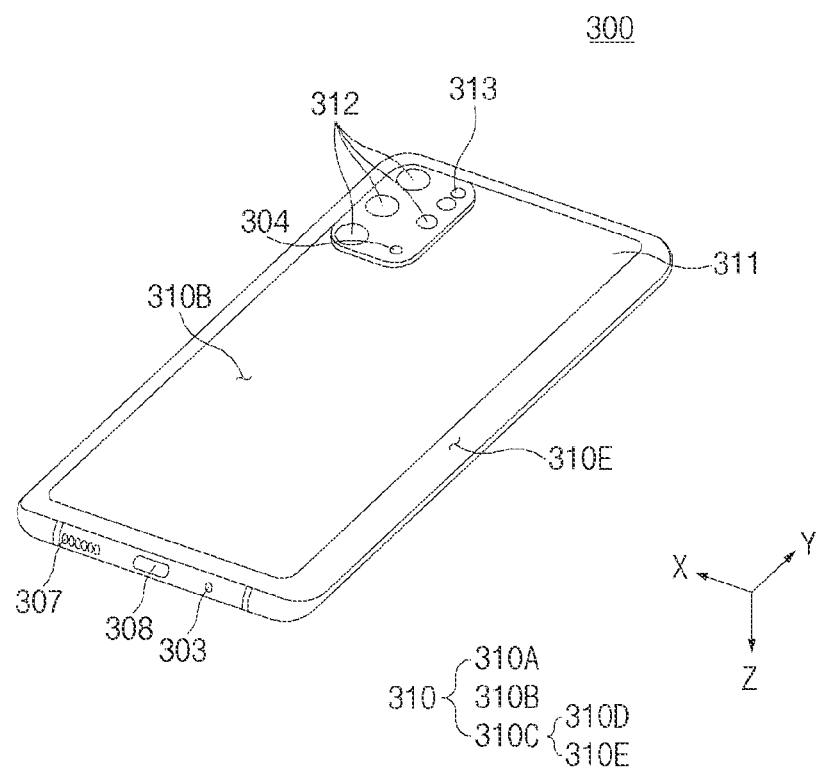
FIG. 3B is a rear perspective view of the electronic device according to various embodiments
Figure 3C:
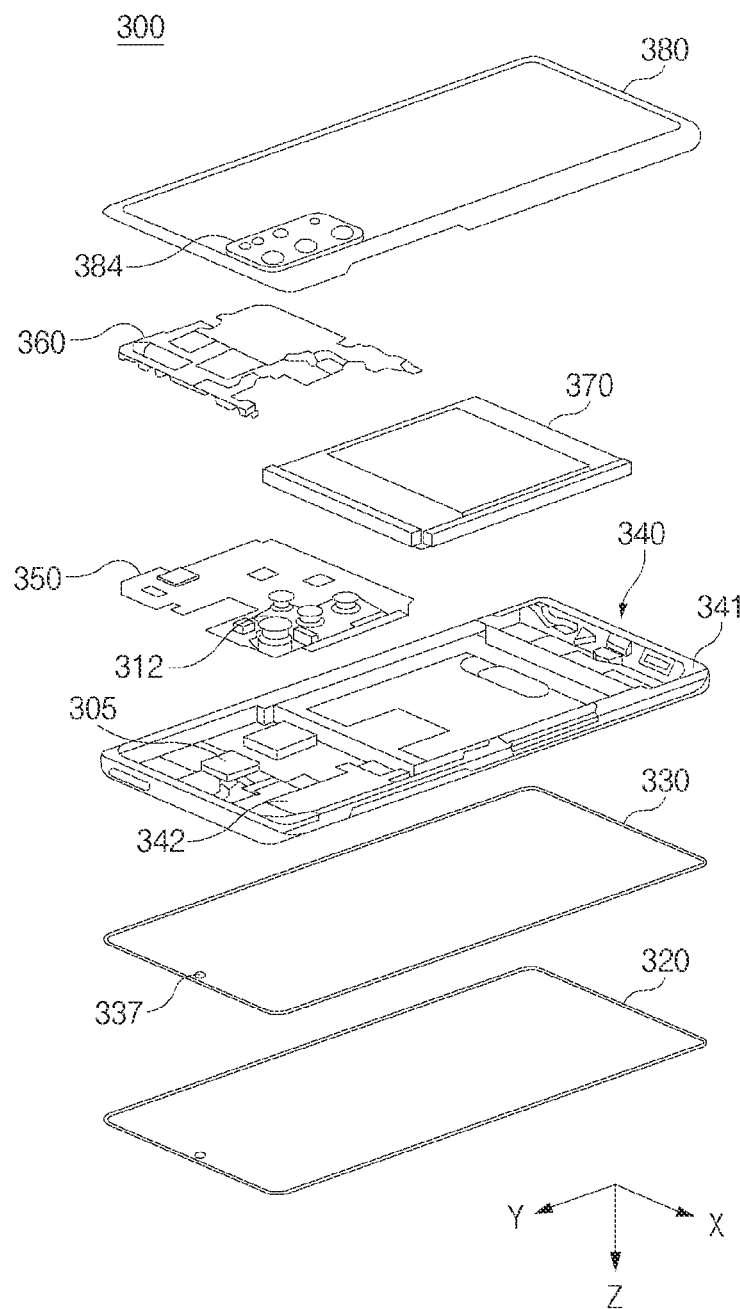
FIG. 3C is an exploded perspective view of the electronic device according to various embodiments.

FIG. 3A is a front perspective view of an electronic device according to various embodiments. FIG. 3B is a rear perspective view of the electronic device according to various embodiments. FIG. 3C is an exploded perspective view of the electronic device according to various embodiments.

Referring to FIGS. 3A and 3B, the electronic device 300 according to an embodiment (e.g., the electronic device 101 of FIG. 1) may include a housing 310 that includes a first surface (or, a front surface) 310A, a second surface (or, a rear surface) 310B, and a third surface (or, a side surface) 310C surrounding a space between the first surface 310A and the second surface 310B.

In an embodiment, the housing 310 may refer to a structure that forms some of the first surface 310A, the second surface 310B, and the third surface 310C.

In an embodiment, the first surface 310A may be formed by a front plate 302, at least a portion of which is substantially transparent (e.g., a glass plate including various coating layers, or a polymer plate). The second surface 310B may be formed by a back plate 311 that is substantially opaque. The back plate 311 may be formed of, for example, coated or colored glass, ceramic, polymer, metal (e.g., aluminum, stainless steel (STS), or magnesium), or a combination of at least two of the aforementioned materials. The third surface 310C may be formed by a side bezel structure (or, a side member) 318 that is coupled with the front plate 302 and the back plate 310 and that contains metal and/or polymer.

In an embodiment, the back plate 311 and the side bezel structure 318 may be integrally formed with each other and may contain the same material (e.g., a metallic material such as aluminum).

In the illustrated embodiment, the front plate 302 may include two first areas 310D that curvedly and seamlessly extend from partial areas of the first surface 310A toward the back plate 311. The first areas 310D may be located at opposite long edges of the front plate 302.

In the illustrated embodiment, the back plate 311 may include two second areas 310E that curvedly and seamlessly extend from partial areas of the second surface 310B toward the front plate 302. The second areas 310E may be located at opposite long edges of the back plate 311.

In an embodiment, the front plate 302 (or, the back plate 311) may include only one of the first areas 310D (or, the second areas 310E). Furthermore, in an embodiment, the front plate 302 (or, the back plate 311) may not include a part of the first areas 310D (or, the second areas 310E).

In an embodiment, when viewed from a side of the electronic device 300, the side bezel structure 318 may have a first thickness (or, width) at sides (e.g., short sides) not including the first areas 310D or the second areas 310E and may have a second thickness at sides (e.g., long sides) including the first areas 310D or the second areas 310E, the second thickness being smaller than the first thickness.

In an embodiment, the electronic device 300 may include at least one of a display 301 (e.g., the display module 160 of FIG. 1), audio modules 303, 304, 307 (e.g., the audio module 170 of FIG. 1), a sensor module (not illustrated) (e.g., the sensor module 176 of FIG. 1), camera modules 305, 312, and 313 (e.g., the camera module 180 of FIG. 1), key input devices 317 (e.g., the input module 150 of FIG. 1), a light emitting element (not illustrated), or a connector hole 308 (e.g., the connecting terminal 178 of FIG. 1). In an embodiment, the electronic device 300 may not include at least one component (e.g., the key input devices 317 or the light emitting element (not illustrated)) among the aforementioned components, or may additionally include other component(s).

In an embodiment, the display 301 may be visible (e.g., visually exposed) through most of the front plate 302. For example, at least part of the display 301 may be visually exposed through the front plate 302 that includes the first surface 310A and the first areas 310D of the third surface 310C. The display 301 may be disposed on the rear surface of the front plate 302.

In an embodiment, the periphery of the display 301 may be formed to be substantially the same as the shape of the adjacent outside edge of the front plate 302. In an embodiment, the gap between the outside edge of the display 301 and the outside edge of the front plate 302 may be substantially constant to expand the area by which the display 301 is visually exposed.

In an embodiment, a surface of the housing 310 (or, the front plate 302) may include a screen display area that is formed as the display 301 is visually exposed. For example, the screen display area may include the first surface 310A and the first areas 310D of the side surface.

In an embodiment, the screen display area 310A and 310D may include a sensing area (not illustrated) that is configured to obtain biometric information of a user. When the screen display area 310A and 310D includes the sensing area, this may refer, for example, to at least part of the sensing area overlapping the screen display area 310A and 310D. For example, the sensing area (not illustrated) may refer to an area capable of displaying visual information by the display 301 like other areas of the screen display area 310A and 310D and additionally obtaining biometric information (e.g., a fingerprint) of the user.

In an embodiment, the screen display area 310A and 310D of the display 301 may include an area through which the first camera module 305 (e.g., a punch hole camera) is visually exposed. For example, at least part of the periphery of the area through which the first camera module 305 is visually exposed may be surrounded by the screen display area 310A and 310D. In various embodiments, the first camera module 305 may include a plurality of camera modules (e.g., the camera module 180 of FIG. 1).

In various embodiments, the display 301 may be configured such that at least one of an audio module (not illustrated), a sensor module (not illustrated), a camera module (e.g., the first camera module 305), or a light emitting element (not illustrated) is disposed on the rear surface of the screen display area 310A and 310D. For example, the electronic device 300 may be configured such that the first camera module 305 (e.g., an under display camera (UDC)) is disposed on the rear side (e.g., the side facing the −z-axis direction) of the first surface 310A (e.g., the front surface) and/or the side surface 310C (e.g., at least one surface of the first areas 310D) so as to face toward the first surface 310A and/or the side surface 310C. For example, the first camera module 305 may be disposed under the display 301 and may not be visually exposed through the screen display area 310A and 310D. In an embodiment, an area of the display 301 that faces the first camera module 305 may be formed to be a transmissive area having a specified transmittance as part of an area that displays contents. For example, the transmissive area may have a transmittance of about 5% to about 50%. The transmissive area may include an area through which light for generating an image by being focused on an image sensor (e.g., an image sensor 230 of FIG. 2) passes and that overlaps an effective area (e.g., a field of view (FOV)) of the first camera module 305. For example, the transmissive area of the display 301 may include an area having a lower pixel density and/or wiring density than a surrounding area.

In an embodiment (not illustrated), the display 301 may be coupled with, or disposed adjacent to, touch detection circuitry, a pressure sensor capable of measuring the intensity (pressure) of a touch, and/or a digitizer that detects a stylus pen of a magnetic field type.

In an embodiment, the audio modules 303, 304, and 307 may include the microphone holes 303 and 304 and the speaker hole 307.

In an embodiment, the microphone holes 303 and 304 may include the first microphone hole 303 formed in a partial area of the third surface 310C and the second microphone hole 304 formed in a partial area of the second surface 310B. A microphone (not illustrated) for obtaining an external sound may be disposed in the microphone holes 303 and 304. The microphone may include a plurality of microphones to sense the direction of a sound.

In an embodiment, the second microphone hole 304 formed in the partial area of the second surface 310B may be disposed adjacent to the camera modules 305, 312, and 313. For example, the second microphone hole 304 may obtain sounds when the camera modules 305, 312, and 313 are executed, or may obtain sounds when other functions are executed.

In an embodiment, the speaker hole 307 may include an external speaker hole 307 and a receiver hole for telephone call (not illustrated). The external speaker hole 307 may be formed in a portion of the third surface 310C of the electronic device 300. In an embodiment, the external speaker hole 307 and the microphone hole 303 may be implemented as a single hole. Although not illustrated, the receiver hole for telephone call (not illustrated) may be formed in another portion of the third surface 310C. For example, the receiver hole for telephone call may be formed in another portion (e.g., a portion facing the +y-axis direction) of the third surface 310C that faces the portion (e.g., a portion facing the −y-axis direction) of the third surface 310C in which the external speaker hole 307 is formed. According to various embodiments, the receiver hole for telephone call may not be formed in a portion of the third surface 310C and may be formed by a separation space between the front plate 302 (or, the display 301) and the side bezel structure 318.

In an embodiment, the electronic device 300 may include at least one speaker (not illustrated) that is configured to output a sound outside the housing 310 through the external speaker hole 307 or the receiver hole for telephone call (not illustrated). According to various embodiments, the speaker may include a piezoelectric speaker not including the speaker hole 307.

In an embodiment, the sensor module (not illustrated) may generate an electrical signal or a data value that corresponds to an operational state inside the electronic device 300 or an environmental state external to the electronic device 300. For example, the sensor module may include at least one of a proximity sensor, an HRM sensor, a fingerprint sensor, a gesture sensor, a gyro sensor, an atmospheric pressure sensor, a magnetic sensor, an acceleration sensor, a grip sensor, a color sensor, an infrared (IR) sensor, a biosensor, a temperature sensor, a humidity sensor, or an illuminance sensor.

In an embodiment, the camera modules 305, 312, and 313 may include the first camera module 305 (e.g., a punch hole camera) exposed on the first surface 310A of the electronic device 300, the second camera module 312 exposed on the second surface 310B, and/or the flash 313.

In an embodiment, the first camera module 305 may be visually exposed through part of the screen display area 310A and 310D of the display 301. For example, the first camera module 305 may be visually exposed on a partial region of the screen display area 310A and 310D through an opening (not illustrated) that is formed in part of the display 301. In another example, the first camera module 305 (e.g., an under display camera) may be disposed on the rear surface of the display 301 and may not be visually exposed through the screen display area 310A and 310D.

In an embodiment, the second camera module 312 may include a plurality of cameras (e.g., a dual camera, a triple camera, or a quad camera). However, the second camera module 312 is not necessarily limited to including the plurality of cameras and may include one camera.

In an embodiment, the first camera module 305 and the second camera module 312 may include one or more lenses, an image sensor, and/or an image signal processor. The flash 313 may include, for example, a light emitting diode or a xenon lamp. In an embodiment, two or more lenses (an IR camera lens, a wide angle lens, and a telephoto lens) and image sensors may be disposed on one surface of the electronic device 300.

In an embodiment, the key input devices 317 may be disposed on the third surface 310C (e.g., the first areas 310D and/or the second areas 310E) of the housing 310. In an embodiment, the electronic device 300 may not include all or some of the key input devices 317, and the key input devices 317 not included may be implemented in a different form, such as a soft key, on the display 301. In an embodiment, the key input devices may include a sensor module (not illustrated) that forms the sensing area (not illustrated) that is included in the screen display area 310A and 310D.

In an embodiment, the connector hole 308 may accommodate a connector. The connector hole 308 may be disposed in the third surface 310C of the housing 310. For example, the connector hole 308 may be disposed in the third surface 310C so as to be adjacent to at least a part of the audio modules (e.g., the microphone hole 303 and the speaker hole 307). In an embodiment, the electronic device 300 may include the first connector hole 308 capable of accommodating a connector (e.g., a USB connector) for transmitting/receiving power and/or data with an external electronic device, and/or a second connector hole (not illustrated) capable of accommodating a connector (e.g., an earphone jack) for transmitting/receiving audio signals with an external electronic device.

In an embodiment, the electronic device 300 may include the light emitting element (not illustrated). For example, the light emitting element (not illustrated) may be disposed on the first surface 310A of the housing 310. The light emitting element (not illustrated) may provide state information of the electronic device 300 in the form of light. In an embodiment, the light emitting element (not illustrated) may provide a light source that operates in conjunction with operation of the first camera module 305. For example, the light emitting element (not illustrated) may include an LED, an IR LED, and/or a xenon lamp.

Referring to FIG. 3C, the electronic device 300 according to an embodiment may include a front plate 320 (e.g., the front plate 302 of FIG. 3A), a display 330 (e.g., the display 301 of FIG. 3A), a side member 340 (e.g., the side bezel structure 318 of FIG. 3A), a printed circuit board 350, a rear case 360, a battery 370, a back plate 380 (e.g., the back plate 311 of FIG. 3B), and an antenna (not illustrated).

In various embodiments, the electronic device 300 may not include at least one component (e.g., the rear case 360) among the aforementioned components, or may additionally include other component(s). Some of the components of the electronic device 300 illustrated in FIG. 3C may be identical or similar to some of the components of the electronic device 300 illustrated in FIG. 3B, and therefore repetitive descriptions may hereinafter not be included.

In an embodiment, the front plate 320 and the display 330 may be coupled to the side member 340. For example, the front plate 320 and the display 330 may be disposed under the side member 340 with respect to FIG. 3. The front plate 320 and the display 330 may be located in the +z-axis direction from the side member 340. For example, the display 330 may be coupled to the bottom of the side member 340, and the front plate 320 may be coupled to the bottom of the display 330. The front plate 320 may form part of the outer surface (or, the exterior) of the electronic device 300. The display 330 may be disposed between the front plate 320 and the side member 340 so as to be located inside the electronic device 300.

In an embodiment, the side member 340 may be disposed between the display 330 and the back plate 380. For example, the side member 340 may be configured to surround the space between the back plate 380 and the display 330.

In an embodiment, the side member 340 may include a frame structure 341 that forms part of the side surface (e.g., the third surface 310C of FIG. 3A) of the electronic device 300 and a plate structure 342 extending inward from the frame structure 341.

In an embodiment, the plate structure 342 may be disposed inside the frame structure 341 so as to be surrounded by the frame structure 341. The plate structure 342 may be connected with the frame structure 341, or may be integrally formed with the frame structure 341. The plate structure 342 may be formed of a metallic material and/or a nonmetallic (e.g., polymer) material. In an embodiment, the plate structure 342 may support other components included in the electronic device 300. For example, at least one of the display 330, the printed circuit board 350, the rear case 360, or the battery 370 may be disposed on the plate structure 342. For example, the display 330 may be coupled to one surface (e.g., the surface facing the +z-axis direction) of the plate structure 342, and the printed circuit board 350 may be coupled to an opposite surface (e.g., the surface facing the −z-axis direction) facing away from the one surface.

In an embodiment, the rear case 360 may be disposed between the back plate 380 and the plate structure 342. The rear case 360 may be coupled to the side member 340 so as to overlap at least part of the printed circuit board 350. For example, the rear case 360 may face the plate structure 342 with the printed circuit board 350 therebetween.

In an embodiment, a processor (e.g., the processor 120 of FIG. 1), a memory (e.g., the memory 130 of FIG. 1), and/or an interface (e.g., the interface 177 of FIG. 1) may be mounted on the printed circuit board 350. The processor may include, for example, one or more of a central processing unit, an application processor, a graphic processing unit, an image signal processor, a sensor hub processor, or a communication processor. The memory may include, for example, a volatile memory or a nonvolatile memory. The interface may include, for example, a high definition multimedia interface (HDMI), a universal serial bus (USB) interface, an SD card interface, and/or an audio interface. The interface may electrically or physically connect the electronic device 300 with an external electronic device and may include a USB connector, an SD card/MMC connector, or an audio connector.

In an embodiment, the battery 370 (e.g., the battery 189 of FIG. 1) may supply power to at least one component of the electronic device 300. For example, the battery 370 may include a primary cell that is not rechargeable, a secondary cell that is rechargeable, or a fuel cell. At least part of the battery 370 may be disposed on substantially the same plane as the printed circuit board 350. The battery 370 may be integrally disposed inside the electronic device 300, or may be disposed so as to be detachable from the electronic device 300.

In an embodiment, the antenna (not illustrated) (e.g., the antenna module 197 of FIG. 1) may be disposed between the back plate 380 and the battery 370. The antenna (not illustrated) may include, for example, a near field communication (NFC) antenna, a wireless charging antenna, and/or a magnetic secure transmission (MST) antenna. For example, the antenna (not illustrated) may perform short-range communication with an external device, or may wirelessly transmit and receive power required for charging.

In an embodiment, the first camera module 305 may be disposed on at least part (e.g., the plate structure 342) of the side member 340 such that a lens receives external light through a partial area of the front plate 320 (e.g., the front surface 310A of FIG. 3A). For example, the lens of the first camera module 305 may be visually exposed through a partial area (e.g., a camera area 337) of the front plate 320.

In an embodiment, the second camera module 312 may be disposed on the printed circuit board 350 such that a lens receives external light through a camera area 384 of the back plate 380 (e.g., the rear surface 310B of FIG. 3B) of the electronic device 300. For example, the lens of the second camera module 312 may be visually exposed through the camera area 384. In an embodiment, the second camera module 312 may be disposed in at least part of an inner space formed in the housing (e.g., the housing 310 of FIGS. 3A and 3B) of the electronic device 300 and may be electrically connected to the printed circuit board 350 through a connecting member (e.g., a connector).

In an embodiment, the camera area 384 may be formed in a surface (e.g., the rear surface 310B of FIG. 3B) of the back plate 380. In an embodiment, the camera area 384 may be formed to be at least partially transparent such that external light is incident on the lens of the second camera module 312. In an embodiment, at least part of the camera area 384 may protrude to a predetermined height from the surface of the back plate 380. However, without being necessarily limited thereto, the camera area 384 may form substantially the same plane as the surface of the back plate 380.

Figure 4:
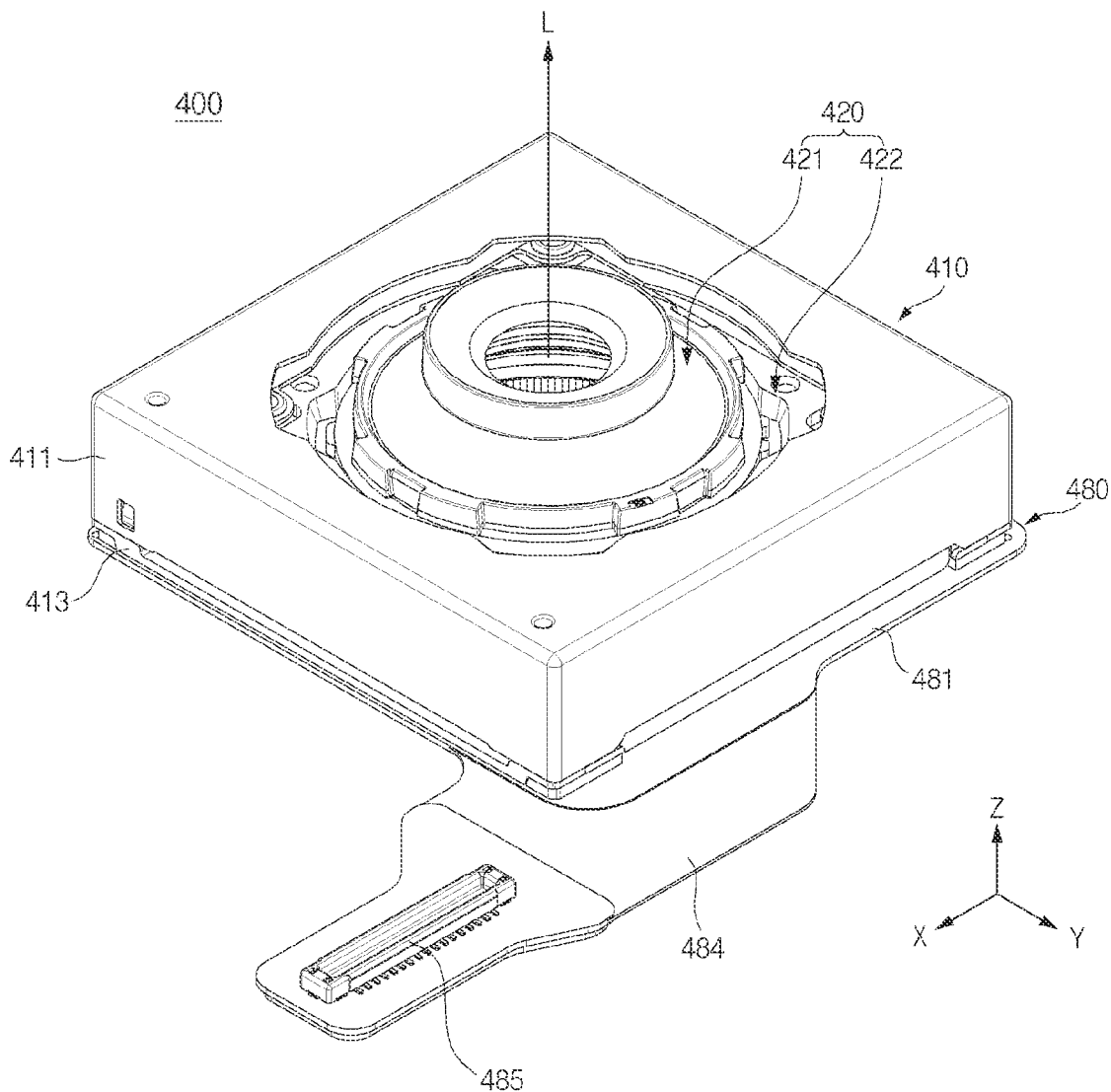
FIG. 4 is a perspective view of a camera module according to various embodiments.
Figure 5:
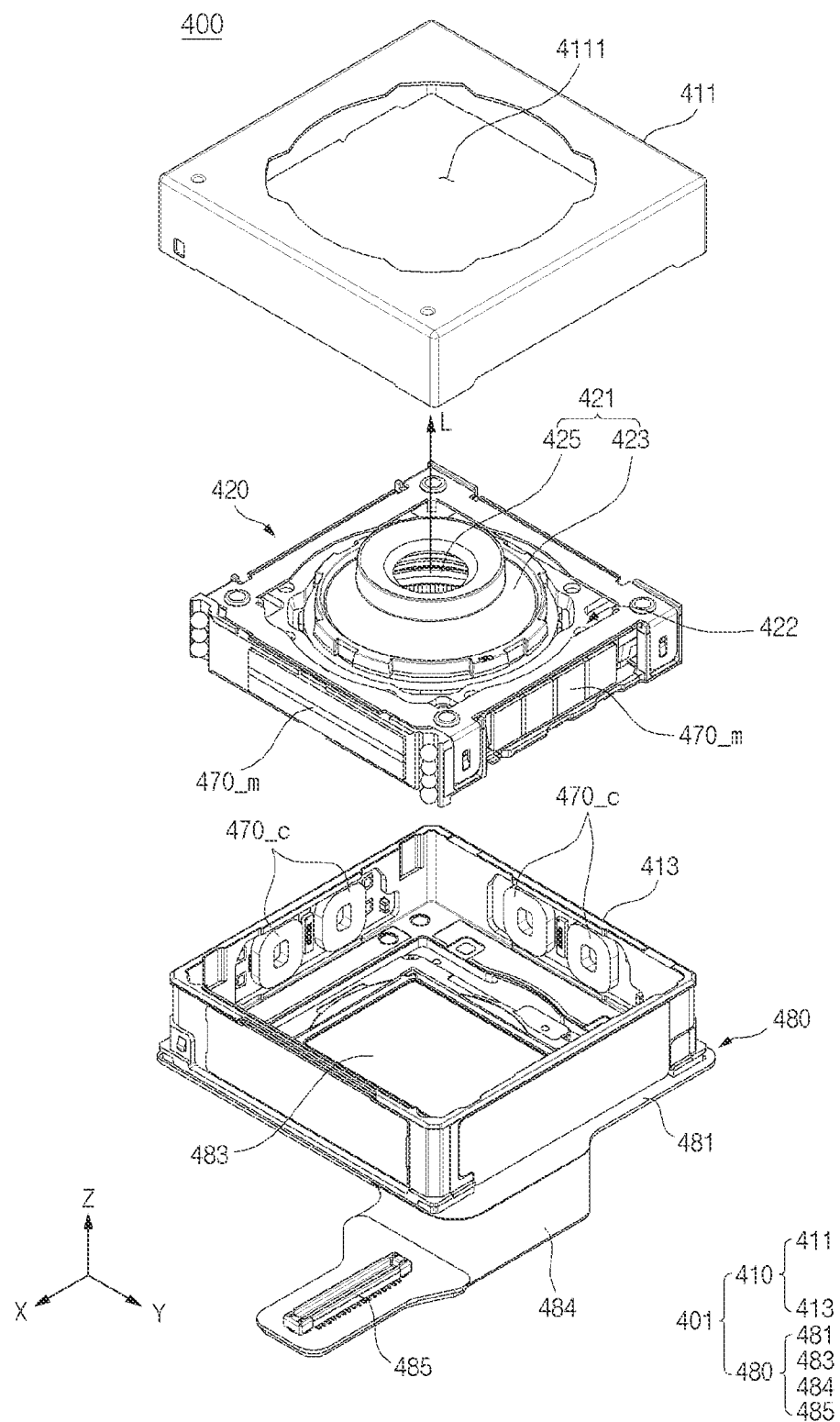
FIG. 5 is an exploded perspective view of the camera module according to various embodiments.

FIG. 4 is a perspective view of a camera module according to various embodiments. FIG. 5 is an exploded perspective view of the camera module according to various embodiments.

Referring to FIGS. 4 and 5, the camera module 400 according to an embodiment (e.g., the camera module 180 of FIGS. 1 and 2 or the camera module 305 or 312 of FIG. 3C) may include a camera housing 410, a lens unit (e.g., including at least one lens) 420, and a sensor assembly (e.g., including at least one sensor) 480 (e.g., the image sensor 230 of FIG. 2).

In an embodiment, the camera housing 410 may provide a receiving space in which at least part of the lens unit 420 is accommodated. The camera housing 410 may include a frame 413 and a cover 411 coupled with the frame 413. For example, at least part of the lens unit 420 may be accommodated in the frame 413, and the cover 411 may be coupled to the frame 413 to cover the frame 413 and at least part of the lens unit 420.

In an embodiment, the camera housing 410 may form at least part of the exterior or the outer surface of the camera module 400 together with the sensor assembly 480. The frame 413 may be fixedly disposed on one surface (e.g., the surface facing the +z-axis direction) of a substrate 481 of the sensor assembly 480, and the cover 411 may be coupled to the frame 413 to cover sidewalls of the frame 413. For example, the cover 411 may form an upper surface (e.g., the surface facing the +z-axis direction) and at least a part of side surfaces (e.g., the surfaces facing the x-axis and y-axis directions) of the camera module 400, and the sensor assembly 480 may form at least part of a lower surface (e.g., the surface facing the −z-axis direction) of the camera module 400. At least part of the frame 413 may be exposed outside the camera module 400 through between the cover 411 and the sensor assembly 480. The shapes of the cover 411 and the frame 413 are not limited to the illustrated embodiment.

In an embodiment, the cover 411 may have an opening 4111 formed therein through which at least part of a lens 425 is visually exposed outside the camera module 400. A plurality of coils 470_c that provide a driving force to move the lens unit 420 may be disposed on the frame 413. For example, the plurality of coils 470_c may generate the driving force by electro-magnetically interacting with a plurality of magnets 470_m disposed on the lens unit 420.

In an embodiment, at least part of the lens unit 420 may be accommodated in the camera housing 410. The lens unit 420 may be configured to move in the camera housing 410. For example, the lens unit 420 may be movable in one or more directions with respect to the camera housing 410 and the sensor assembly 480 fixed relative to each other. In various embodiments, the camera module 400 may move the entire lens unit 420 in the direction of an optical axis L of the lens 425 for an auto focus function (e.g., an AF operation) and may move at least part of the lens unit 420 in a direction substantially perpendicular to the optical axis L for an image stabilization function (e.g., an OIS operation).

In an embodiment, the lens unit 420 may include a lens assembly 421 (e.g., the lens assembly 210 of FIG. 2) and a lens carrier 422. For example, the lens unit 420 may be understood as a lens structure or a lens moving unit that includes at least one lens 425 and components (e.g., a carrier) for a movement of the lens 425. The lens assembly 421 may include at least one lens 425 and a lens barrel 423 surrounding the lens 425. The lens assembly 421 may be disposed in the lens carrier 422. The lens carrier 422 may move the lens assembly 421 in the direction of the optical axis L of the lens 425, or may move the lens assembly 421 in a direction substantially perpendicular to the optical axis L. The lens carrier 422 may be configured to partially move together with the lens assembly 421 or separate from the movement of the lens assembly 421 in response to the movement direction of the lens assembly 421. A specific structure of the lens carrier 422 will be described in greater detail below with reference to FIGS. 9A and 9B.

In an embodiment, the plurality of magnets 470_m that provide a driving force to move the lens unit 420 may be disposed on the lens carrier 422. For example, the plurality of magnets 470_m may generate the driving force by electro-magnetically interacting with the plurality of coils 470_c disposed on the camera housing 410 (e.g., the frame 413).

In an embodiment, the lens unit 420 may be disposed in the camera housing 410 such that at least part of the lens assembly 421 is exposed through the opening 4111 formed in the cover 411 of the camera housing 410. The lens 425 of the lens assembly 421 may be visible through the opening 4111 and may receive light from outside the camera housing 410. For example, the lens 425 may be configured to receive light from outside the electronic device through a partial area (e.g., the camera area 384 of FIG. 3C) of the surface of the housing (e.g., the housing 310 of FIGS. 3A and 3B) of the electronic device (e.g., the electronic device 300 of FIGS. 3A to 3C).

In an embodiment, the sensor assembly 480 may include the substrate 481, and an infrared filter 483 and an image sensor (e.g., an image sensor 482 of FIGS. 6A, 6B, 7A, and 7B) that are disposed on the substrate 481. The sensor assembly 480 may be fixedly disposed on the camera housing 410 as the substrate 481 is coupled with the frame 413. For example, when the lens unit 420 moves, the sensor assembly 480 may be fixed to the camera housing 410, and the relative positions between the sensor assembly 480 and the lens unit 420 may be changed.

In an embodiment, the sensor assembly 480 may further include a connecting member 484 electrically connected with the substrate 481. The connecting member 484 may extend from the substrate 481. The connecting member 484 may electrically connect electrical components (e.g., the substrate 481 or the plurality of coils 470_c) included in the camera module 400 with the main board (e.g., the printed circuit board 350 of FIG. 3C) of the electronic device 300. A connector 485 coupled to the main board 350 may be disposed on the connecting member 484. In various embodiments, the connecting member 484 may include a flexible printed circuit board (FPCB).

The camera module 400 according to embodiments of the disclosure may be a structure including a fixed unit (or, a fixed structure) 401 that is fixed to the inside of the housing 310 of the electronic device 300 and a movable unit (or, a movable structure) that is movable relative to the fixed unit 401. For example, the movable unit may be configured such that at least part thereof is disposed in the fixed unit 401 and moves relative to the fixed unit 401. The fixed unit 401 may include the camera housing 410 and the sensor assembly 480, and the movable unit may include the lens assembly 421 and the lens carrier 422. For example, the movable unit may be referred to as the lens unit 420. The camera module 400 may perform an auto focus (AF) function and an optical image stabilization (OIS) function by moving all or part of the movable unit relative to the fixed unit 401.

Figure 6A:
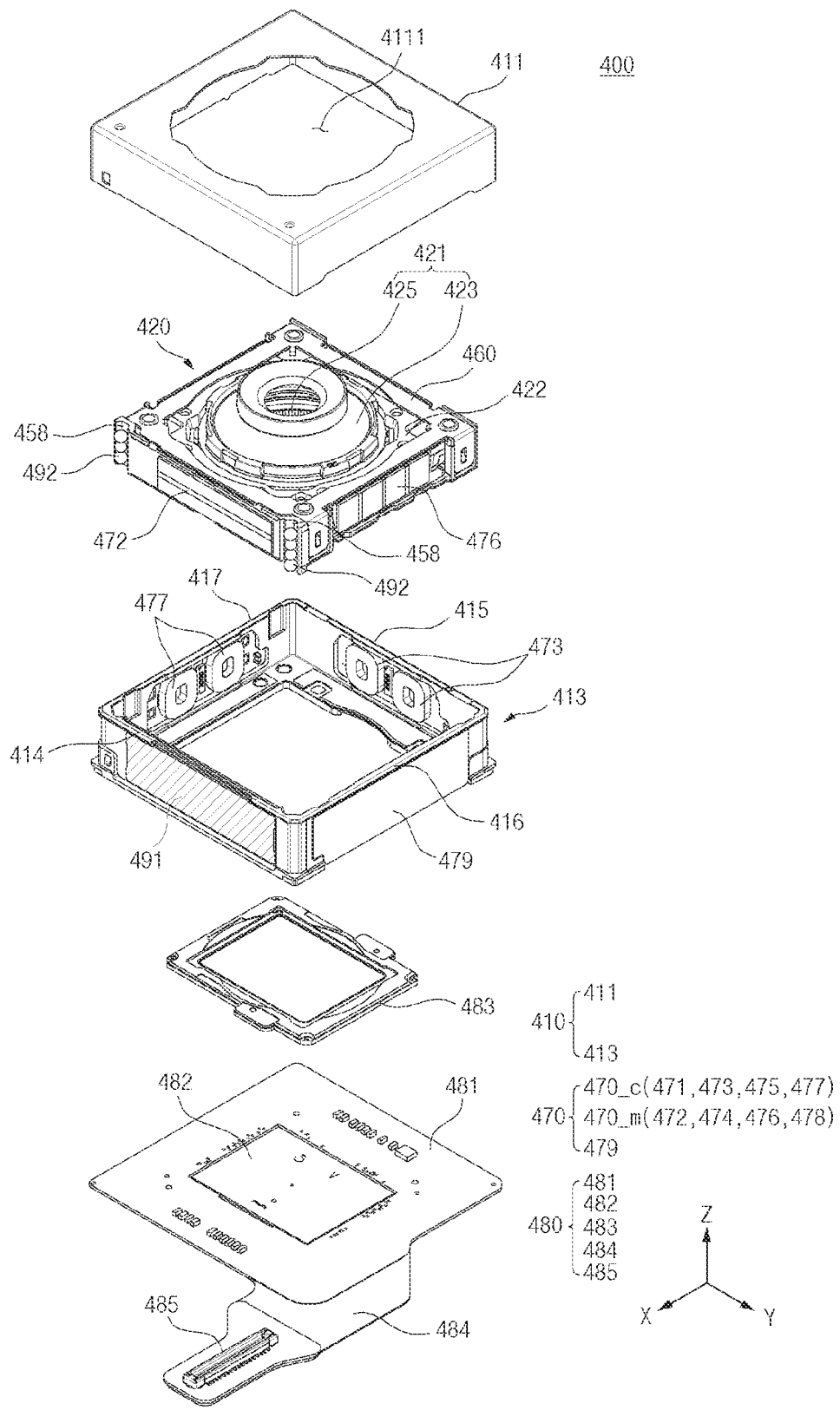
FIG. 6A is an exploded perspective view of the camera module according to various embodiments.
Figure 6B:
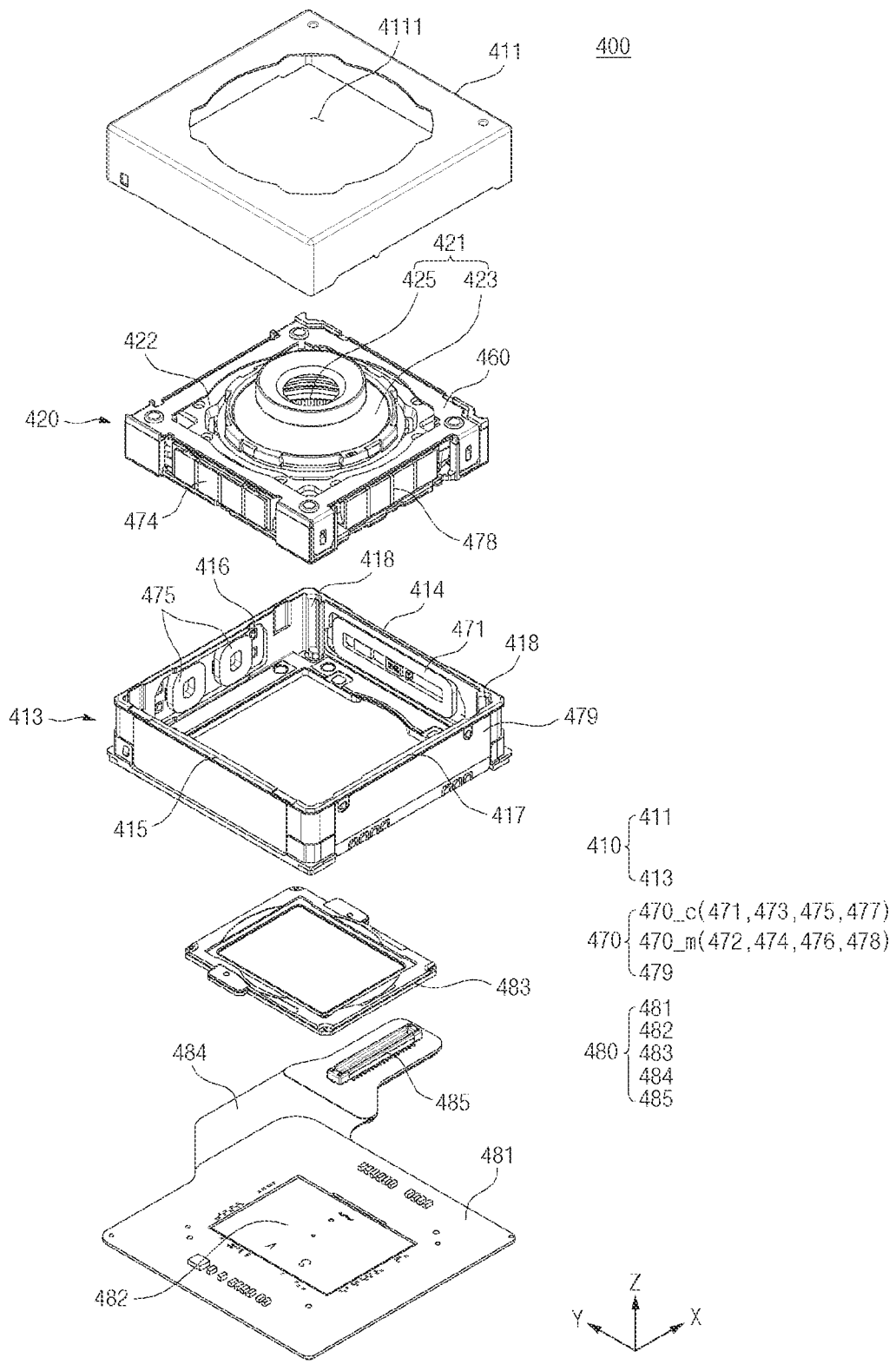
FIG. 6B is an exploded perspective view of the camera module according to various embodiments.

FIG. 6A is an exploded perspective view of the camera module according to various embodiments. FIG. 6B is an exploded perspective view of the camera module according to various embodiments.

Referring to FIGS. 6A and 6B, the camera module 400 according to an embodiment may include the camera housing 410, the lens unit 420, the sensor assembly 480, and a driving member 470.

Some of the components of the camera module 400 illustrated in FIGS. 6A and 6B may be identical or similar to some of the components of the camera module 400 illustrated in FIGS. 4 and 5, and therefore repetitive descriptions may not be provided.

In an embodiment, the camera housing 410 may include the cover 411 and the frame 413. The cover 411 and the frame 413 may form a predetermined space in which the lens unit 420 is disposed. The opening 4111 aligned with the lens assembly 421 in the direction of the optical axis L may be formed in the cover 411. The frame 413 may surround the lens unit 420 and may be fixedly disposed on the substrate 481 of the sensor assembly 480. For example, to enable light passing through the lens 425 of the lens assembly 421 to be incident on the image sensor 482, the frame 413 may be formed in a shape in which the bottom surface (e.g., the surface facing the −z-axis direction) is open.

In an embodiment, the frame 413 may include a plurality of sidewalls 414, 415, 416, and 417 surrounding side surfaces of the lens unit 420. The plurality of sidewalls 414, 415, 416, and 417 of the frame 413 may be surrounded by a flexible circuit board 479. The plurality of coils 470_c disposed on the flexible circuit board 479 may be located in the plurality of sidewalls 414, 415, 416, and 417 of the frame 413.

In an embodiment, the plurality of sidewalls 414, 415, 416, and 417 may include the first sidewall 414 in which an AF coil 471 is disposed, the second sidewall 415 in which a first OIS coil 473 is disposed, the third sidewall 416 in which a second OIS coil 475 is disposed, and the fourth sidewall 417 in which a third OIS coil 477 is disposed. For example, the first sidewall 414 and the second sidewall 415 may face each other, and the third sidewall 416 and the fourth sidewall 417 may connect the first sidewall 414 and the second sidewall 415 and may face each other. Based on FIGS. 6A and 6B, the first sidewall 414 may face the +x-axis direction, the second sidewall 415 may face the −x-axis direction, the third sidewall 416 may face the +y-axis direction, and the fourth sidewall 417 may face the −y-axis direction.

In an embodiment, the lens unit 420 may be configured such that all or part of the lens unit 420 moves in the space formed by the camera housing 410 and the sensor assembly 480.

In an embodiment, the lens unit 420 may include the lens assembly 421, the lens carrier 422, and a stopper 460. The lens assembly 421 may include the lens barrel 423 and the at least one lens 425 disposed in the lens barrel 423. The lens barrel 423 may be formed to surround the lens 425.

In an embodiment, at least part of the lens assembly 421 may be surrounded by the lens carrier 422. The lens assembly 421 may be fixedly disposed in a component (e.g., a first carrier 430 of FIGS. 9A and 9B) of the lens carrier 422. For example, the lens barrel 423 of the lens assembly 421 may be coupled to, or mounted on, a component of the lens carrier 422.

In an embodiment, the stopper 460 may be coupled to the lens carrier 422. For example, the stopper 460 may be fixedly coupled to a component (e.g., a second carrier 450 of FIGS. 9A and 9B) of the lens carrier 422. The stopper 460 may include an upper surface, part of which is open such that at least part of the lens assembly 421 passes therethrough. For example, the stopper 460 may have, in the upper surface thereof, an opening in which the lens assembly 421 is located.

In an embodiment, the plurality of magnets 470_$m$ may be disposed on the lens carrier 422 of the lens unit 420. For example, an AF magnet 472 facing the AF coil 471, a first OIS magnet 474 facing the first OIS coil 473, a second OIS magnet 476 facing the second OIS coil 475, and a third OIS magnet 478 facing the third OIS coil 477 may be disposed on the lens carrier 422. Based on the drawings, the AF magnet 472 may be disposed on the side surface of the lens unit 420 that faces the +x-axis direction, the first OIS magnet 474 may be disposed on the side surface of the lens unit 420 that faces the −x-axis direction, the second OIS magnet 476 may be disposed on the side surface of the lens unit 420 that faces the +y-axis direction, and the third OIS magnet 478 may be disposed on the side surface of the lens unit 420 that faces the −y-axis direction.

In an embodiment, the lens unit 420 may move in the direction of the optical axis L in the camera housing 410. The camera module 400 may perform an auto focus function by moving the lens unit 420 in the direction of the optical axis L. For example, the lens unit 420 may move in a +L/−L direction with respect to the optical axis L by an interaction between the AF coil 471 and the AF magnet 472. When the auto focus function is performed, the entire lens unit 420 may move relative to the camera housing 410 and the sensor assembly 480. Accordingly, the distance between the lens 425 and the image sensor 482 in the direction of the optical axis L may vary. The camera module 400 may adjust a focal length by moving the lens carrier 422.

In an embodiment, the lens unit 420 may include a first ball 492 disposed between a side surface (e.g., the surface facing the +x-axis direction) of the lens carrier 422 and the frame 413. For example, a plurality of first balls 492 may be formed. The first ball 492 may be configured to roll between the lens carrier 422 and the frame 413 when the lens carrier 422 moves in the direction of the optical axis L. In the case where the plurality of first balls 492 are formed, the first balls 492 may be arranged in the direction of the optical axis L.

In an embodiment, a first recess 458 in which at least part of the first ball 492 is accommodated may be formed on the side surface (e.g., the surface facing the +x-axis direction) of the lens carrier 422 on which the AF magnet 472 is disposed. The first recess 458 may be formed in a shape extending in the direction of the optical axis L. A second recess 418 facing the first recess 458 may be formed on the frame 413. For example, the second recess 418 facing the first recess 458 may be formed on the inside of the first sidewall 414 in which the AF coil 471 is disposed. The second recess 418 may extend in the direction of the optical axis L and may form, together with the first recess 458, a space in which the first ball 492 is accommodated.

In an embodiment, the first ball 492 may be configured to roll in the space between the first recess 458 and the second recess 418. For example, when the lens unit 420 (e.g., the lens carrier 422) moves in the direction of the optical axis L, the first ball 492 may rotate while linearly moving in the direction of the optical axis L, or may rotate in position, between the first recess 458 and the second recess 418.

In an embodiment, a predetermined magnetic attractive force may act between the side surface of the lens carrier 422 on which the AF magnet 472 is disposed and the first sidewall 414 in which the AF coil 471 is disposed. A yoke 491 may be disposed on a portion of the flexible circuit board 479, on which the AF coil 471 is disposed, so as to face away from the AF coil 471. For example, the AF coil 471 may be disposed to face the AF magnet 472 with the portion of the flexible circuit board 479 and the AF coil 471 therebetween. The yoke 491 may form an attractive force with the AF magnet 472.

Accordingly, the attractive force may act between the first sidewall 414 on which the yoke 491 is disposed and the side surface (e.g., the surface facing the +x-axis direction) of the lens carrier 422 on which the AF magnet 472 is disposed, but the first sidewall 414 and the side surface of the lens carrier 422 may remain spaced apart from each other at a specified interval by the first ball 492. When the lens carrier 422 is moved in the direction of the optical axis L relative to the frame 413 by the attractive force, the first ball 492 may rotate in the state of being brought into close contact with the first recess 458 and the second recess 418.

According to embodiments of the disclosure, when an auto focus function is performed, the entire lens unit 420 may move in the direction of the optical axis L relative to the fixed unit 401 (e.g., the camera housing 410 and the sensor assembly 480). When an image stabilization function is performed, some components (e.g., the first carrier 430 or a guide member 440 of FIGS. 9A and 9B) of the lens carrier 422 and the lens assembly 421 may move in a direction substantially perpendicular to the optical axis L relative to the fixed unit 401. For example, the lens unit 420 may be configured such that when the image stabilization function is performed, some components of the lens carrier 422 move in a direction substantially perpendicular to the optical axis L relative to the remaining components. A movement operation of the lens unit 420 in an image stabilization operation will be described in greater detail below with reference to FIG. 11.

In an embodiment, the sensor assembly 480 may include the substrate 481, the image sensor 482, and the infrared filter (IR filter) 483. The sensor assembly 480 may be disposed on the bottom of the frame 413 such that the image sensor 482 is aligned with the optical axis L of the lens 425. The sensor assembly 480 may be fixed to the camera housing 410. For example, the frame 413 may be fixedly disposed on the upper surface (e.g., the surface facing the +z-axis direction) of the substrate 481 of the sensor assembly 480. The image sensor 482 and the infrared filter 483 of the sensor assembly 480 may be aligned with the lens assembly 421 in the direction of the optical axis L under the lens unit 420. In various embodiments, the sensor assembly 480, together with the camera housing 410, may comprise the fixed unit 401 relatively fixed with respect to a movement of the lens unit 420.

In an embodiment, the image sensor 482 may be disposed on the upper surface of the substrate 481 so as to be partially aligned with the optical axis L. The image sensor 482 may be electrically connected with the substrate 481. For example, the image sensor 482 may be mounted on the upper surface of the substrate 481. The image sensor 482 may be configured to receive light passing through the lens 425 and generate an electrical signal based on the received light signal.

In an embodiment, the position of the image sensor 482 relative to the lens assembly 421 may be changed in response to a movement of the lens unit 420 as the image sensor 482 is fixed to the camera housing 410. For example, in an AF operation, the position of the image sensor 482 relative to the lens assembly 421 in the direction of the optical axis L may be changed. For example, in an OIS operation, the position of the image sensor 482 relative to the lens assembly 421 in a direction substantially perpendicular to the optical axis L may be changed.

In an embodiment, the infrared filter 483 may be disposed between the image sensor 482 and the lens unit 420 (e.g., the lens assembly 421). For example, the infrared filter 483 may be aligned with the image sensor 482 and the lens assembly 421 in the direction of the optical axis L. The infrared filter 483 may be configured to block light in the infrared range that is incident on the image sensor 482. For example, the infrared filter 483 may include a reflection type infrared filter that reflects infrared light and an absorption type infrared filter that absorbs infrared light.

In an embodiment, the driving member 470 may include the flexible circuit board 479, the plurality of coils 470_c, and the plurality of magnets 470_m. The plurality of coils 470_c may include the AF coil 471 and the OIS coils 473, 475, and 477, and the plurality of magnets 470_m may include the AF magnet 472 and the OIS magnets 474, 476, and 478.

In an embodiment, the plurality of coils 470_c may be disposed on the flexible circuit board 479. The flexible circuit board 479 may surround at least part of the frame 413 such that the AF coil 471 is disposed in the first sidewall 414 of the frame 413, the first OIS coil 473 is disposed in the second sidewall 415 of the frame 413, the second OIS coil 475 is disposed in the third sidewall 416 of the frame 413, and the third OIS coil 477 is disposed in the third sidewall 417 of the frame 413.

In an embodiment, the flexible circuit board 479 may be electrically connected with the substrate 481 of the sensor assembly 480. For example, the plurality of coils 470_c may be electrically connected with the main board (e.g., the printed circuit board 350 of FIG. 3C) of the electronic device 300 through the flexible circuit board 479 and the substrate 481. For example, the flexible circuit board 479 may be formed to be partially flexible. The flexible circuit board 479 may include a flexible printed circuit board (FPCB). An electrical connecting structure of the flexible circuit board 479 and the substrate 481 will be described in greater detail below with reference to FIGS. 7A and 7B.

In an embodiment, the plurality of coils 470_c may face the plurality of magnets 470_m disposed on the lens unit 420. For example, the AF coil 471 may face the AF magnet 472, the first OIS coil 473 may face the first OIS magnet 474, the second OIS coil 475 may face the second OIS magnet 476, and the third OIS coil 477 may face the third OIS magnet 478. The plurality of coils 470_c and the plurality of magnets 470_m corresponding thereto may electro-magnetically interact with each other to provide a driving force to move all or part of the lens unit 420. For example, the AF coil 471 and the AF magnet 472 may generate a driving force to move the entire lens unit 420 in the direction of the optical axis L. Based on FIGS. 6A and 6B, the first OIS coil 473 and the first OIS magnet 474 may generate a driving force to move part of the lens unit 420 in the +y/−y-axis direction. The second OIS coil 475, the third OIS coil 477, the second OIS magnet 476, and the third OIS magnet 478 may generate a driving force to move part of the lens unit 420 in the +x/−x-axis direction.

In an embodiment, an electrical signal may be applied to the plurality of coils 470_c. For example, the electrical signal may be applied from the main board 350 of the electronic device 300 through the connecting member 484, the substrate 481, and the flexible circuit board 479. In various embodiments, the processor of the electronic device 300 (e.g., the processor 120 of FIG. 1) may control the direction and/or strength of an electric current passing through the plurality of coils 470_c. An electromagnetic force (e.g., Lorentz force) may be applied to the plurality of magnets 470_m corresponding to the plurality of coils 470_c to correspond to the direction of the electric current passing through the plurality of coils 470_c. For example, when an electric current flows through the AF coil 471, an electromagnetic force may be applied to the AF magnet 472. When an electric current flows through the first OIS coil 473, an electromagnetic force may be applied to the first OIS magnet 474. When an electric current flows through the second OIS coil 475, an electromagnetic force may be applied to the second OIS magnet 476. When an electric current flows through the third OIS coil 477, an electromagnetic force may be applied to the third OIS magnet 478. The camera module 400 may be configured such that all or part of the lens unit 420 is moved relative to the frame 413 by the electromagnetic force.

According to the illustrated embodiment, the driving member 470 may be configured such that the plurality of coils 470_c are disposed on the camera housing 410 (e.g., the fixed unit) and the plurality of magnets 470_m are disposed on the lens unit 420 (e.g., the movable unit). However, the disclosure is not necessarily limited thereto. In an embodiment, the plurality of coils 470_c may be disposed on the lens unit 420, and the plurality of magnets 470_m may be disposed on the camera housing 410 (e.g., the fixed unit). For example, the plurality of magnets 470_m may be disposed on the frame 413 of the camera housing 410. Furthermore, a yoke may be disposed on at least part of the lens unit 420 to face away from the plurality of coils 470_c. In this case, the camera module 400 may further include a separate additional connecting member (e.g., a circuit board) for applying an electrical signal (e.g., an electric current) to the plurality of coils 470_c disposed on the lens unit 420.

Figure 7A:
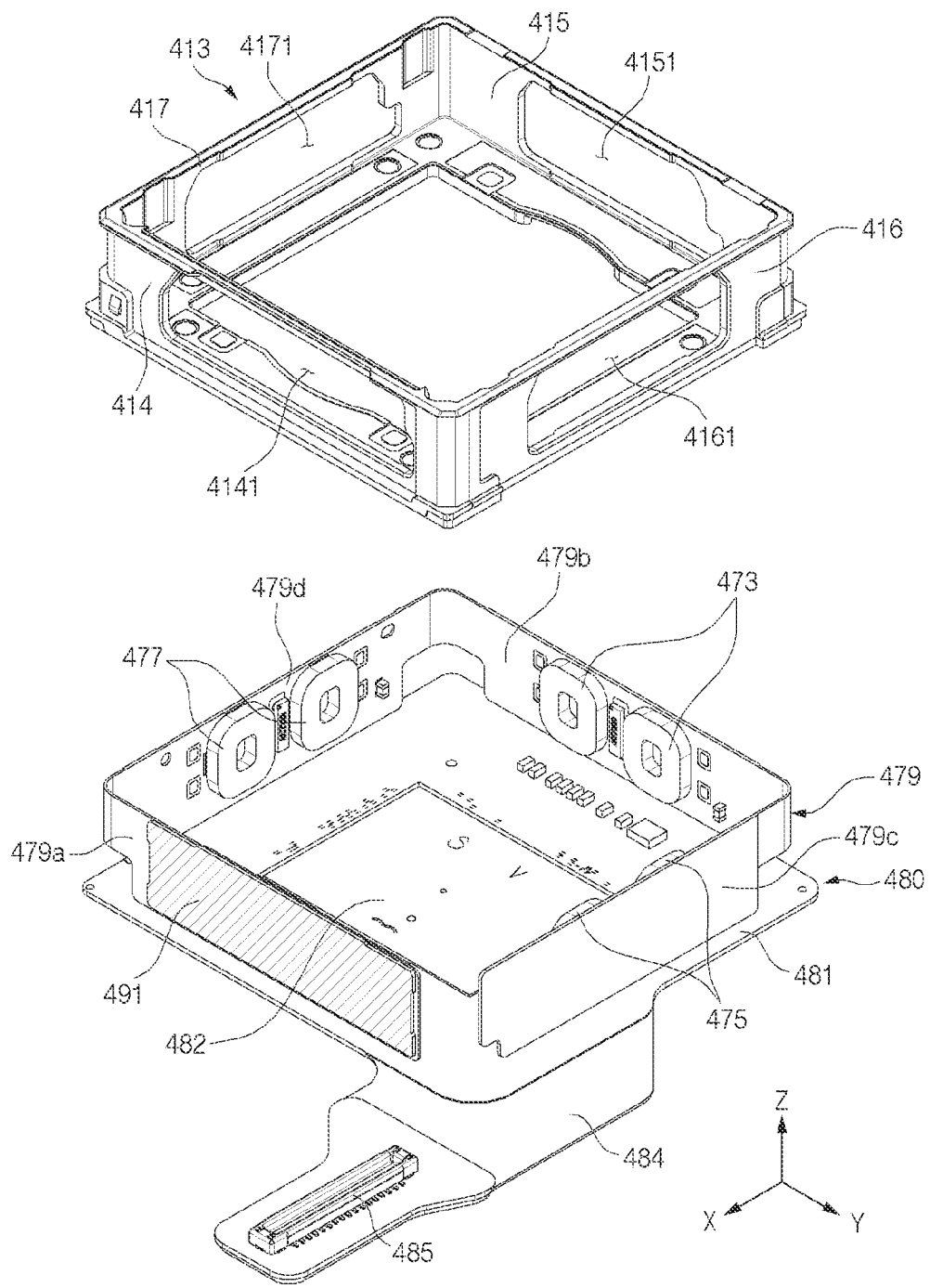
FIG. 7A is an exploded perspective view illustrating a camera housing and a sensor assembly of the camera module according to various embodiments
Figure 7B:
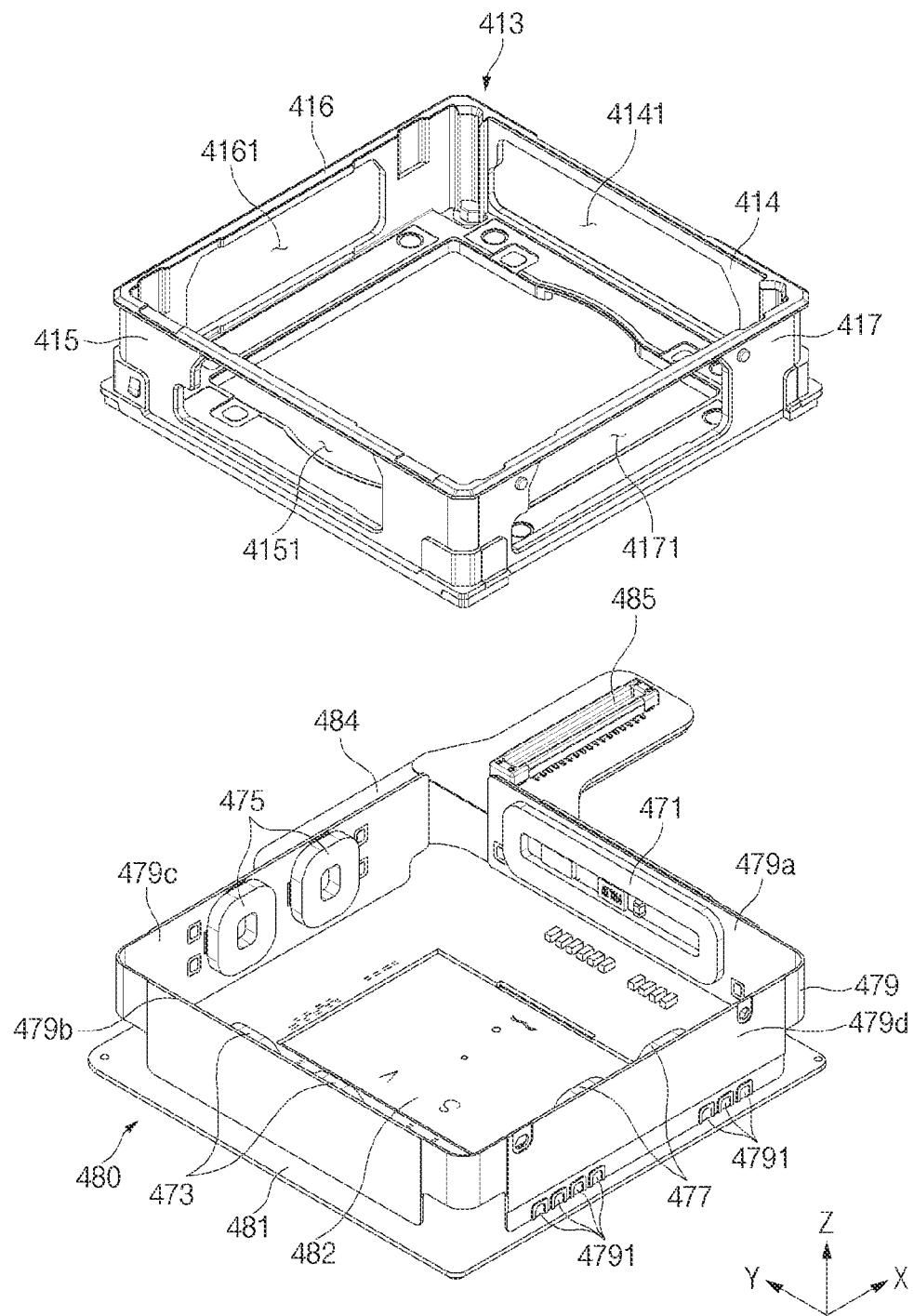
FIG. 7B is an exploded perspective view illustrating the camera housing and the sensor assembly of the camera module according to various embodiments.

FIG. 7A is an exploded perspective view illustrating the camera housing and the sensor assembly of the camera module according to various embodiments. FIG. 7B is an exploded perspective view illustrating the camera housing and the sensor assembly of the camera module according to various embodiments.

FIGS. 7A and 7B may be views in which the cover 411 of the camera housing 410 and the infrared filter 483 of the sensor assembly 480 are removed.

Referring to FIGS. 7A and 7B, the camera module 400 according to an embodiment may include the frame 413, the flexible circuit board 470 and the sensor assembly 480 that are coupled to the frame 413, and the plurality of coils 470_c disposed on the flexible circuit board 479.

Some components of the camera module 400 illustrated in FIGS. 7A and 7B may be identical or similar to some of the components of the camera module 400 illustrated in FIGS. 4 to 6B, and therefore repetitive descriptions will hereinafter may not be provided.

In an embodiment, the frame 413 may include the plurality of sidewalls 414, 415, 416, and 417. The plurality of sidewalls 414, 415, 416, and 417 may include the first sidewall 414 in which the AF coil 471 is disposed, the second sidewall 415 in which the first OIS coil 473 is disposed, the third sidewall 416 in which the second OIS coil 475 is disposed, and the fourth sidewall 417 in which the third OIS coil 477 is disposed.

In an embodiment, the plurality of sidewalls 414, 415, 416, and 417 may include opening areas such that the plurality of coils 470_c are located in the frame 413. The first sidewall 414 may have a first opening area 4141 formed therein in which the AF coil 471 is located. The second sidewall 415 may have a second opening area 4151 formed therein in which the first OIS coil 473 is located. The third sidewall 416 may have a third opening area 4161 formed therein in which the second OIS coil 475 is located. The fourth sidewall 417 may have a fourth opening area 4171 formed therein in which the third OIS coil 477 is located. For example, the plurality of coils 470_c may be located to face toward the inside of the frame 413 through the corresponding opening areas.

In an embodiment, the flexible circuit board 479 may extend to surround part of the first sidewall 414, part of the second sidewall 415, part of the third sidewall 416, and part of the fourth sidewall 417. The flexible circuit board 479 may be formed in a shape corresponding to the frame 413. For example, the flexible circuit board 479 may include a first portion 479a on which the AF coil 471 is disposed, a second portion 479b on which the first OIS coil 473 is disposed, a third portion 479c on which the second OIS coil 475 is disposed, and a fourth portion 479d on which the third OIS coil 477 is disposed. Based on the drawings, the flexible circuit board 479 may be formed in a shape in which the fourth portion 479d extends from the first portion 479a at a substantially right angle, the second portion 479b extends from the fourth portion 479d at a substantially right angle, and the third portion 479c extends from the second portion 479b at a substantially right angle.

In an embodiment, the flexible circuit board 479 may be disposed to surround the sidewalls 414, 415, 416, and 417 of the frame 413. For example, the first portion 479a of the flexible circuit board 479 may be coupled to the first sidewall 414 such that the AF coil 471 is located in the first opening area 4141. The second portion 479b of the flexible circuit board 479 may be coupled to the second sidewall 415 such that the first OIS coil 473 is located in the second opening area 4151. The third portion 479c of the flexible circuit board 479 may be coupled to the third sidewall 416 such that the second OIS coil 475 is located in the third opening area 4161. The fourth portion 479d of the flexible circuit board 479 may be coupled to the fourth sidewall 417 such that the third OIS coil 477 is located in the fourth opening area 4171.

In an embodiment, the first portion 479a of the flexible circuit board 479 may include an inside surface on which the AF coil 471 is disposed and an outside surface facing away from the inside surface. Based on the drawings, the inside surface may be a surface facing the −x-axis direction, and the outside surface may be a surface facing the +x-axis direction. For example, when the flexible circuit board 479 is coupled to the frame 413, the outside surface of the first portion 479a may be disposed to face toward the outside of the frame 4113. The yoke 491 may be disposed on the outside surface of the first portion 479a. As described above with reference to FIGS. 6A and 6B, the yoke 491 may be configured to form an attractive force with the AF magnet 472 facing the AF coil 471. The attractive force may act between the side surface (e.g., the side surface facing the first sidewall 414) of the lens carrier 422 on which the AF magnet 472 is disposed and the first sidewall 414 of the frame 413 where the yoke 491 and the AF coil 471 are disposed.

In an embodiment, the flexible circuit board 479 may be electrically connected with the substrate 481 of the sensor assembly 480 in the state of being coupled to the sidewalls 414, 415, 416, and 417 of the frame 413. At least part of the flexible circuit board 479 may make electrical contact with the substrate 481. For example, a first contact area 4791 for electrical contact with the substrate 481 may be formed on part of the flexible circuit board 479. The first contact area 4791 may be a conductive area containing a conductive material.

In an embodiment, the sensor assembly 480 may be disposed on the bottom of the frame 413 (e.g., in the −z-axis direction). For example, the sensor assembly 480 may include the image sensor 482 and the substrate 481 (e.g., a circuit board for a sensor) on which the image sensor 482 is disposed, and the frame 413 may be fixedly disposed on the upper surface of the substrate 481 (e.g., in the +z-axis direction). The image sensor 482 may be surrounded by the flexible circuit board 479 and the frame 413. For example, when the upper surface of the substrate 481 is viewed from above, the image sensor 482 may be located inside the flexible circuit board 479 and the frame 413. In various embodiments, the frame 413 may be attached to the substrate 481 using an adhesive member (not illustrated).

In an embodiment, the substrate 481 of the sensor assembly 480 may be electrically connected with the flexible circuit board 470 on which the plurality of coils 470_c are disposed. A second contact area (not illustrated) that corresponds to the first contact area 4791 of the flexible circuit board 479 may be formed on at least part of the substrate 481. The substrate 481 may be electrically connected with the flexible circuit board 479 as the second contact area makes contact with the first contact area 4791 of the flexible circuit board 479. For example, the second contact area may be a conductive area containing a conductive material.

In an embodiment, the first contact area 4791 and the second contact area (not illustrated) may make contact with each other as the frame 413 having the flexible circuit board 479 coupled thereto is disposed on the upper surface of the substrate 481. Accordingly, the flexible circuit board 479 and the substrate 481 may be electrically connected. The substrate 481 may be electrically connected with the main board 350 of the electronic device 300 through the connecting member 484 and/or the connector 485, and the flexible circuit board 479 may be electrically connected with the main board 350 through the substrate 481. However, electrical connection of the flexible circuit board 479 and the substrate 481 is not limited to being implemented by direct contact between the first contact area 4791 and the second contact area. In various embodiments, the camera module 400 may further include a component (e.g., a conductive wire or cable) that electrically connects the first contact area 4791 and the second contact area.

According to the embodiment illustrated in FIGS. 7A and 7B, the first contact area 4791 may be formed on the fourth portion 479*d* of the flexible circuit board 479, and the second contact area may be formed in a position on the upper surface (e.g., the surface facing the +z-axis direction) of the substrate 481 that corresponds to the first contact area 4791. A plurality of first contact areas 4791 and a plurality of second contact areas may be formed. However, the numbers and/or positions of first contact areas 4791 and second contact areas are not limited to the illustrated embodiment.

Figure 8:
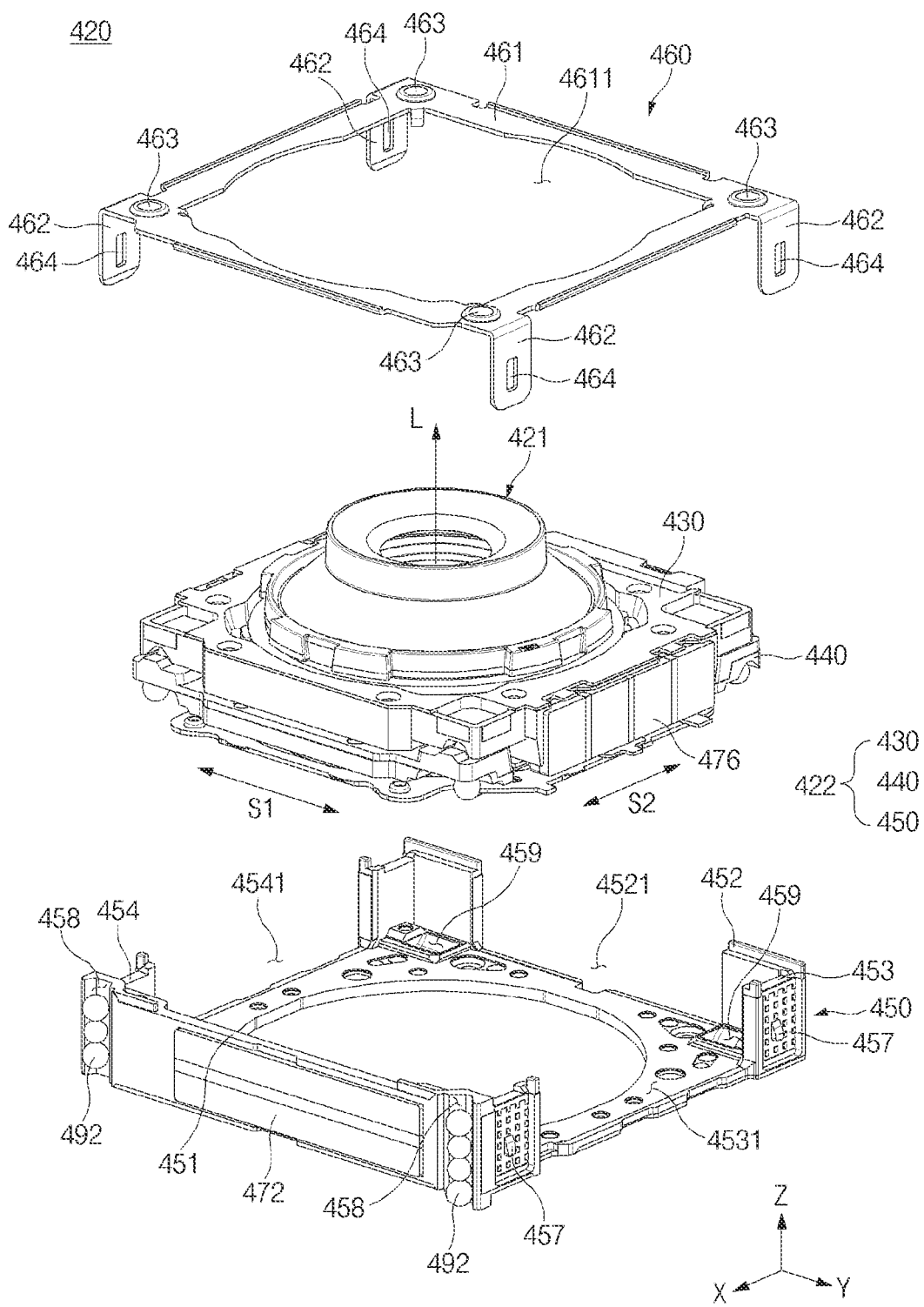
FIG. 8 is an exploded perspective view of a lens unit of the camera module according to various embodiments.
Figure 9A:
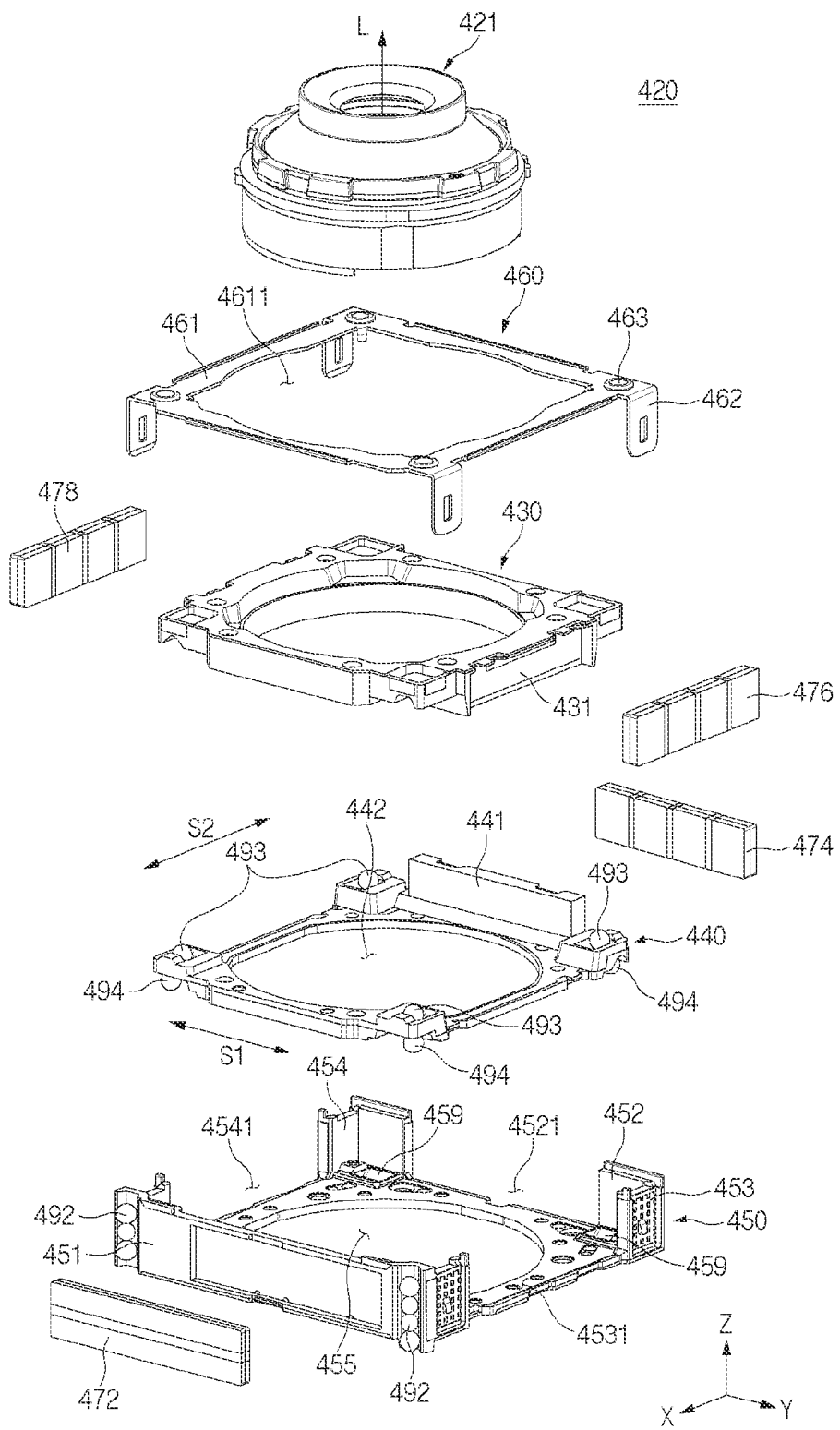
FIG. 9A is an exploded perspective view of the lens unit of the camera module according to various embodiments.
Figure 9B:
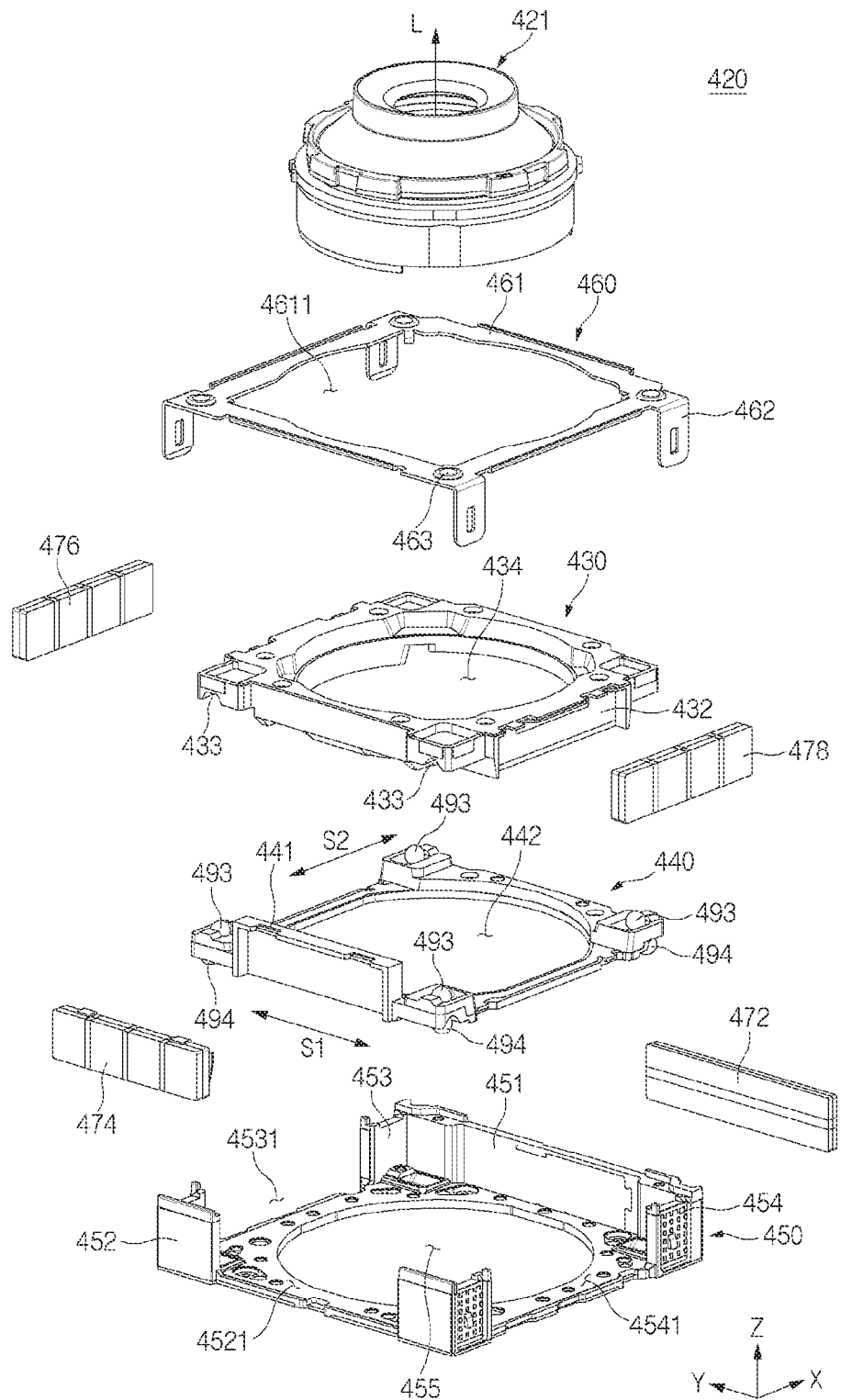
FIG. 9B is an exploded perspective view of the lens unit of the camera module according to various embodiments.
Figure 10A:
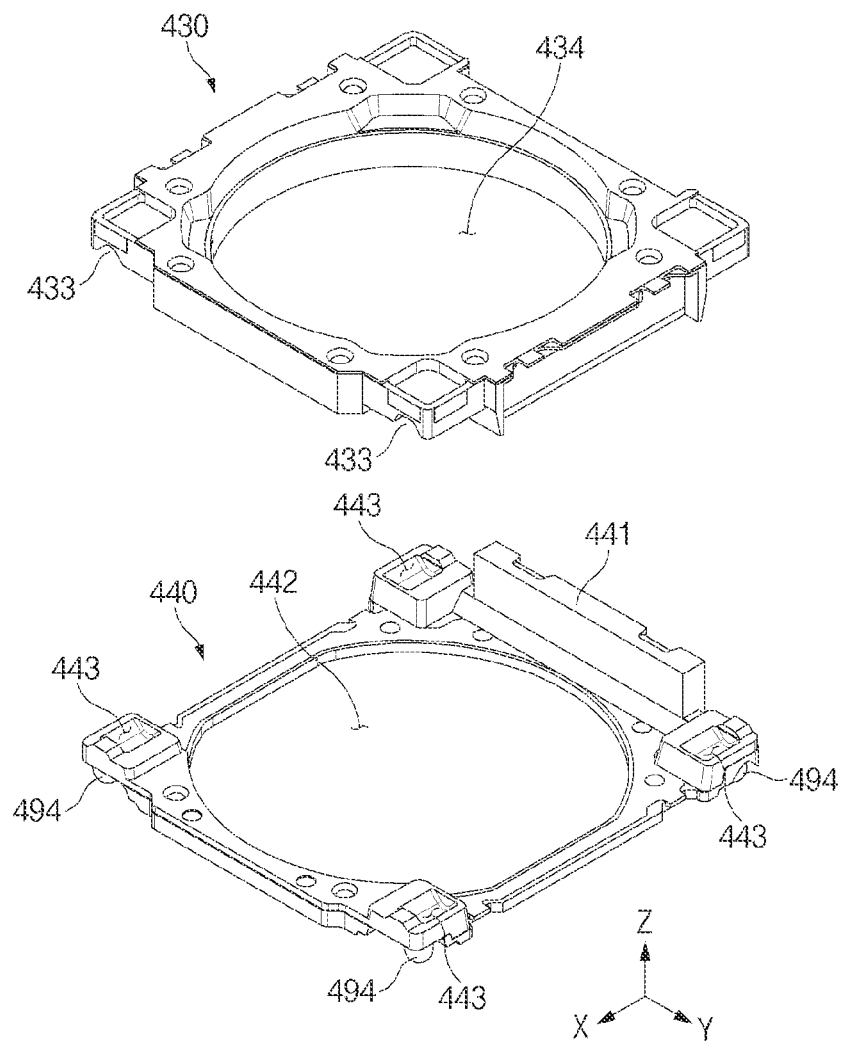
FIG. 10A is an exploded perspective view illustrating a first carrier and a guide member of the lens unit according to various embodiments.
Figure 10B:
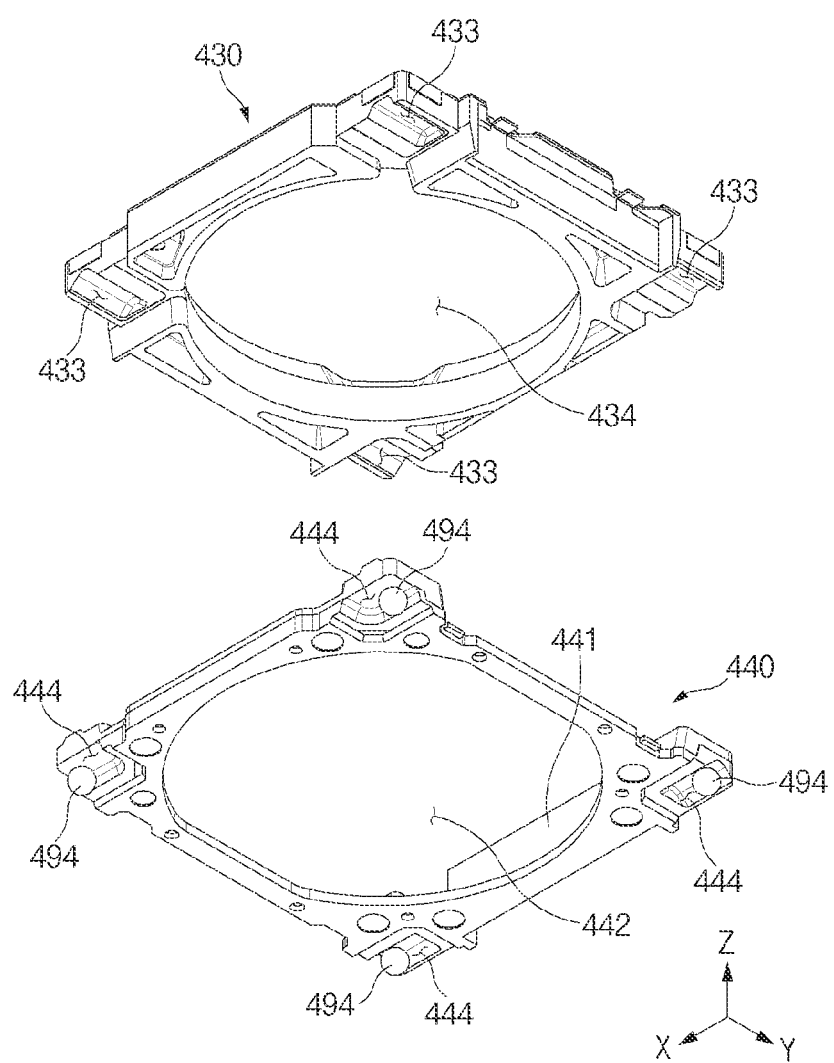
FIG. 10B is an exploded perspective view illustrating the first carrier and the guide member of the lens unit according to various embodiments.

FIG. 8 is an exploded perspective view of the lens unit of the camera module according to various embodiments. FIG. 9A is an exploded perspective view of the lens unit of the camera module according to various embodiments. FIG. 9B is an exploded perspective view of the lens unit of the camera module according to various embodiments. FIG. 10A is an exploded perspective view of the first carrier and the guide member of the lens unit according to various embodiments. FIG. 10B is an exploded perspective view of the first carrier and the guide member of the lens unit according to various embodiments.

Referring to FIGS. 8, 9A, and 9B, the lens unit 420 of the camera module 400 according to an embodiment may include the lens assembly 421, the lens carrier 422, and the stopper 460.

Some components of the camera module 400 illustrated in FIGS. 8, 9A and 9B may be identical or similar to some of the components of the camera module 400 illustrated in FIGS. 4 to 7B, and therefore repetitive descriptions may not be provided here.

In an embodiment, the lens assembly 421 may be coupled to the first carrier 430 of the lens carrier 422. For example, the lens assembly 421 may be coupled with the first carrier 430 such that at least part of the lens assembly 421 is accommodated in a first opening 434 of the first carrier 430. The lens assembly 421 may be fixedly disposed in the first carrier 430 and may move together with the first carrier 430.

In an embodiment, the lens carrier 422 may include the first carrier 430, the second carrier 450, and the guide member 440. The lens carrier 422 may be configured such that the first carrier 430, the second carrier 450, and the guide member 440 are aligned in the direction of the optical axis L. The first carrier 430, the guide member 440, and the second carrier 450 may be arranged in the direction of the optical axis L. For example, the first carrier 430 may be disposed over the guide member 440, and the guide member 440 may be disposed over the second carrier 450.

In an embodiment, the second carrier 450 of the lens carrier 422 may be understood as an AF carrier for an AF operation, and the first carrier 430 and the guide member 440 may be understood as an OIS carrier for an OIS operation.

In an embodiment, the first carrier 430 may be coupled with the lens assembly 421. For example, the lens assembly 421 may be coupled to the first opening 434 of the first carrier 430 such that the first carrier 430 moves together with the lens assembly 421. The first opening 434 may be aligned with the lens assembly 421 in the direction of the optical axis L.

In an embodiment, the first carrier 430 may be configured to move together with the lens assembly 421 in the directions of a first shift axis S1 (e.g., the first shift axis S1 of FIG. 11) and a second shift axis S2 (e.g., the second shift axis S2 of FIG. 11) that are substantially perpendicular to the optical axis L. The first carrier 430 may be disposed so as to be movable in the direction of the second shift axis S2 relative to the guide member 440. For example, the first carrier 430 may move in the direction of the second shift axis S2 relative to the guide member 440 and the second carrier 450. The first carrier 430 may be configured to move together with the guide member 440 in the direction of the first shift axis S1. For example, the first carrier 430 may move together with the guide member 440 when the guide member 440 moves in the direction of the first shift axis S1 relative to the second carrier 450.

In an embodiment, the second OIS magnet 476 and the third OIS magnet 478 that provide a driving force to move the first carrier 430 in the direction of the second shift axis S2 may be disposed on the first carrier 430. The second OIS magnet 476 and the third OIS magnet 478 may be disposed on the side surfaces facing the direction of the first shift axis S1 substantially perpendicular to the second shift axis S2 among the side surfaces of the first carrier 430. The second OIS magnet 476 and the third OIS magnet 478 may be disposed on the first carrier 430 to face away from each other.

In an embodiment, the first carrier 430 may include mounting portions on which magnets are mounted. For example, a first magnet mounting portion 431 on which the second OIS magnet 476 is mounted may be formed on the side surface of the first carrier 430 that faces the +y-axis direction, and a second magnet mounting portion 432 on which the third OIS magnet 478 is mounted may be formed on the side surface of the first carrier 430 that faces the −y-axis direction. The second OIS magnet 476 may be fixedly disposed on the first magnet mounting portion 431, and the third OIS magnet 478 may be fixedly disposed on the second magnet mounting portion 432. The second OIS magnet 476 and the third OIS magnet 478 may electromagnetically interact with the second OIS coil (e.g., the second OIS coil 475 of FIGS. 6A to 7B) and the third OIS coil (e.g., the third OIS coil 477 of FIGS. 6A to 7B) to generate a driving force for moving the first carrier 430 in the direction of the second shift axis S2. The second OIS magnet 476 and the third OIS magnet 478 may be formed such that areas having different polarities are arranged in the direction of the second shift axis S2. For example, each of the second OIS magnet 476 and the third OIS magnet 478 may have at least three polarities. The forms of the second OIS magnet 476 and the third OIS magnet 478 will be described in greater detail below with reference to FIG. 24.

In an embodiment, the guide member 440 may be disposed between the first carrier 430 and the second carrier 450. The guide member 440 may be disposed so as to be movable relative to the first carrier 430 and the second carrier 450. For example, the guide member 440 may be disposed over the second carrier 450 so as to be movable in the direction of the first shift axis S1 relative to the second carrier 450 and may be disposed under the first carrier 430 so as to be movable in the direction of the second shift axis S2 relative to the first carrier 430.

In an embodiment, when an image stabilization function is performed, the guide member 440 may move together with the first carrier 430 relative to the second carrier 450, or may be relatively fixed without moving together with the first carrier 430. For example, the guide member 440 may move together with the first carrier 430 in the direction of the first shift axis S1. The guide member 440 may not move together with the first carrier 430 when the first carrier 430 moves in the direction of the second shift axis S2. According to embodiments of the disclosure, the guide member 440 may move together with the first carrier 430 in the case of moving the lens assembly 421 in the direction of the first shift axis S1 for image stabilization and may not move together with the first carrier 430 in the case of moving the lens assembly 421 in the direction of the second shift axis S2 for image stabilization.

In an embodiment, the first OIS magnet 474 that provides a driving force to move the guide member 440 in the direction of the first shift axis S1 may be disposed on the guide member 440. The first OIS magnet 474 may be disposed on the guide member 440 such that the first OIS magnet 474 faces away from the AF magnet 472 and is located to be perpendicular to the second OIS magnet 476 and the third OIS magnet 478.

In an embodiment, the guide member 440 may include a third magnet mounting portion 441 on which the first OIS magnet 474 is mounted. For example, the third magnet mounting portion 441 may extend to a specified height toward the first carrier 430 from the peripheral portion of the second carrier 450 that faces the −x-axis direction. The first OIS magnet 474 may be fixedly disposed on the third magnet mounting portion 441. The first OIS magnet 474 may electro-magnetically interact with the first OIS coil (e.g., the first OIS coil 473 of FIGS. 6A to 7B) to generate a driving force for moving the guide member 440 in the direction of the first shift axis S1. The first OIS magnet 474 may be formed such that areas having different polarities are arranged in the direction of the first shift axis S1. For example, the first OIS magnet 474 may have at least three polarities. The form of the first OIS magnet 474 will be described in greater detail below with reference to FIG. 24.

In an embodiment, a second opening 442 aligned with the lens assembly 421 in the direction of the optical axis L may be formed in the guide member 440. The second opening 442 may be aligned with the first opening 434 in the direction of the optical axis L.

According to embodiments of the disclosure, the camera module 400 may perform an image stabilization function (e.g., lens shift OIS) by moving the lens assembly 421 in the direction of the first shift axis S1 and/or the direction of the second shift axis S2. For example, the movement of the lens assembly 421 in the direction of the first shift axis S1 may be performed by a movement of the guide member 440, and the movement of the lens assembly 421 in the direction of the second shift axis S2 may be performed by a movement of the first carrier 430. The camera module 400 may compensate for a shake by moving the lens assembly 421 relative to the image sensor (e.g., the image sensor 482 of FIGS. 6A to 7B).

In an embodiment, the second carrier 450 may accommodate at least parts of the lens assembly 421, the first carrier 430, and the guide member 440 inside. The guide member 440 may be disposed in the second carrier 450 so as to be movable in the direction of the first shift axis S1.

In an embodiment, the second carrier 450 may move the lens assembly 421, the first carrier 430, and the guide member 440 in the direction of the optical axis L. For example, the second carrier 450 may be configured to move in the direction of the optical axis L relative to the frame 413 of the camera housing 410. When the second carrier 450 moves in the direction of the optical axis L in the frame 413, the lens assembly 421, the first carrier 430, and the guide member 440 may move together with the second carrier 450 in the direction of the optical axis L. As described above with reference to FIGS. 6A and 6B, as the second carrier 450 moves in the direction of the optical axis L, the distance between the image sensor 482 fixed under the frame 413 and the lens assembly 421 may be changed, and thus a focal length may be adjusted.

In an embodiment, the second carrier 450 may include a plurality of sidewalls 451, 452, 453, and 454 surrounding at least parts of the first carrier 430 and the guide member 440. The plurality of sidewalls 451, 452, 453, and 454 may include the fifth sidewall 451 on which the AF magnet 472 and the first ball 492 are disposed, the sixth sidewall 452 having a fifth opening area 4521 formed therein through which the first OIS magnet 474 is exposed outside the second carrier 450, the seventh sidewall 453 having a sixth opening area 4531 formed therein through which the second OIS magnet 476 is exposed outside the second carrier 450, and the eighth sidewall 454 having a seventh opening area 4541 formed therein through which the third OIS magnet 478 is exposed outside the second carrier 450. Based on the drawings, the fifth sidewall 451 may face the +x-axis direction, the sixth sidewall 452 may face the −x-axis direction, the seventh sidewall 453 may face the +y-axis direction, and the eighth sidewall 454 may face the −y-axis direction.

In an embodiment, the AF magnet 472 may be fixedly disposed on the fifth sidewall 451 of the second carrier 450. The AF magnet 472 may electro-magnetically interact with the AF coil (e.g., the AF coil 471 of FIGS. 6A to 7B) to generate a driving force for moving the second carrier 450 in the direction of the optical axis L. The AF magnet 472 may be formed such that two polarity areas having different polarities are arranged in the direction of the optical axis L.

In an embodiment, a third opening 455 aligned with the lens assembly 421 in the direction of the optical axis L may be formed in the second carrier 450. The third opening 455 may be aligned with the first opening 434 and the second opening 442 in the direction of the optical axis L. For example, the lens assembly 421 may face the image sensor 482 through the first opening 434, the second opening 442, and the third opening 455. Light passing through the lens assembly 421 may be incident on the image sensor 482 through the first opening 434, the second opening 442, and the third opening 455.

In an embodiment, the stopper 460 may be coupled to the second carrier 450. The stopper 460 may prevent and/or reduce separation of the first carrier 430 and the guide member 440 from the inside of the second carrier 450 when the first carrier 430 and the guide member 440 move. For example, the stopper 460 may be coupled to the second carrier 450 to overlap part of the first carrier 430.

In an embodiment, the stopper 460 may include a base portion 461 having an opening 4611 formed therein, extending portions 462 vertically extending from the base portion 461 toward the second carrier 450, and elastic portions 463 disposed on corner portions of the base portion 461. The base portion 461 may overlap the first carrier 430, the guide member 440, and the second carrier 450 in the direction of the optical axis L. The extending portions 462 may be coupled to the sidewalls 451, 452, 453, and 454 of the second carrier 450. For example, stopping recesses 464 may be formed in the extending portions 462, and stopping protrusions 457 formed on the seventh sidewall 453 and the eighth sidewall 454 of the second carrier 450 may be fastened to the stopping recesses 464. However, a coupling structure of the stopper 460 is not limited thereto.

According to embodiments of the disclosure, the stopper 460 may form a damping structure (the terms "damping member", "damping structure" or the like may be referred to herein and in the claims as a damper or structure including a damper) together with the first carrier 430. When the first carrier 430 and/or the second carrier 450 moves in an image stabilization operation, the damping structure formed by the stopper 460 and the first carrier 430 may absorb shock and may reduce a shake and vibration. The damping structure between the stopper 460 and the first carrier 430 will be described in greater detail below with reference to FIGS. 12 to 15.

Hereinafter, a ball guide structure for guiding a movement of the first carrier 430 and the guide member 440 will be described with reference to FIGS. 9A, 9B, 10A, and 10B. For example, FIG. 10A may be a perspective view of the first carrier 430 and the guide member 440 as viewed in the +z-axis direction, and FIG. 10B may be a perspective view of the first carrier 430 and the guide member 440 as viewed in the −z-axis direction.

Referring to FIGS. 9A, 9B, 10A, and 10B, the lens unit 420 may include one or more second balls 493 disposed between the first carrier 430 and the guide member 440 and one or more third balls 494 disposed between the guide member 440 and the second carrier 450. For example, the second balls 493 may be referred to as the first guide balls that guide a movement of the first carrier 430 in the direction of the second shift axis S2, and the third balls 494 may be referred to as the second guide balls that guide a movement of the guide member 440 in the direction of the first shift axis S1.

In an embodiment, the second balls 493 may be disposed between the first carrier 430 and the guide member 440 and may guide a movement of the first carrier 430 in the direction of the second shift axis S2 relative to the guide member 440. The first carrier 430 may have third recesses 433 in which at least parts of the second balls 493 are accommodated. Fourth recesses 443 aligned with the third recesses 433 in the direction of the optical axis L may be formed on the guide member 440. For example, the third recesses 433 may be formed on the lower surface of the first carrier 430 to face the −z-axis direction, and the fourth recesses 443 may be formed on the upper surface of the guide member 440 to face the +z-axis direction. The third recesses 433 and the fourth recesses 443 may form spaces (e.g., first receiving recesses) in which the second balls 493 are accommodated. For example, as many third recesses 433 and fourth recesses 443 as the second balls 493 may be formed. The third recesses 433 and the fourth recesses 443 may be formed in a shape extending in the direction of the second shift axis S2 by a predetermined length.

In an embodiment, the second balls 493 may be configured to roll in the spaces (e.g., the first receiving recesses) between the third recesses 433 and the fourth recesses 443. For example, when the first carrier 430 moves in the direction of the second shift axis S2 relative to the guide member 440, the second balls 493 may rotate while linearly moving in the direction of the second shift axis S2, or may rotate in position, in the spaces between the third recesses 433 and the fourth recesses 443.

In an embodiment, the third balls 494 may be disposed between the second carrier 450 and the guide member 440 and may guide a movement of the guide member 440 in the direction of the first shift axis S1 relative to the second carrier 450. The guide member 440 may have fifth recesses 444 in which at least parts of the third balls 494 are accommodated. Sixth recesses 459 aligned with the fifth recesses 444 in the direction of the optical axis L may be formed on the second carrier 450. For example, the fifth recesses 444 may be formed on the lower surface of the guide member 440 to face the −z-axis direction, and the sixth recesses 459 may be formed on the upper surface of the second carrier 450 to face the +z-axis direction. The fifth recesses 444 and the sixth recesses 459 may form spaces (e.g., second receiving recesses) in which the third balls 494 are accommodated. For example, as many fifth recesses 444 and sixth recesses 459 as the third balls 494 may be formed. The fifth recesses 444 and the sixth recesses 459 may be formed in a shape extending in the direction of the first shift axis S1 by a predetermined length.

In an embodiment, the third balls 494 may be configured to roll in the spaces (e.g., the second receiving recesses) between the fifth recesses 444 and the sixth recesses 459. For example, when the guide member 440 moves in the direction of the first shift axis S1 relative to the second carrier 450, the third balls 494 may rotate while linearly moving in the direction of the first shift axis S1, or may rotate in position, in the spaces between the fifth recesses 444 and the sixth recesses 459.

Figure 11:
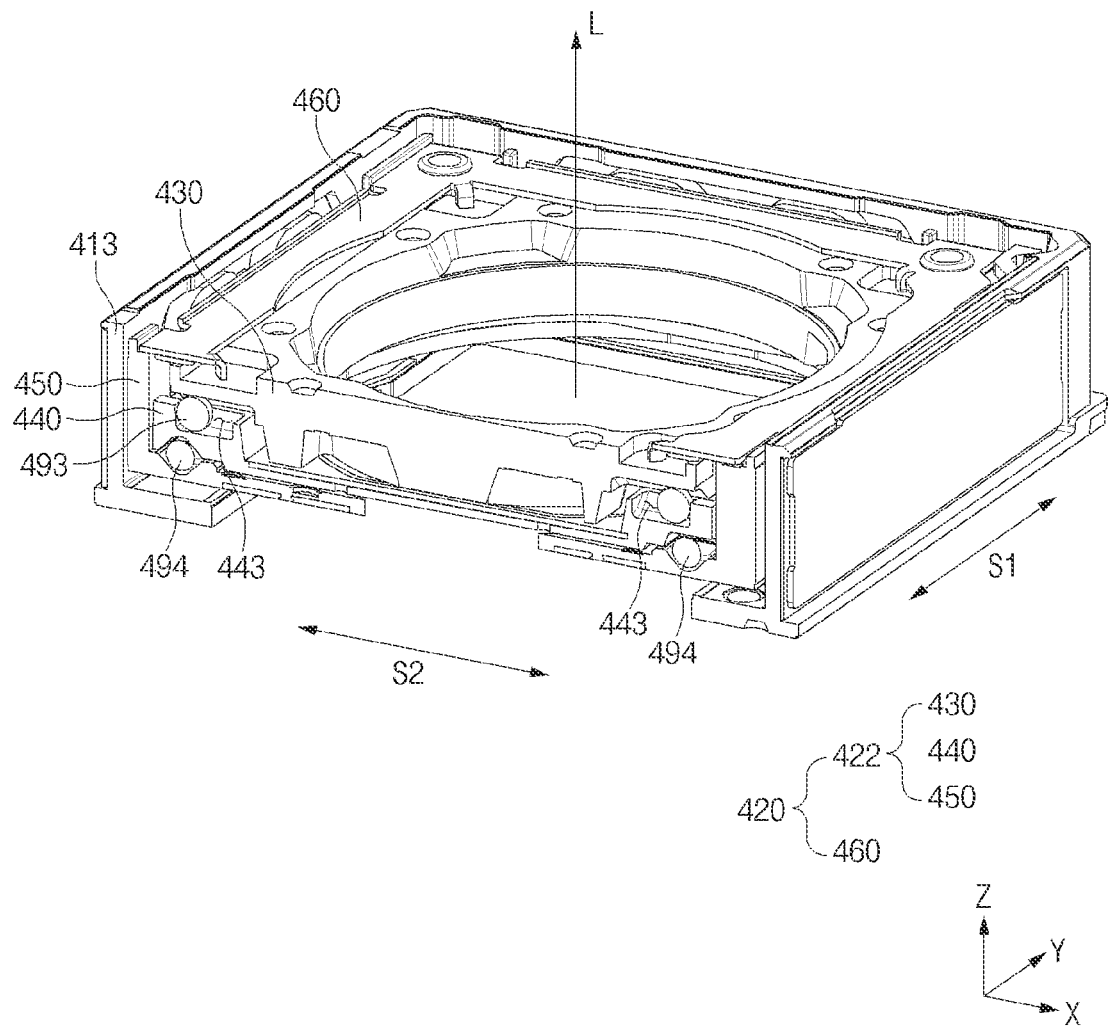
FIG. 11 is a perspective view illustrating an image stabilization operation of the camera module according to various embodiments.

FIG. 11 is a partial sectional perspective view illustrating an image stabilization function of the camera module according to various embodiments.

FIG. 11 may be a view in which the cover 411, the lens assembly 421, and the sensor assembly 480 are removed.

Referring to FIG. 11, the camera module 400 according to an embodiment may include the frame 413 and the lens unit 420, at least part of which is disposed in the frame 413.

In an embodiment, the lens unit 420 may include the lens carrier 422 and the stopper 460. The lens carrier 422 may include the first carrier 430, the guide member 440, and the second carrier 450. Although not illustrated, the lens assembly 421 may be fixedly disposed in the first carrier 430 of the lens carrier 422 (e.g., refer to FIG. 8), and the sensor assembly 480 including the image sensor 482 may be fixedly disposed under the frame 413 (e.g., refer to FIG. 5).

The camera module 400 according to an embodiment may be configured to move the first carrier 430 and/or the guide member 440 in a direction substantially perpendicular to the optical axis L relative to the frame 413 and the second carrier 450 that are relatively fixed. Accordingly, in response to a shake of the electronic device 300 or the camera module 400, the camera module 400 may move the lens assembly 421 (e.g., the lens 425) in the direction substantially perpendicular to the optical axis L relative to the image sensor 482, thereby correcting the shake.

Hereinafter, an operation of relatively moving components (e.g., the first carrier 430, the guide member 440, and the second carrier 450) of the lens carrier 422 having different degrees of freedom when an image stabilization function is performed will be described.

In an embodiment, the camera module 400 may perform the image stabilization function by moving the first carrier 430, to which the lens assembly 421 is coupled, in the direction of at least one of the first shift axis S1 or the second shift axis S2. The first shift axis S1 and the second shift axis S2 may be substantially perpendicular to the optical axis L. The first shift axis S1 and the second shift axis S2 may be perpendicular to each other. For example, based on the drawing, the optical axis L may be parallel to the z-axis, the first shift axis S1 may be parallel to the y-axis, and the second shift axis S2 may be parallel to the x-axis.

In an embodiment, the camera module 400 may perform a first OIS operation of moving the lens assembly 421 in the direction of the first shift axis S1.

In an embodiment, the camera module 400 may be configured such that the first carrier 430, together with the guide member 440, moves in the direction of the first shift axis S1 relative to the second carrier 450. For example, the first carrier 430 may move together with the guide member 440 when the guide member 440 moves in the direction of the first shift axis S1 relative to the second carrier 450. Although not illustrated, the camera module 400 may move the guide member 440 relative to the second carrier 450 using the first OIS magnet (e.g., the first OIS magnet 474 of FIGS. 9A and 9B) disposed on the guide member 440 and the first OIS coil (e.g., the first OIS coil 473 of FIGS. 9A and 9B) disposed on the frame 413.

In an embodiment, when the guide member 440 moves together with the first carrier 430 in the direction of the first shift axis S1, the third balls 494 may guide the movement of the guide member 440 while rotating and/or moving between the second carrier 450 and the guide member 440. When the guide member 440 and the first carrier 430 move together, the second balls 493 may not rotate and/or move between the guide member 440 and the first carrier 430.

In an embodiment, the camera module 400 may perform a second OIS operation of moving the lens assembly 421 in the direction of the second shift axis S2.

In an embodiment, the camera module 400 may be configured such that the first carrier 430 moves in the direction of the second shift axis S2 relative to the guide member 440 and the second carrier 450. For example, when the first carrier 430 moves in the direction of the second shift axis S2, the guide member 440 may be separated from the movement of the first carrier 430 without moving together with the first carrier 430 in the direction of the second shift axis S2. Although not illustrated, the camera module 400 may move the first carrier 430 relative to the guide member 440 using the second OIS magnet and the third OIS magnet (e.g., the second OIS magnet 476 and the third OIS magnet 478 of FIGS. 9A and 9B) disposed on the first carrier 430 and the second OIS coil and the third OIS coil (e.g., the second OIS coil 475 and the third OIS coil 477 of FIGS. 9A and 9B) disposed on the frame 413.

In an embodiment, the guide member 440 may have one degree of freedom so as to move in the direction of the first shift axis S1 relative to the second carrier 450, and the first carrier 430 may have two degrees of freedom so as to move in the direction of the first shift axis S1 and the direction of the second shift axis S2 relative to the second carrier 450. As the first carrier 430 is movable in the two axial directions perpendicular to each other, a movement of the first carrier 430 in the direction of the first shift axis S1 may occur together when the first carrier 430 moves in the direction of the second shift axis S2 in an OIS operation. For example, as the distance by which the first carrier 430 moves in the direction of the first shift axis S1 increases, a predetermined error may occur in position information of the first carrier 430 in the direction of the second shift axis S2 that is determined using the magnetic flux density of a magnet disposed on the first carrier 430.

The camera module 400 according to embodiments of the disclosure may more accurately control a movement of the first carrier 430 by moving the first carrier 430 in the direction of the second shift axis S2 using the two drive magnets (e.g., the second OIS magnet 476 and the third OIS magnet 478) disposed on the opposite sides of the first carrier 430. Furthermore, according to various embodiments, an error may be reduced by detecting position information of the first carrier 430 in the direction of the second shift axis S2 based on the sum of the magnetic flux densities of the two magnets.

In an embodiment, when the first carrier 430 moves in the direction of the second shift axis S2 relative to the guide member 440, the second balls 493 may guide the movement of the first carrier 430 while rotating and/or moving between the first carrier 430 and the guide member 440. When the first carrier 430 moves relative to the guide member 440, the third balls 494 may not rotate and/or move between the guide member 440 and the second carrier 450. Accordingly, when the first carrier 430 moves, the guide member 440 may be relatively fixed together with the second carrier 450.

In an embodiment, the lens carrier 422 may include the second balls 493 and the third balls 494 and may thus provide a rolling frictional force between the first carrier 430, the guide member 440, and the second carrier 450 that have different degrees of freedom. For example, the third balls 494 may remain brought into contact with the guide member 440 and the second carrier 450 as the guide member 440 is seated on the upper portion of the second carrier 450 (e.g., in the +z-axis direction). The second balls 493 may remain brought into contact with the first carrier 430 and the guide member 440 as the first carrier 430 is seated on the upper portion of the guide member 440.

Figure 12:
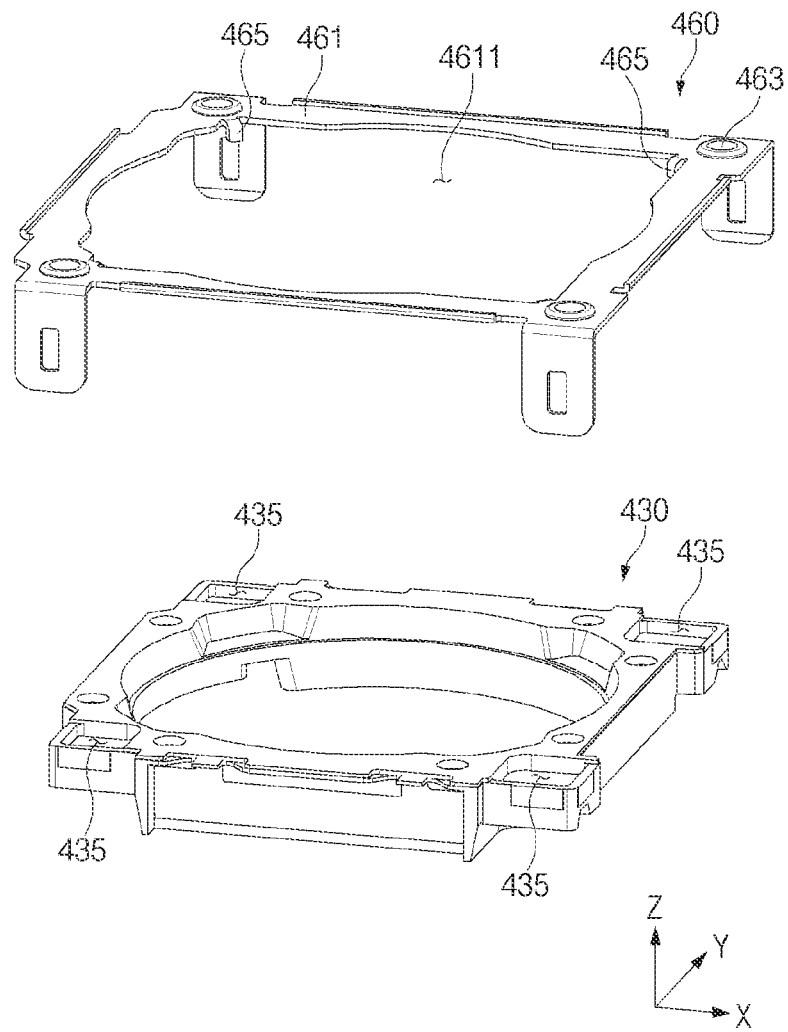
FIG. 12 is an exploded perspective view illustrating the first carrier and a stopper of the lens unit according to various embodiments.
Figure 13:
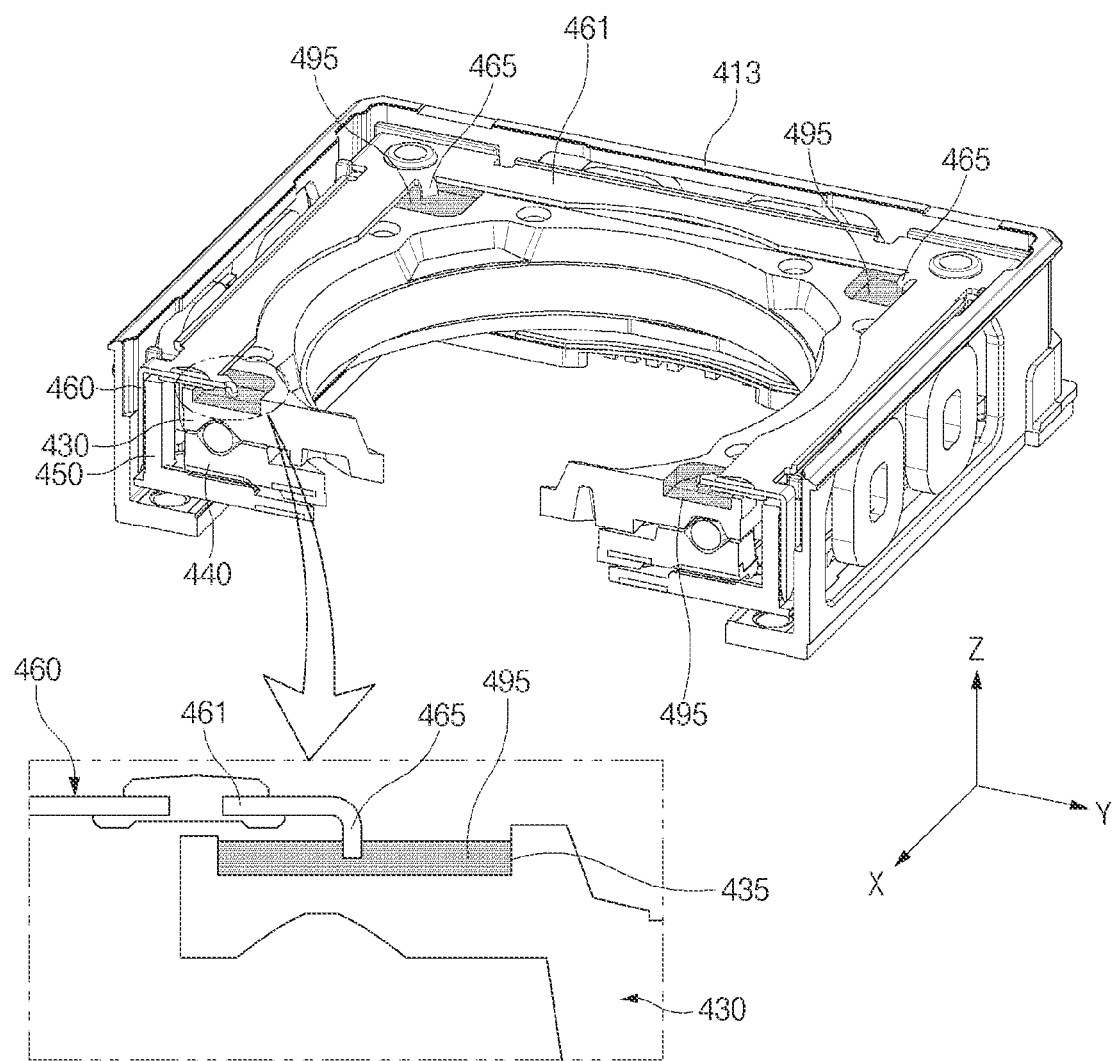
FIG. 13 is a sectional perspective view illustrating a damping structure of the camera module according to various embodiments.

FIG. 12 is an exploded perspective view illustrating the first carrier and the stopper of the lens unit according to various embodiments. FIG. 13 is a partial sectional perspective view illustrating a damping structure of the camera module according to various embodiments.

FIG. 13 may be a view in which the cover 411, the lens assembly 421, and the sensor assembly 480 are removed.

Referring to FIGS. 12 and 13, the camera module 400 according to an embodiment may include the frame 413, the first carrier 430, the guide member 440, the second carrier 450, and the stopper 460.

In an embodiment, the camera module 400 may be configured such that the damping structure is formed in the lens unit 420. For example, the lens unit 420 may include the damping structure (e.g., first protrusions 465 and first damping members 495) formed between the first carrier 430 and the stopper 460 to reduce a shake and/or vibration in a high-frequency band and absorb shock when the first carrier 430 and/or the guide member 440 moves in the second carrier 450. For example, the high-frequency band may be, but is not limited to, a frequency band of about 20 Hz or more. In various embodiments, the shake in the high-frequency band may refer to a shake having a higher frequency than a shake (e.g., about 10 Hz) caused by hand shaking when a user takes an image with the camera module 400.

In an embodiment, the first carrier 430 may include first receiving portions 435 in which the first damping members 495 are disposed. The first receiving portions 435 may be formed on the corner portions of the first carrier 430. For example, partial areas of the corner portions of the first carrier 430 may be recessed in the direction of the optical axis L to form the first receiving portions 435. A plurality of first receiving portions 435 may be formed.

In an embodiment, the first damping members 495 may be disposed in the first receiving portions 435. For example, the first damping members 495 may be formed of a material having a predetermined viscoelasticity and/or fluidity and may fill the first receiving portions 435. In various embodiments, the first damping members 495 may be formed by filling the first receiving portions 435 with a liquid material having a predetermined viscoelasticity and curing (e.g., UV curing or thermally curing) the liquid material. In various embodiments, the first damping members 495 may contain a resin material (e.g., silicone) in a gel or sol form. However, the material and the forming method of the first damping members 495 are not limited to the above-described example.

In an embodiment, the stopper 460 may include the first protrusions 465 at least partially disposed inside the first damping members 495. The first protrusions 465 may be aligned with the first receiving portions 435 of the first carrier 430 in the direction of the optical axis L. The first protrusions 465 may extend from the base portion 461 toward the first carrier 430. For example, the first protrusions 465 may extend toward the first carrier 430 from the inner periphery of the base portion 461 that surrounds the opening 4611. The first protrusions 465 and the first receiving portions 435 may overlap each other in the direction of the optical axis L. For example, the stopper 460 may be configured such that at least parts of the first protrusions 465 are located inside the first receiving portions 435 when the stopper 460 is coupled to the second carrier 450. As many first protrusions 465 as the first receiving portions 435 and the first damping members 495 may be formed.

In an embodiment, the first protrusions 465 may be at least partially disposed inside the first damping members 495 to reduce excessive movement and vibration between the first carrier 430 and the stopper 460 that are caused by an image stabilization operation (OIS operation) or external shock. For example, the first protrusions 465 may be fit into the first damping members 495, or may be at least partially bonded to the first damping members 495 with a predetermined strength. In various embodiments, a coupling of the first protrusions 465 and the first damping members 495 may be implemented by curing the liquid material in the state in which portions of the first protrusions 465 are immersed in the liquid material filling the first receiving portions 435.

According to embodiments of the disclosure, the first carrier 430 may be movable between the second carrier 450 and the stopper 460 in the direction of the first shift axis S1 and the direction of the second shift axis S2. For example, the first carrier 430 may move together with the guide member 440 in the direction of the first shift axis S1 and may move separately from the guide member 440 in the direction of the second shift axis S2. As the first damping members 495 are formed of a viscoelastic material, the first carrier 430 may be configured to move relative to the stopper 460 in an OIS operation, and a reduction in high-frequency noise (e.g., vibration or shake having a frequency of about 20 Hz or more) and alleviation of external shock may be achieved in the OIS operation. For example, the first damping members 495 may suppress a shake of the lens unit 420 (e.g., the first carrier 430 and/or the guide member 440) of the camera module 400 that is caused by vibration of a vibration motor (e.g., the haptic module 179 of FIG. 1) of the electronic device 300. However, high-frequency noise is not limited to the above-described example.

Figure 14:
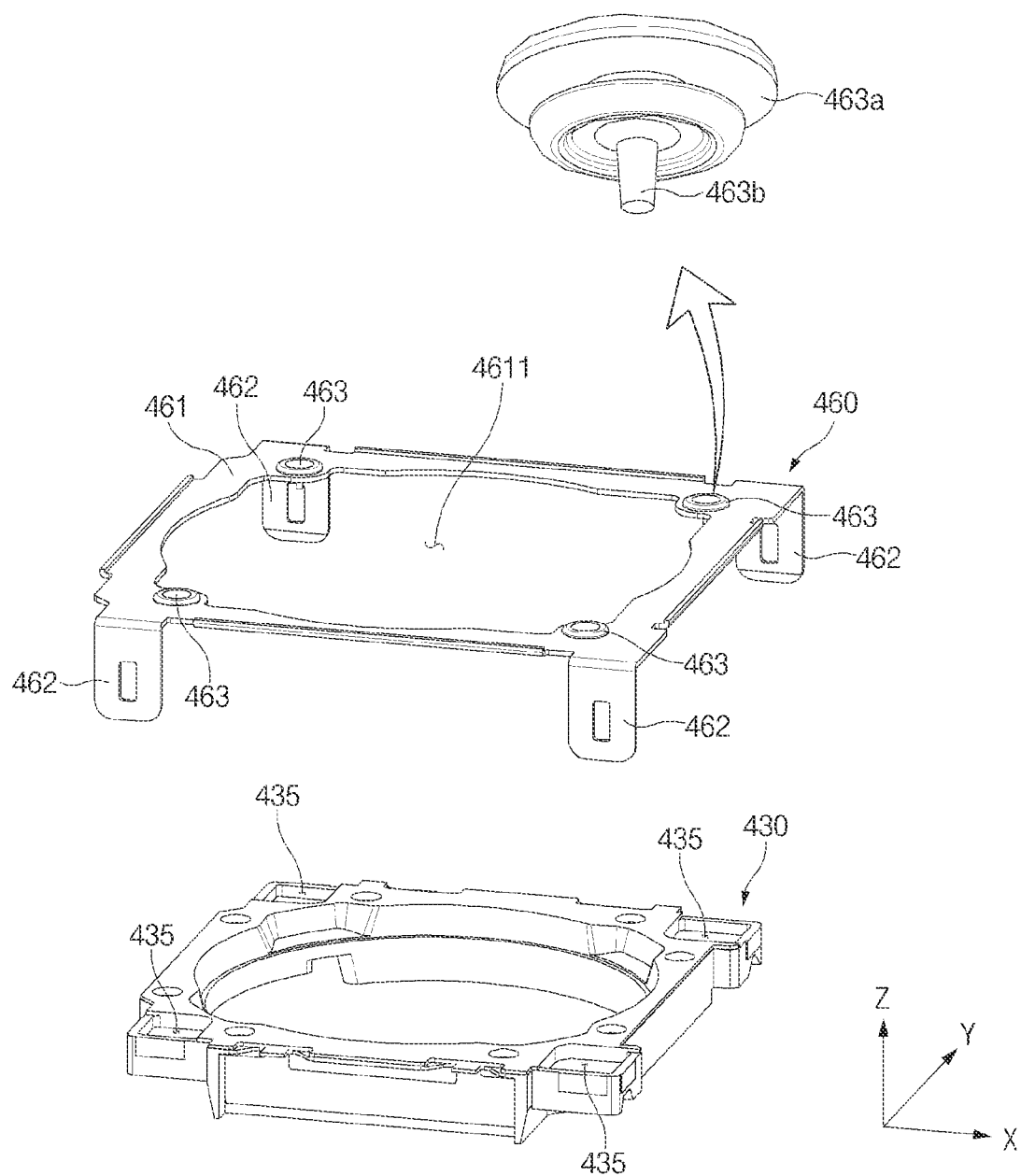
FIG. 14 is an exploded perspective view illustrating the first carrier and the stopper of the lens unit according to various embodiments.
Figure 15:
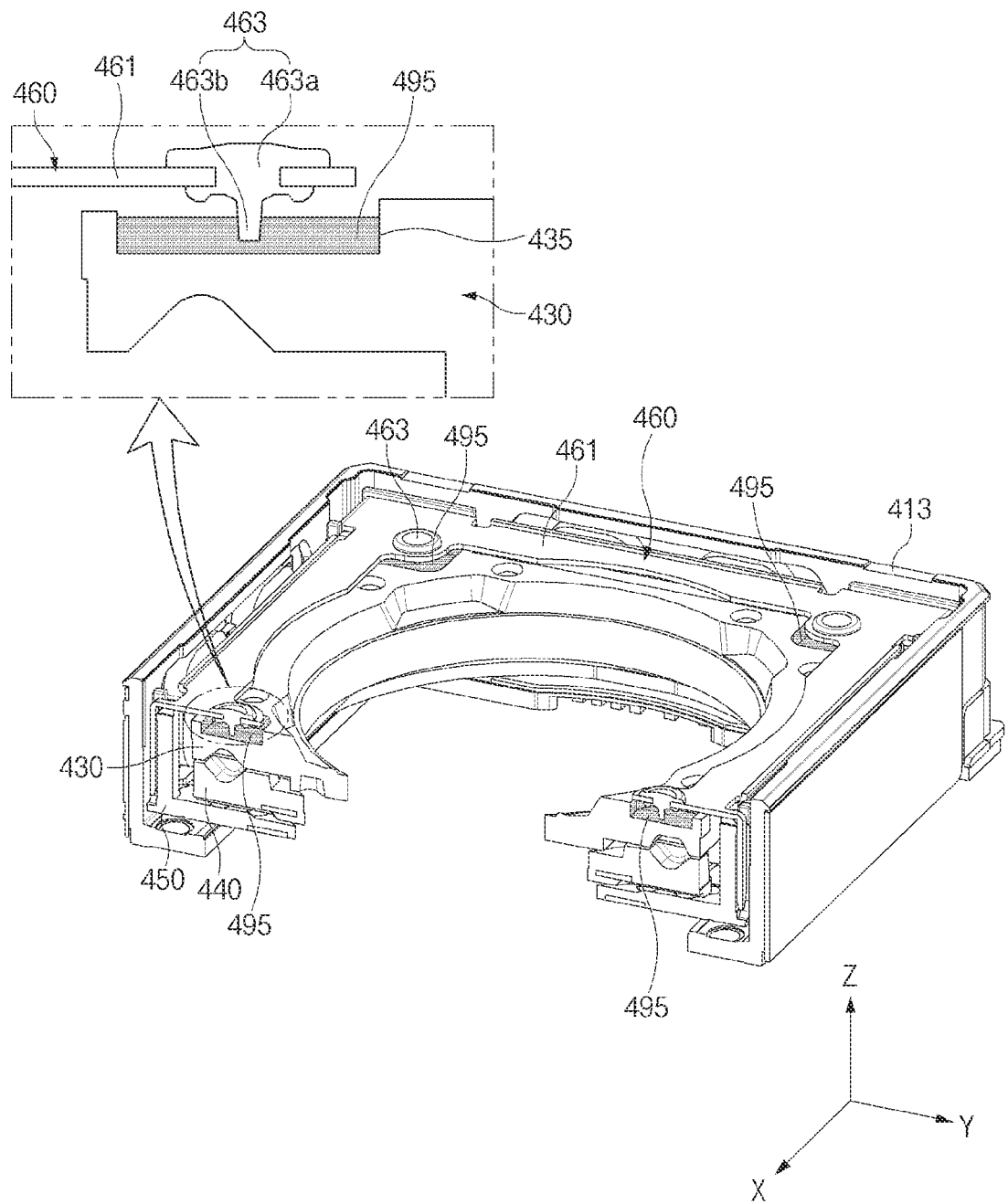
FIG. 15 is a sectional perspective view illustrating a damping structure of the camera module according to various embodiments.

FIG. 14 is an exploded perspective view illustrating the first carrier and the stopper of the lens unit according to various embodiments. FIG. 15 is a partial sectional perspective view illustrating a damping structure of the camera module according to various embodiments.

FIG. 15 may be a view in which the cover 411, the lens assembly 421, and the sensor assembly 480 are removed.

Referring to FIGS. 14 and 15, the camera module 400 according to an embodiment may include the frame 413, the first carrier 430, the guide member 440, the second carrier 450, and the stopper 460.

FIGS. 14 and 15 may be views of an embodiment in which the structure of the stopper 460 is changed, compared to the camera module 400 illustrated in FIGS. 12 and 13. For example, the stopper 460 of FIGS. 14 and 15 and the stopper 460 of FIGS. 12 and 13 may differ from each other in terms of the positions of first protrusions. Hereinafter, repetitive descriptions may not be provided, and the following description will be focused on the changed portion.

In an embodiment, the stopper 460 may include the base portion 461 having the opening 4611 formed at the center thereof, the extending portions 462 vertically extending from the outer periphery of the base portion 461, and the elastic portions 463 disposed on the corner portions of the base portion 461 so as to be adjacent to the opening 4611. The elastic portions 463 may be disposed to pass through the base portion 461 in the direction of the optical axis L (e.g., the z-axis direction). The elastic portions 463 may contain an elastic material, for example, elastomer or rubber.

In an embodiment, the elastic portions 463 may be aligned with the first receiving portions 435 in the direction of the optical axis L. For example, the elastic portions 463 may be disposed on the base portion 461 to overlap the first receiving portions 435 in the direction of the optical axis L. As many elastic portions 463 as the first receiving portions 435 and the first damping members 495 may be formed.

In an embodiment, each of the elastic portions 463 may include a head 463a and a first protrusion 463b extending from the head 463a. At least part of the first protrusion 463b may be accommodated inside the first damping member 495. For example, the stopper 460 may be configured such that at least part of the first protrusion 463b is located inside the first receiving portion 435 when the stopper 460 is coupled to the second carrier 450.

In an embodiment, as the first protrusion 463b is formed of an elastic material, the first protrusion 463b may move while deforming in the state of being accommodated inside the first damping member 495 when a movement occurs between the first carrier 430 and the stopper 460. For example, even when the first carrier 430 makes a large movement or external shock strongly acts, the first protrusion 463b may provide a damping function while being flexibly deformed.

In an embodiment, the head 463a may provide a buffer function between the cover 411 of the camera housing 410 and the stopper 460. For example, when the lens unit 420 moves in the camera housing 410 in the direction of the optical axis L, the head 463a of the elastic portion 463 may absorb or alleviate shock by making contact with the cover 411.

Figure 16:
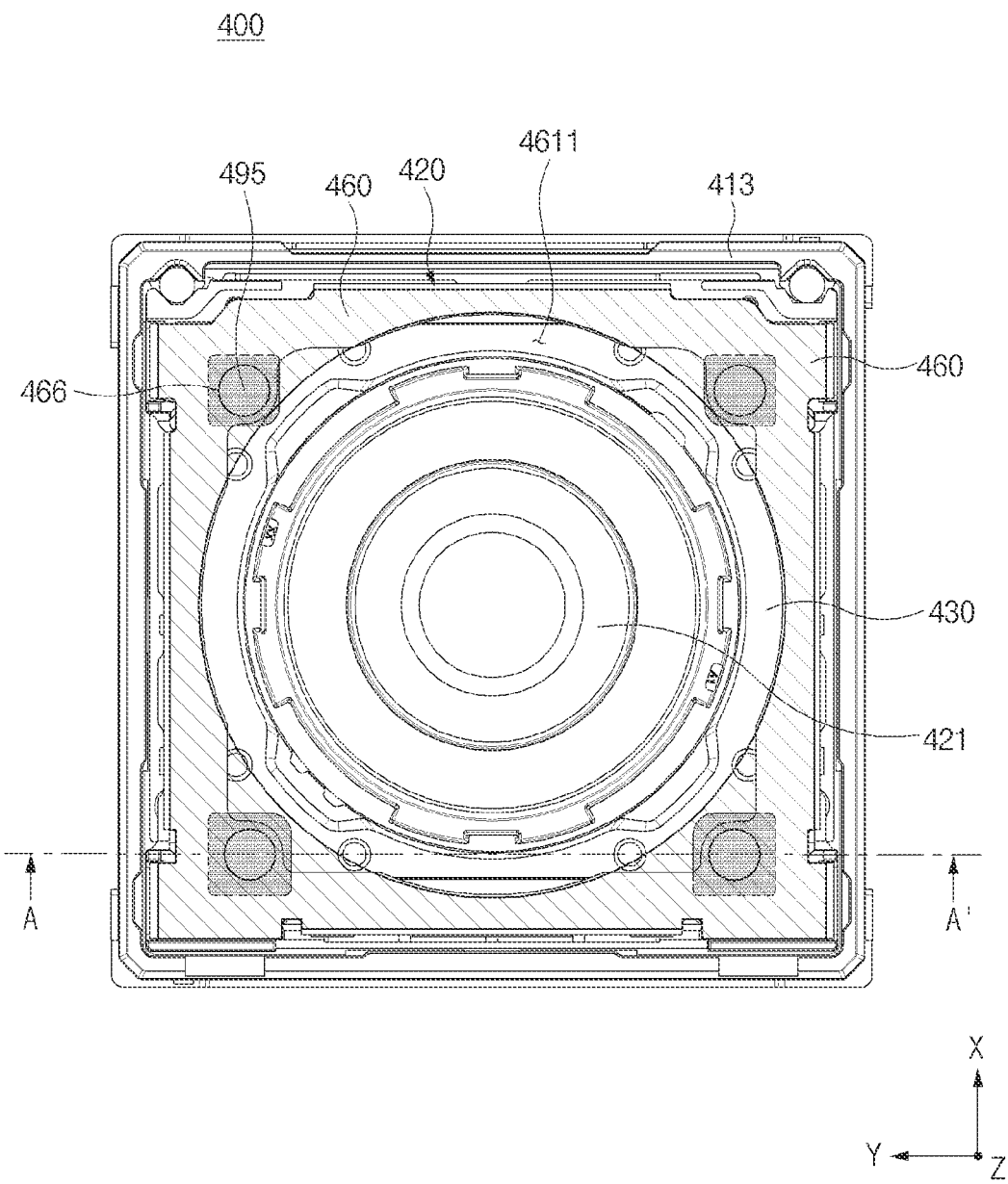
FIG. 16 is a diagram illustrating the camera module according to various embodiments.
Figure 17A:
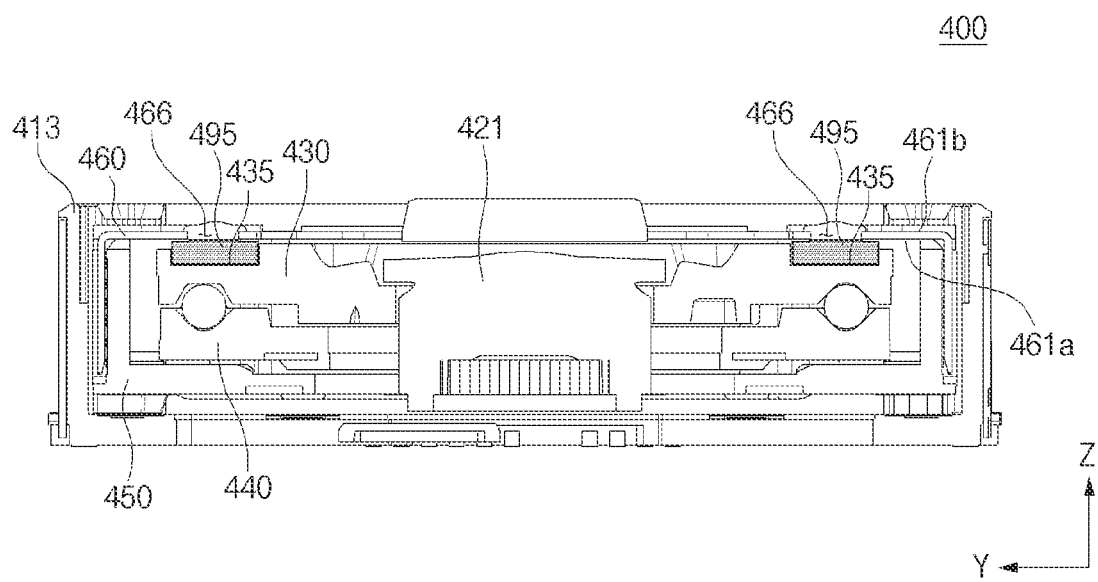
FIG. 17A is a sectional view of the camera module according to various embodiments.
Figure 17B:
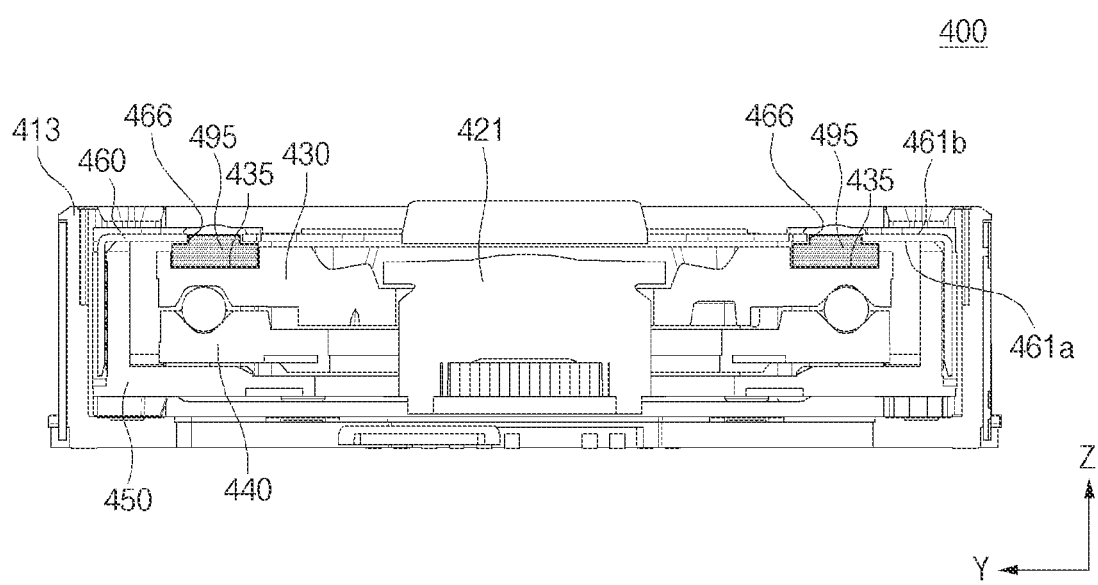
FIG. 17B is a sectional view of the camera module according to various embodiments.

FIG. 16 is a diagram illustrating the camera module according to various embodiments. FIG. 17A is a sectional view of the camera module according to various embodiments. FIG. 17B is a sectional view of the camera module according to various embodiments.

FIGS. 17A and 17B are sectional views of the camera module 400 taken along line A-A' illustrated in FIG. 16 according to various embodiments.

FIGS. 16, 17A, and 17B may be views in which the cover 411 of the camera module 400 is removed.

Referring to FIGS. 16, 17A, and 17B, the camera module 400 according to an embodiment may include the frame 413 and the lens unit 420 disposed in the frame 413. The lens unit 420 may include the lens assembly 421, the first carrier 430, the guide member 440, the second carrier 450, and the stopper 460.

FIGS. 16, 17A, and 17B may be views of an embodiment in which one surface of the stopper 460 makes contact with the first damping members 495 to form a damping structure of the lens unit 420, compared to the lens unit 420 illustrated in FIGS. 12 to 15. Hereinafter, repetitive descriptions may not be included, and the following description will be focused on the changed portion.

In an embodiment, the lens assembly 421 may be configured such that the first carrier 430 and/or the guide member 440 moves in the space between the stopper 460 and the second carrier 450. The first carrier 430 and the guide member 440 may be disposed between the stopper 460 and the second carrier 450. The guide member 440 may be disposed between the first carrier 430 and the second carrier 450.

In an embodiment, the first damping members 495 may be disposed in the first receiving portions 435 of the first carrier 430. The first damping members 495 may be located between the first carrier 430 and the stopper 460. For example, the first damping members 495 may overlap at least part of the stopper 460 in the direction of the optical axis L.

In an embodiment, the stopper 460 may be coupled to the second carrier 450 to overlap at least part of the first carrier 430 in the direction of the optical axis L. At least part of the lens assembly 421 may be accommodated in the opening 4611 of the stopper 460. For example, the opening 4611 may pass through a first surface 461a and a second surface 461b of the stopper 460 in the direction of the optical axis L. The first surface 461a of the stopper 460 may be a surface facing toward the first carrier 430 (e.g., the surface facing the −z-axis direction), and the second surface 461b may be a surface facing away from the first surface 461a (e.g., the surface facing the +z-axis direction).

In an embodiment, the first surface 461a of the stopper 460 may partially make contact with the first damping members 495. For example, the stopper 460 may be disposed such that at least part of the first surface 461a is brought into close contact with the first damping members 495. The first damping members 495 may provide a damping function by making close contact with the first surface 461a of the stopper 460.

In an embodiment, holes 466 overlapping the first damping members 495 may be formed in the stopper 460. For example, the holes 466 may overlap portions of the first damping members 495 in the direction of the optical axis L. Based on FIG. 16, at least parts of the first damping members 495 may be exposed through the holes 466 when the second surface 461b of the stopper 460 is viewed from above.

According to the embodiment illustrated in FIG. 17A, the first damping members 495 may make contact with partial areas of the first surface 461a that are adjacent to the holes 466. The first damping members 495 may reduce excessive movement and vibration of the first carrier 430 and absorb external shock by making contact with the first surface 461a. In various embodiments, the first damping members 495 may be formed by filling the first receiving portions 435 with a liquid material having viscosity and curing the liquid material in the state in which the liquid material makes contact with part of the first surface 461a. Accordingly, the first damping members 495 may be bonded to the first surface 461a of the stopper 460 with a predetermined strength.

According to the embodiment illustrated in FIG. 17B, at least parts of the first damping members 495 may be accommodated in the holes 466. The first damping members 495 may reduce excessive movement and vibration of the first carrier 430 and absorb external shock by filling the holes 466 while making contact with the first surface 461a. In various embodiments, the first damping members 495 may be formed by filling the first receiving portions 435 and the holes 466 with a liquid material having viscosity and curing the liquid material. Accordingly, the first damping members 495 may be bonded to the first surface 461a of the stopper 460 and the inside surfaces of the holes 466 with a predetermined strength.

In various embodiments, the camera module 400 may further include a damping member (e.g., second damping members 496 of FIG. 18) disposed between the frame 413 of the camera housing 410 and the stopper 460 of the lens unit 420. For example, the damping structure (e.g., the first damping members 495) described with reference to FIGS. 12 to 17B may be a structure provided inside the lens unit 420 and may provide a damping effect for an operation in which the first carrier 430 and/or the guide member 440 moves in response to an image stabilization function. The damping structure (e.g., the second damping members 496) provided between the camera housing 410 and the lens unit 420 may provide a damping effect for an operation in which the second carrier 450 (or, the entire lens unit 420) moves in the direction of the optical axis L in response to an auto focus function.

Hereinafter, the damping structure provided between the camera housing 410 and the lens unit 420 will be described in greater detail below with reference to FIGS. 18 to 23.

Figure 18:
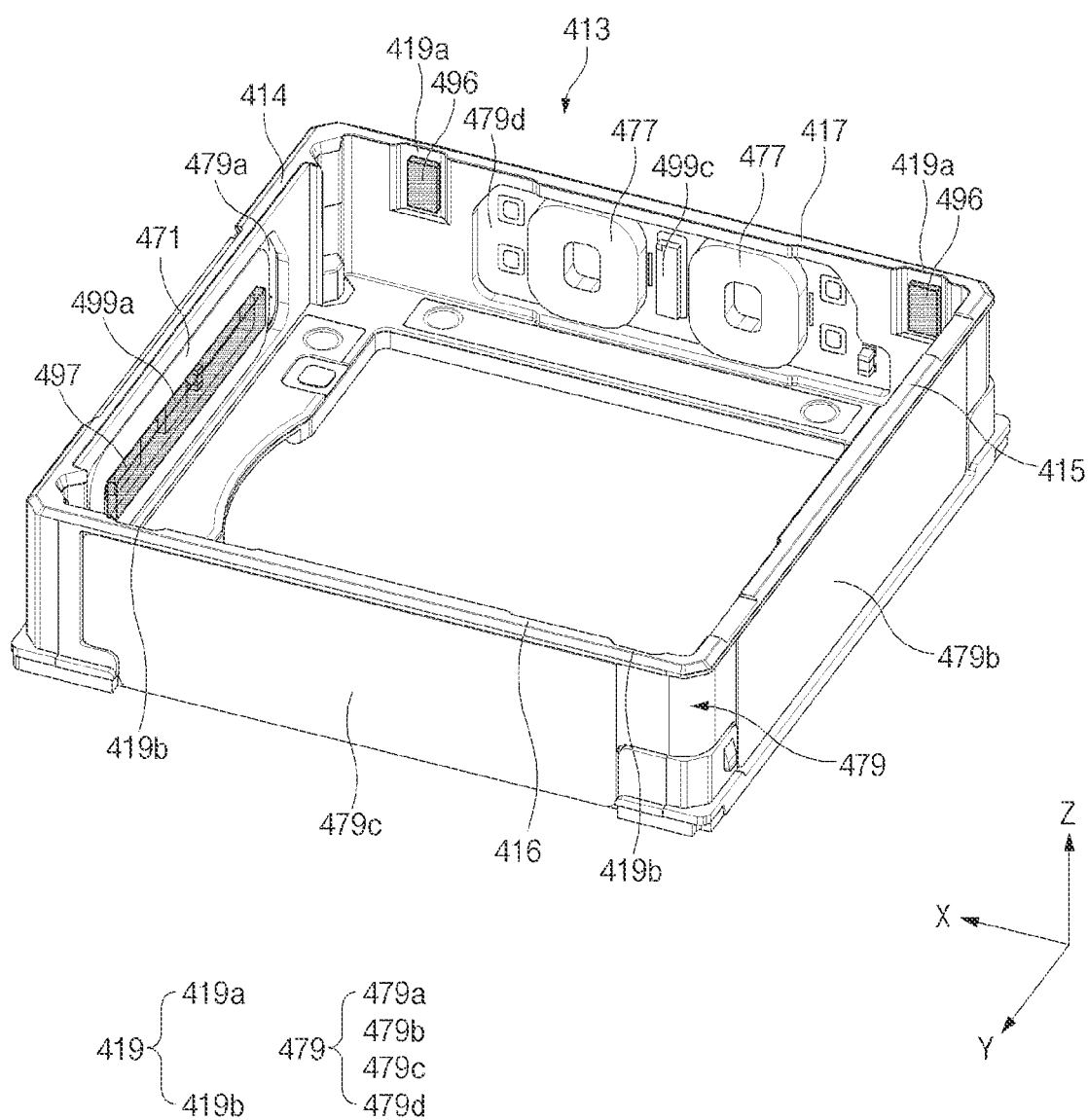
FIG. 18 is a perspective view illustrating a frame of the camera module according to various embodiments.

FIG. 18 is a perspective view illustrating the frame of the camera module according to various embodiments.

Referring to FIG. 18, the camera module 400 according to an embodiment may include the frame 413, the flexible circuit board 479 disposed to surround the frame 413, the plurality of coils 470_c disposed on the flexible circuit board 479 to face toward the inside of the frame 413, and damping members (e.g., the second damping members 496 and the third damping member 497) disposed on the sidewalls 414 and 417 of the frame 413.

In an embodiment, the frame 413 may include the first sidewall 414 in which the AF coil 471 is disposed, the second sidewall 415 facing the first sidewall 414, and the third sidewall 416 and the fourth sidewall 417 that connect opposite end portions of the first sidewall 414 and opposite end portions of the second sidewall 415. The third sidewall 416 may face the fourth sidewall 417, and the third OIS coil 477 may be disposed in the fourth sidewall 417.

In an embodiment, the flexible circuit board 479 may include the first portion 479a on which the AF coil 471 is disposed, the fourth portion 479d extending from the first portion 479a at a right angle, the second portion 479b extending from the fourth portion 479d at a right angle, and the third portion 479c extending from the second portion 479b at a right angle. A first sensor 499a may be disposed on the first portion 479a so as to be surrounded by the AF coil 471. The third OIS coil 477 and a third sensor 499c may be disposed on the fourth portion 479d.

In an embodiment, the third damping member 497 may be disposed on the first sidewall 414 of the frame 413, and the second damping members 496 may be disposed on the third sidewall 416 and the fourth sidewall 417.

In an embodiment, the frame 413 may have, on the third sidewall 416 and the fourth sidewall 417, second receiving portions 419 in which the second damping members 496 are disposed. Partial areas of the inside surfaces of the third sidewall 416 and the fourth sidewall 417 may be recessed to form the second receiving portions 419.

In an embodiment, a plurality of second receiving portions 419 may be formed on each of the third sidewall 416 and the fourth sidewall 417. For example, the second receiving portions 419 may include receiving portions 2-1 419b formed on the third sidewall 416 and receiving portions 2-2 419a formed on the fourth sidewall 417. The second receiving portions 419 may be formed to be located on opposite sides with respect to the coils disposed on the third sidewall 416 and the fourth sidewall 417. For example, receiving portions 2-2 419a formed on the fourth sidewall 417 may be configured to be located on opposite sides with respect to the third OIS coil 477. Receiving portions 2-1 419b and receiving portions 2-2 419a may be symmetric to each other. For example, the second receiving portions 419 may be configured such that receiving portions 2-1 419b and receiving portions 2-2 419a are symmetric to each other with respect to the first sidewall 414 and the second sidewall 415. However, the number and/or positions of second receiving portions 419 are not limited to the illustrated embodiment.

In an embodiment, the second damping members 496 may be fixedly disposed in the second receiving portions 419. For example, portions of the second damping members 496 may be accommodated in the second receiving portions 419 to face toward the inside of the frame 413. The second damping members 496 may be formed by the same method as, or a method similar to, that of the first damping members 495 described with reference to FIGS. 12 to 17B.

In an embodiment, the third damping member 497 may be located on the first sidewall 414 of the frame 413. The third damping member 497 may be disposed inside the AF coil 471 located in the first sidewall 414. For example, the third damping member 497 may be accommodated inside the AF coil 471 such that at least part thereof is surrounded by the AF coil 471. Likewise to the second damping members 496, the third damping member 497 may be formed by the same method as, or a method similar to, that of the first damping members 495 described with reference to FIGS. 12 to 17B.

In an embodiment, the third damping member 497 may overlap the first sensor 499a located inside the AF coil 471. The third damping member 497 may be bonded to the first portion 479a of the flexible circuit board 479 and the AF coil 471 with a predetermined strength. For example, the third damping member 497 may be formed by filling the inside of the AF coil 471 with a liquid material having viscosity and curing the liquid material in the state in which the AF coil 471 and the first sensor 499a are mounted on the first portion 479a of the flexible circuit board 479. However, a method of forming the third damping member 497 is not limited to the above-described example.

Figure 19A:
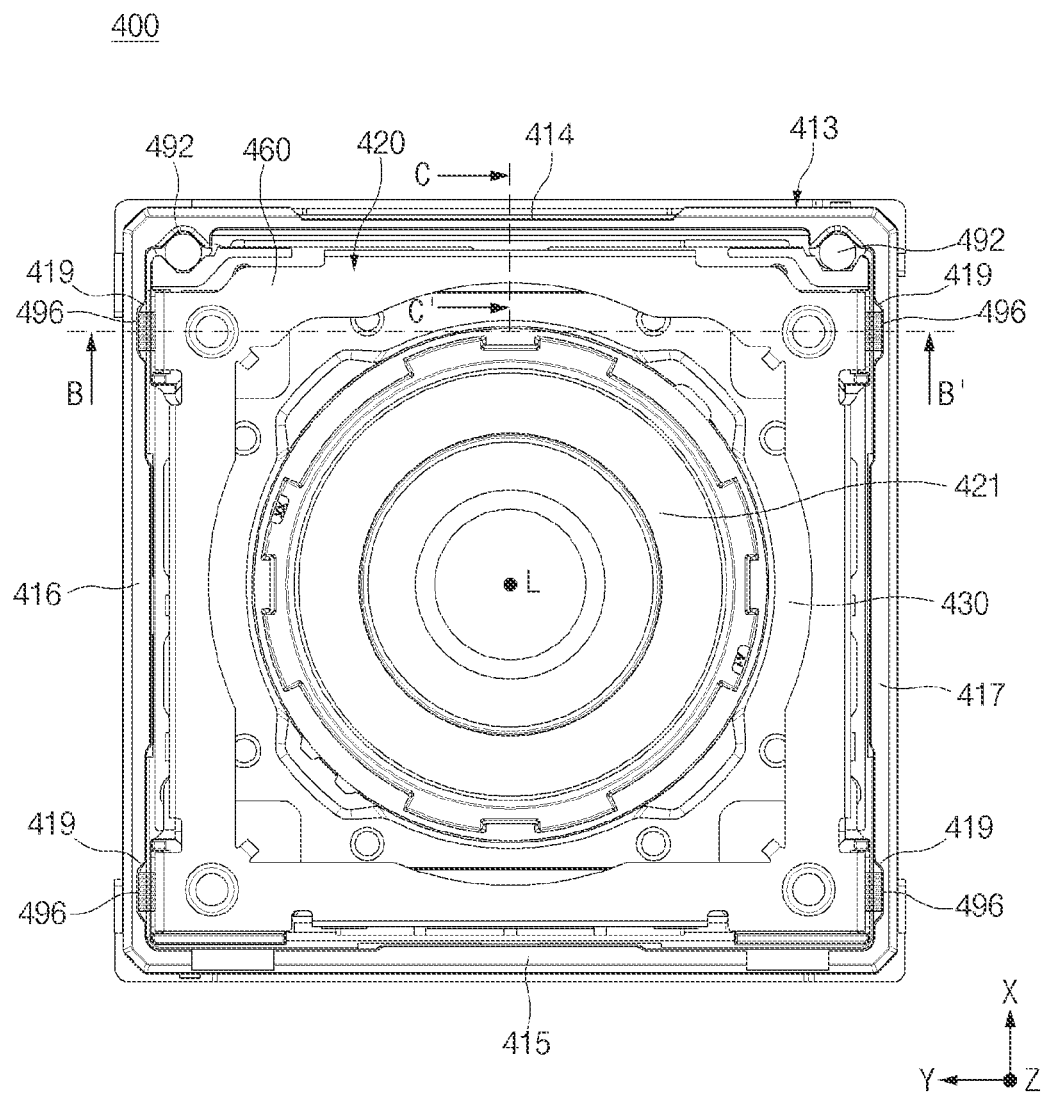
FIG. 19A is a diagram illustrating the camera module according to various embodiments.
Figure 19B:
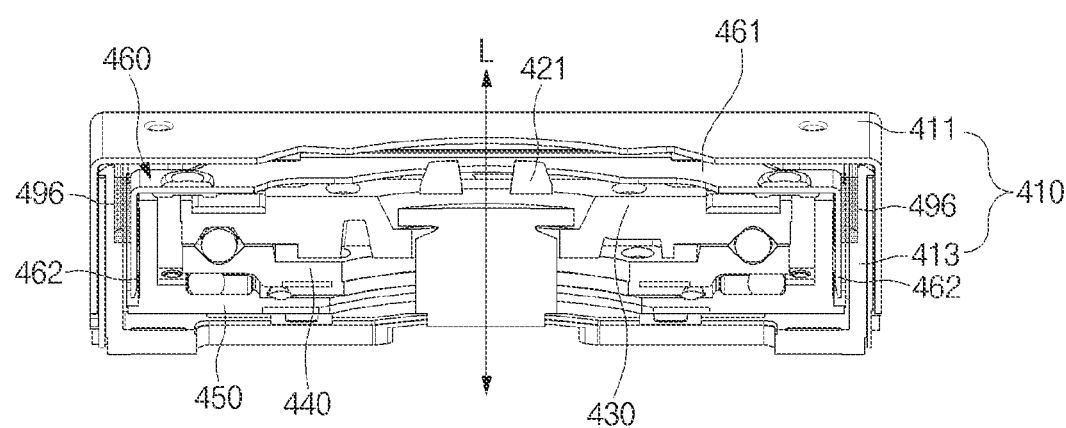
FIG. 19B is a sectional view of the camera module according to various embodiments.

FIG. 19A is a diagram illustrating the camera module according to various embodiments. FIG. 19B is a sectional view of the camera module according to various embodiments.

FIG. 19B is a sectional view of the camera module 400 taken along line B-B' illustrated in FIG. 19A according to various embodiments.

FIG. 19A may be a view in which the cover 411 of the camera housing 410 is removed. FIG. 19B may be a view in which the sensor assembly 480 of the camera module 400 is removed.

Referring to FIGS. 19A and 19B, the camera module 400 according to an embodiment may include the camera housing 410, the lens unit 420, and the second damping members 496 (e.g., the second damping members 496 of FIG. 18).

In an embodiment, the camera housing 410 may include the cover 411 and the frame 413 that form the space in which the lens unit 420 is accommodated. The second damping members 496 may be disposed on some of the sidewalls of the frame 413.

In an embodiment, at least part of the lens unit 420 may be accommodated in the camera housing 410. The lens unit 420 may be movable in the direction of the optical axis L in the camera housing 410. For example, the lens unit 420 may be configured such that the second carrier 450 moves in the direction of the optical axis L relative to the frame 413 through the ball guide structure including the first ball 492. The lens assembly 421, the first carrier 430, the guide member 440, and the stopper 460 may move together with the second carrier 450.

In an embodiment, the second damping members 496 may be disposed between the frame 413 of the camera housing 410 and the stopper 460 of the lens unit 420. The second damping members 496 may be fixedly disposed on the third sidewall 416 and the fourth sidewall 417 of the frame 413. The second damping members 496 may make contact with the lens unit 420 accommodated in the frame 413. For example, the second damping members 496 may make contact with portions of the stopper 460 of the lens unit 420.

In an embodiment, the second damping members 496 may be at least partially accommodated in the second receiving portions 419. The second damping members 496 may be located between the second receiving portions 419 formed on the third sidewall 416 and the fourth sidewall 417 and the extending portions 462 of the stopper 460. For example, the extending portions 462 may be spaced apart from the third sidewall 416 and the fourth sidewall 417 at a specified interval, and the second damping members 496 may be disposed in the separation spaces between the extending portions 462 and the third sidewall 416 (or, the second receiving portions 419) and the separation spaces between the extending portions 462 and the fourth sidewall 417 (or, the second receiving portions 419). The second damping members 496 may have a predetermined thickness such that opposite surfaces are brought into close contact with the second receiving portions 419 and the extending portions 462.

According to embodiments of the disclosure, the second damping members 496 may provide a damping function between the camera housing 410 and the lens unit 420. For example, the second damping members 496 may reduce high-frequency noise and shake generated in an operation (e.g., an AF operation) in which the lens unit 420 moves in the direction of the optical axis L relative to the camera housing 410 and may alleviate shock applied from the outside.

Figure 20:
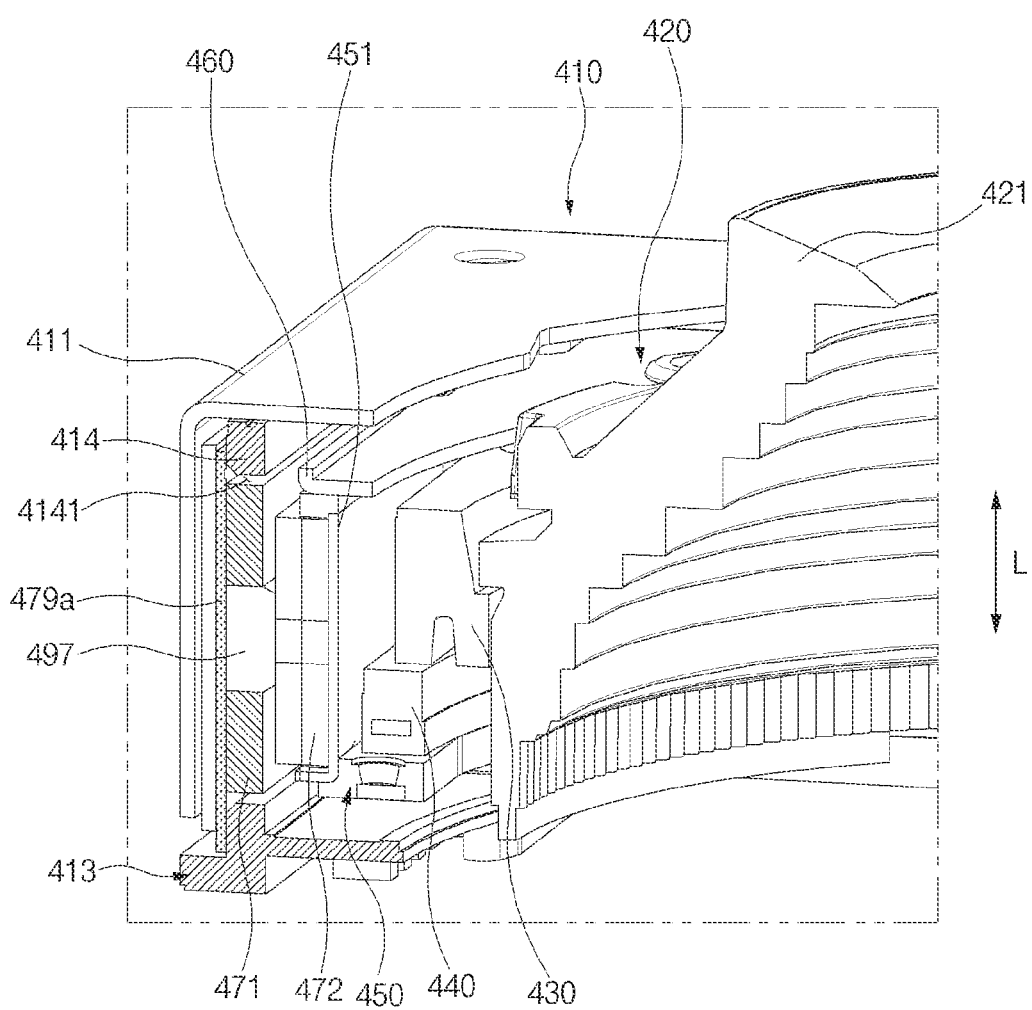
FIG. 20 is a sectional perspective view of the camera module according to various embodiments.

FIG. 20 is a sectional perspective view illustrating a section of the camera module according to various embodiments.

FIG. 20 illustrates a section of the camera module 400 taken along line C-C' illustrated in FIG. 19A according to various embodiments.

Referring to FIG. 20, the camera module 400 according to an embodiment may include the camera housing 410, the lens unit 420, and the third damping members 497 (e.g., the third damping member 497 of FIG. 18).

In an embodiment, the camera housing 410 may include the cover 411 and the frame 413.

In an embodiment, the frame 413 may include the first sidewall 414 on which the first portion 479a of the flexible circuit board 479 is disposed. The first sidewall 414 may have the first opening area 4141 formed therein in which the AF coil 471 is located. The AF coil 471 disposed on the first portion 479a of the flexible circuit board 479 may face the AF magnet 472, which is located in the frame 413, through the first opening area 4141.

In an embodiment, the lens unit 420 may include the lens assembly 421, the first carrier 430, the guide member 440, the second carrier 450, and the stopper 460.

In an embodiment, the AF magnet 472 may be disposed on the second carrier 450. For example, the AF magnet 472 may be disposed on the fifth sidewall 451 facing the first sidewall 414 of the camera housing 410 (e.g., the frame 413), among the sidewalls of the second carrier 450. For example, the AF magnet 472 may face the AF coil 471 located in the first sidewall 414 (e.g., the first opening area 4141) of the frame 413. The AF magnet 472 and the AF coil 471 may be disposed to be spaced apart from each other. For example, the lens unit 420 and the frame 413 may be spaced apart from each other at a predetermined interval to secure a space for relative movement. Referring to FIG. 19A together, the fifth sidewall 451 of the second carrier 450 and the first sidewall 414 of the frame 413 may be spaced apart from each other at a predetermined interval by the first ball 492 disposed therebetween. The AF magnet 472 and the AF coil 471 may be disposed to be spaced apart from each other in the space between the first sidewall 414 and the fifth sidewall 451.

In an embodiment, the third damping member 497 may be disposed inside the AF coil 471 and may make contact with the AF magnet 472. The third damping member 497 may be brought into close contact with the AF magnet 472 in the state of being disposed in close contact with the first portion 479a of the flexible circuit board 479 and the AF coil 471. As described above with reference to FIG. 18, the third damping member 497 may be bonded to the first portion 479a and the AF coil 471 with a predetermined strength.

According to embodiments of the disclosure, the third damping member 497 may provide a damping function between the camera housing 410 and the lens unit 420. For example, the third damping member 497 may make contact with the AF magnet 472 that moves in the direction of the optical axis L relative to the AF coil 471, thereby reducing high-frequency noise and shake generated in an operation (e.g., an AF operation) in which the lens unit 420 moves in the direction of the optical axis L relative to the camera housing 410 and alleviating shock applied from the outside.

Figure 21:
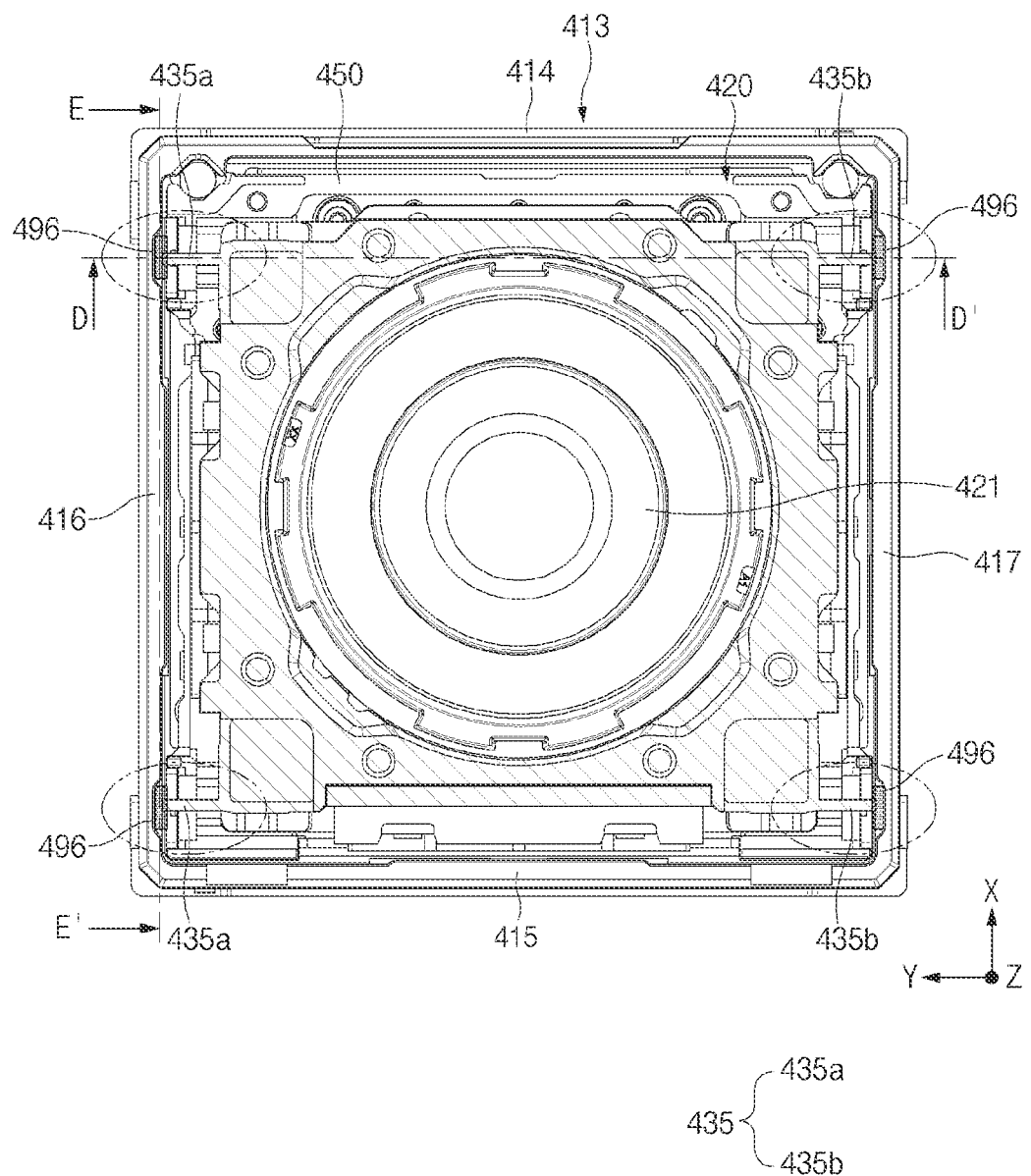
FIG. 21 is a diagram illustrating the camera module according to various embodiments.
Figure 22A:
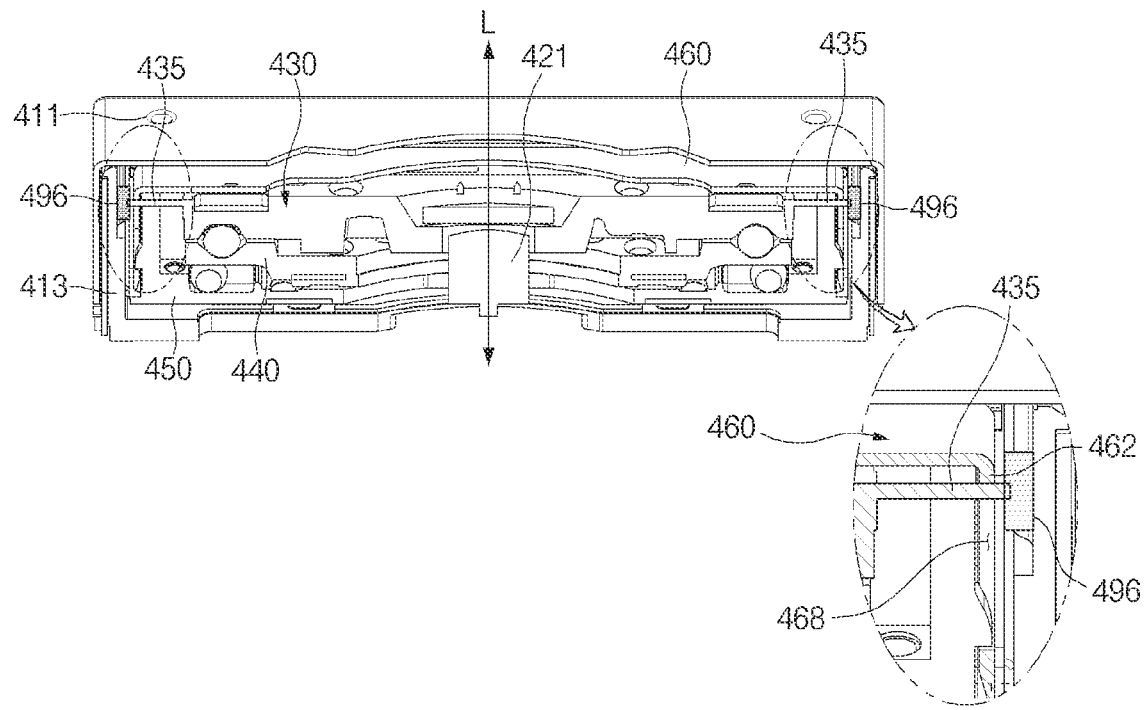
FIG. 22A is a sectional view of the camera module according to various embodiments.
Figure 22B:
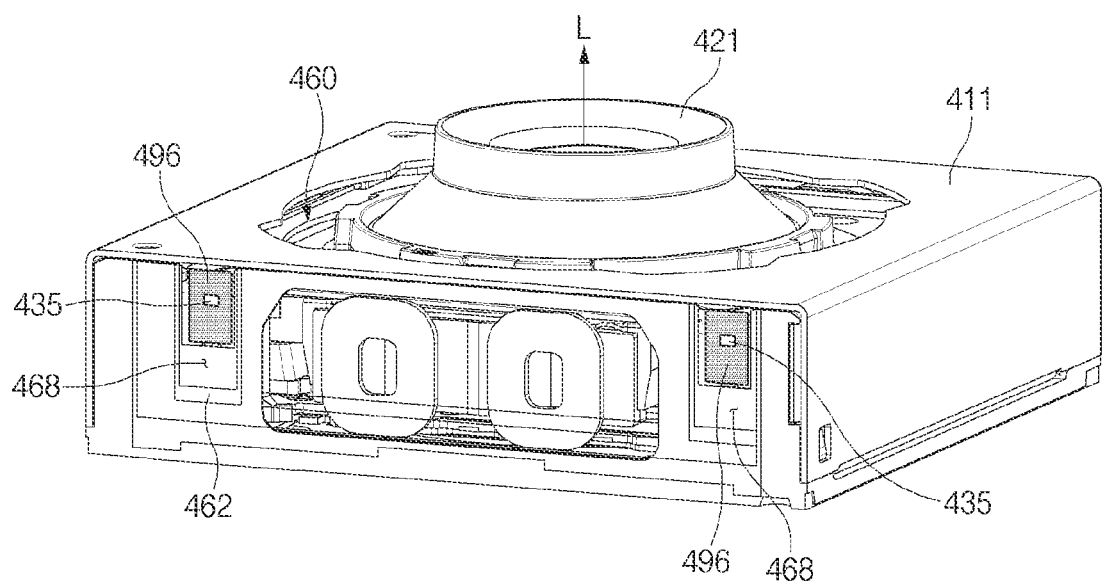
FIG. 22B is a sectional perspective view of the camera module according to various embodiments.

FIG. 21 is a diagram illustrating the camera module according to various embodiments. FIG. 22A is a sectional view of the camera module according to various embodiments. FIG. 22B is a partial sectional perspective view of the camera module according to various embodiments.

FIG. 22A illustrates a section of the camera module 400 taken along line D-D' illustrated in FIG. 21 according to various embodiments. FIG. 22B illustrates a section of the camera module 400 taken along line E-E' illustrated in FIG. 21 according to various embodiments.

Referring to FIGS. 21, 22A, and 22B, the camera module 400 according to an embodiment may include the camera housing 410, the lens unit 420, and the second damping members 496 (e.g., the second damping members 496 of FIG. 18).

In an embodiment, the second damping members 496 may be disposed on the frame 413 of the camera housing 410. For example, the second damping members 496 may be disposed on the third sidewall 416 and the fourth sidewall 417 of the frame 413. At least parts of second protrusions 436 formed on the lens unit 420 may be accommodated in the second damping members 496.

In an embodiment, the lens unit 420 may include the lens assembly 421, the first carrier 430, the guide member 440, the second carrier 450, and the stopper 460.

In an embodiment, the first carrier 430 of the lens unit 420 may include the second protrusions 436 at least partially disposed in the second damping members 496. The second protrusions 436 may extend from portions of the first carrier 430 in a direction substantially perpendicular to the optical axis L. For example, the second protrusions 436 may extend substantially parallel to the first sidewall 414 and the second sidewall 415.

In an embodiment, the second protrusions 436 may extend toward the third sidewall 416 and the fourth sidewall 417 from the edges (e.g., the peripheries facing the y-axis direction) facing the third sidewall 416 and the fourth sidewall 417 among the edges of the first carrier 430. For example, the second protrusions 436 may include protrusions 2-1 436a extending toward the third sidewall 416 from a first edge (e.g., the edge facing the +y-axis direction) of the first carrier 430 and protrusions 2-2 436b extending toward the fourth sidewall 417 from a second edge (e.g., the edge facing the −y-axis direction). As many second protrusions 436 as the second damping members 496 may be formed. However, the number of second protrusions 436 is not limited to the illustrated embodiment.

In an embodiment, the second protrusions 436 may extend from the first carrier 430 to the second damping members 496 across the second carrier 450. For example, when the first carrier 430 is viewed from above based on FIG. 21, the second protrusions 436 may overlap portions of the second carrier 450 in the direction of the optical axis L.

In an embodiment, the second protrusions 436 may pass through at least parts of the stopper 460 and may extend toward the second damping members 496. For example, the second protrusions 436 may pass through the extending portions 462 (e.g., the extending portions 462 of FIG. 19B) of the stopper 460 that make contact with the second damping members 496. The extending portions 462 may have through-holes 468 formed therein into which at least parts of the second protrusions 436 are inserted. The second protrusions 436 may extend such that the second protrusions 436 pass through the through-holes 468 and are at least partially disposed inside the second damping members 496. According to various embodiments, the through-holes 468 may be referred to as stopping recesses (e.g., the stopping recesses 464 of FIG. 8) by which stopping protrusions (e.g., the stopping protrusions 457 of FIG. 8) are stopped. For example, the stopping recesses 464 may be formed in a predetermined size such that at least parts of the second protrusions 436 are inserted into the stopping recesses 464, the stopping protrusions 457 may be stopped by the stopping recesses 464, and the second protrusions 436 may pass through the stopping recesses 464 and may extend to the second damping members 496.

In an embodiment, the second protrusions 436 may be at least partially disposed inside the second damping members 496 and may provide a damping function in response to a movement of the first carrier 430 in the direction of the optical axis L relative to the frame 413 or a movement of the first carrier 430 relative to the frame 413 in the direction of the first shift axis S1 and the direction of the second shift axis S2 that are substantially perpendicular to the optical axis L. For example, the second protrusions 436 may be fit into the second damping members 496, or may be at least partially bonded to the second damping members 496 with a predetermined strength.

According to embodiments of the disclosure, the second damping members 496 may interact with the second protrusions 436, thereby reducing high-frequency noise and shake generated in an operation (e.g., an AF operation) in which the lens unit 420 (e.g., the first carrier 430) moves in the direction of the optical axis L relative to the camera housing 410 (e.g., the frame 413) and/or an operation (e.g., an OIS operation) in which the lens unit 420 moves in a direction substantially perpendicular to the optical axis L and alleviating shock applied from the outside.

Figure 23:
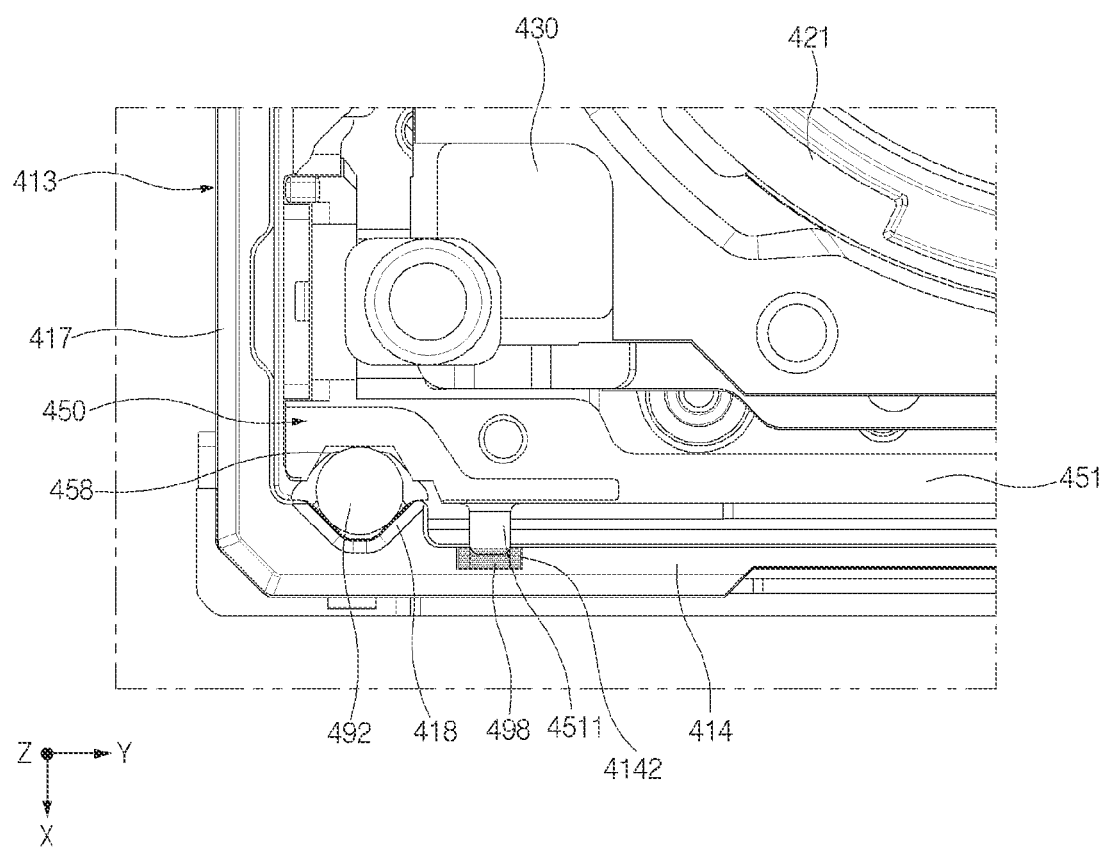
FIG. 23 is a diagram illustrating the frame and a second carrier of the camera module according to various embodiments.

FIG. 23 is a diagram illustrating the frame and the second carrier of the camera module according to various embodiments.

Referring to FIG. 23, the camera module 400 according to an embodiment may include the frame 413, the first carrier 430, the second carrier 450, and a fourth damping member 498.

In an embodiment, the fourth damping members 498 may be disposed on the first sidewall 414 of the frame 413. For example, the frame 413 may have, on the first sidewall 414 thereof, a third receiving portion 4142 in which the fourth damping member 498 is disposed. A partial area of the inside surface of the first sidewall 414 may be recessed to form the third receiving portion 4142. For example, the third receiving portion 4142 may be formed in an area adjacent to the second recess 418 formed on the first sidewall 414.

In an embodiment, the second carrier 450 may include a fourth protrusion 4511, at least part of which is disposed inside the fourth damping member 498. The fourth protrusions 4511 may extend from a portion of the second carrier 450 toward the first sidewall 414 of the frame 413. For example, the fourth protrusion 4511 may protrude by a predetermined length toward the first sidewall 414 from the fifth sidewall 451 of the second carrier 450 that faces the first sidewall 414. The fourth protrusion 4511 may be aligned with the third receiving portion 4142, which is formed on the first sidewall 414, in a direction substantially perpendicular to the optical axis L. For example, when the first sidewall 414 and the fifth sidewall 451 are viewed, the fourth protrusion 4511 may overlap the third receiving portion 4142. For example, the fourth protrusion 4511 may be fit into the fourth damping member 498, or may be at least partially bonded to the fourth damping member 498 with a predetermined strength.

In an embodiment, the fourth damping member 498 may be disposed between the frame 413 of the camera housing 410 and the second carrier 450. The fourth damping member 498 may be fixedly disposed on the first sidewall 414 of the frame 413. For example, the fourth damping member 498 may be accommodated in the third receiving portion 4142 formed on the first sidewall 414. The fourth damping member 498 may be brought into close contact with the fourth protrusion 4511 of the second carrier 450. The fourth damping member 498 may be formed by the same method as, or a method similar to, that of the first damping members 495 described with reference to FIGS. 12 to 17B.

According to embodiments of the disclosure, the fourth damping member 498 may provide a damping function between the frame 413 of the camera housing 410 and the second carrier 450 of the lens unit 420. For example, the fourth damping member 498 may interact with the third protrusion 4511, thereby reducing high-frequency noise and shake generated in an operation (e.g., an AF operation) in which the second carrier 450 moves in the direction of the optical axis L relative to the frame 413 and alleviating shock applied from the outside.

In various embodiments, some of the damping members (e.g., the first damping member 495, the second damping member 496, the third damping member 497, and/or the fourth damping member 498) included in the camera module 400 may have a first viscosity in a cured state, and the first viscosity may be substantially the same as, or greater than, a second viscosity of a material (e.g., grease) that provides a rolling frictional force such that the plurality of balls (e.g., the first ball 492, the second ball 493, and/or the third ball 494) roll in the recesses (e.g., the first recess 458, the second recess 418, the third recess 433, the fourth recess 443, the fifth recess 444, and/or the sixth recess 459).

In various embodiments, some of the damping members (e.g., the first damping member 495, the second damping member 496, the third damping member 497, and/or the fourth damping member 498) included in the camera module 400 may be formed to have a specified viscosity. For example, the damping members 495, 496, 497, and 498 may have a viscosity of about 75000 mPa·s to about 95000 mPa·s, but is not limited thereto.

In various embodiments, at least some of the damping members (e.g., the first damping member 495, the second damping member 496, the third damping member 497, and/or the fourth damping member 498) included in the camera module 400 may be formed using a UV curable resin composition. Some of the damping members 495, 496, 497, and 498 may be cured under a condition of a specified UV intensity and/or a specified UV energy amount (UV dose). For example, a UV energy amount for curing some of the damping members 495, 496, 497, and 498 may range from about 4000 mJ/cm$^2$ to about 5400 mJ/cm$^2$, but is not limited thereto. For example, the intensity of UV irradiated to cure some of the damping members 495, 496, 497, and 498 may be about 400 mW/cm$^2$, but is not limited thereto. A UV energy amount may be the product of UV intensity and irradiation time (e.g., UV energy amount (mJ/cm$^2$)=UV intensity (mW/cm$^2$)*irradiation time (sec)). For example, some of the damping members 495, 496, 497, and 498 may be cured by irradiating UV having an intensity of 400 mW/cm$^2$ for about 10 seconds to about 13.5 seconds. However, the properties and/or the curing conditions of the damping members 495, 496, 497, and 498 are not limited to the above-described examples. According to various embodiments, the damping members 495, 496, 497, and 498 may be formed using a thermosetting composition, or may be formed using a hybrid curing method in which UV curing and thermal curing are combined, in consideration of applicability of a manufacturing process and an increase in yield.

Figure 24A:
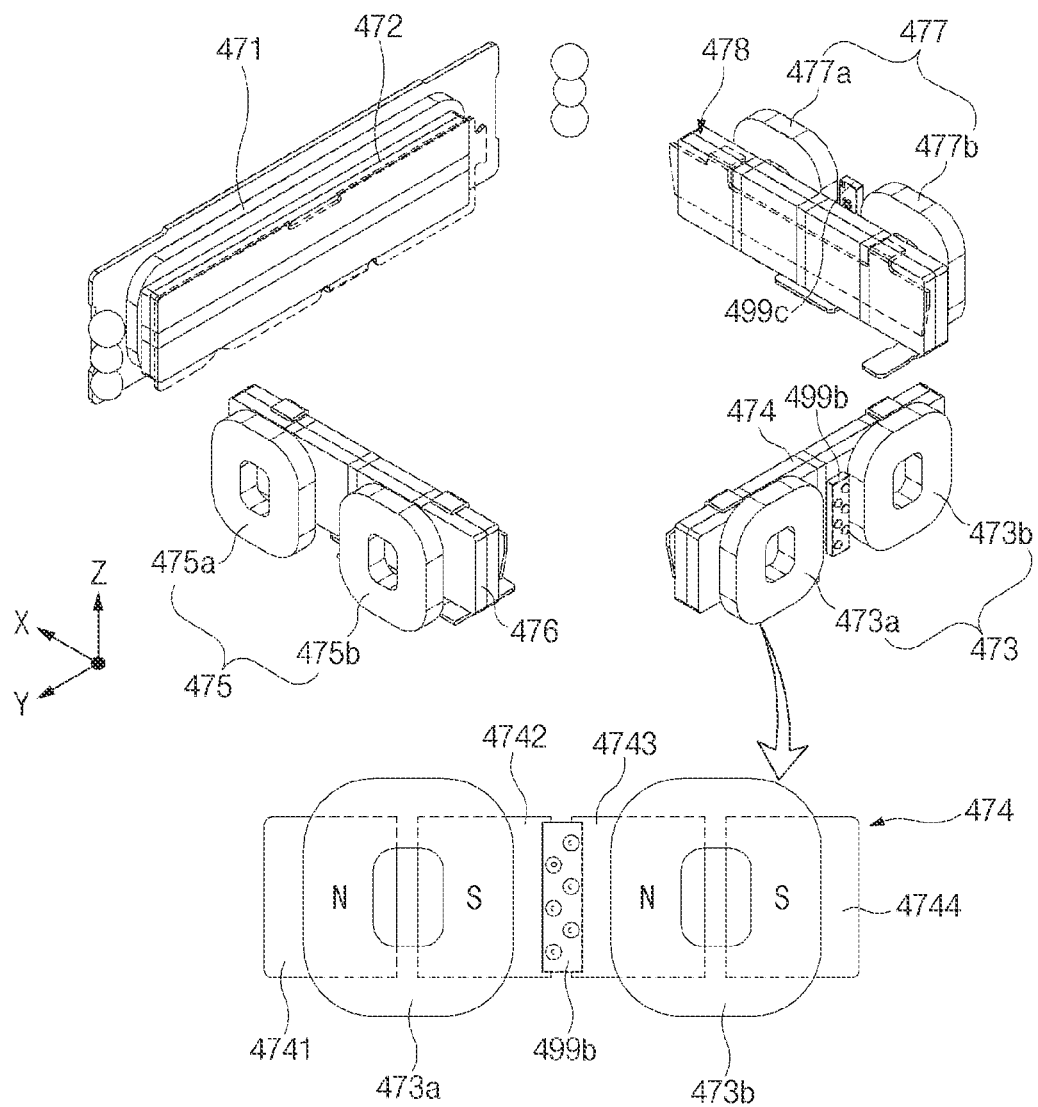
FIG. 24A is an exploded perspective view illustrating a driving member of the camera module according to various embodiments.
Figure 24B:
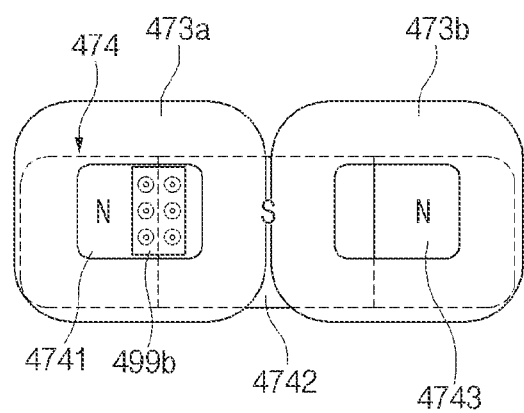
FIG. 24B is a diagram illustrating the driving member of the camera module according to various embodiments.

FIG. 24A is an exploded perspective view illustrating the driving member of the camera module according to various embodiments. FIG. 24B is a diagram illustrating the driving member of the camera module according to various embodiments.

Referring to FIGS. 24A and 24B, the driving member 470 of the camera module 400 according to an embodiment may include the plurality of coils 470_c and the plurality of magnets 470_m disposed to face each other.

In an embodiment, at least one of the plurality of coils 470_c or the plurality of magnets 470_m may be disposed on a fixed structure (e.g., the camera housing 410), and the other may be disposed on a movable structure (e.g., the lens unit 420) that moves relative to the fixed structure. Referring to FIGS. 6A and 6B together, the plurality of coils 470_c may be disposed on the frame 413 of the camera housing 410, and the plurality of magnets 470_*m* may be disposed on the lens carrier 422 of the lens unit 420 to face the plurality of coils 470_*c*. However, the positions of the plurality of coils 470_*c* and the plurality of magnets 470_*m* are not limited to the above-described example and may be interchanged.

In an embodiment, the plurality of coils 470_*c* may include the AF coil 471, the first OIS coil 473, the second OIS coil 475, and the third OIS coil 477. The plurality of magnets 470_*m* may include the AF magnet 472, the first OIS magnet 474, the second OIS magnet 476, and the third OIS magnet 478 that correspond to the plurality of coils 470_*c*, respectively.

In an embodiment, the AF magnet 472 and the AF coil 471 may move the lens (e.g., the second carrier 450 of FIGS. 9A and 9B) in the direction of the optical axis L (e.g., a direction parallel to the z-axis) in relation to an auto focus function. For example, when an electric current is applied to the AF coil 471, a magnetic force (e.g., Lorentz force) facing the +z-axis direction or the −z-axis direction may be applied to the AF coil 471 depending on the direction of the electric current. As the AF coil 471 is relatively fixed, a force may act on the AF magnet 472 in the direction opposite to the direction of the Lorentz force. Accordingly, the AF magnet 472 may move in the z-axis direction relative to the AF coil 471.

In an embodiment, the first OIS magnet 474 and the first OIS coil 473 may move the lens (e.g., the guide member 440 of FIGS. 9A and 9B) in the direction of the first shift axis (e.g., the first shift axis S1 of FIG. 11) perpendicular to the optical axis L (e.g., a direction parallel to the y-axis) in relation to an image stabilization function. For example, when an electric current is applied to the first OIS coil 473, a magnetic force (e.g., Lorentz force) facing the +y-axis direction or the −y-axis direction may be applied to the first OIS coil 473 depending on the direction of the electric current. As the first OIS coil 473 is relatively fixed, a force may act on the first OIS magnet 474 in the direction opposite to the direction of the Lorentz force. Accordingly, the first OIS magnet 474 may move in the y-axis direction relative to the first OIS coil 473.

In an embodiment, the second OIS magnet 476, the second OIS coil 475, the third OIS magnet 478, and the third OIS coil 477 may move the lens (e.g., the first carrier 430 of FIGS. 9A and 9B) in the direction of the second shift axis (e.g., the second shift axis S2 of FIG. 11) perpendicular to the optical axis L and the first shift axis S1 (e.g., a direction parallel to the x-axis) in relation to an image stabilization function. For example, when an electric current is applied to the second OIS coil 475 and the third OIS coil 477, a magnetic force (e.g., Lorentz force) facing the +x-axis direction or the −x-axis direction may be applied to the second OIS coil 475 and the third OIS coil 477 depending on the direction of the electric current. As the second OIS coil 475 and the third OIS coil 477 are relatively fixed, a force may act on the second OIS magnet 476 and the third OIS magnet 478 in the direction opposite to the direction of the Lorentz force. Accordingly, the second OIS magnet 476 and the third OIS magnet 478 may move in the x-axis direction relative to the second OIS coil 475 and the third OIS coil 477.

In an embodiment, the camera module 400 may include sensors for sensing the relative positions between the plurality of coils 470_*c* and the plurality of magnets 470_*m*. The sensors may include the first sensor (e.g., the first sensor 499*a* of FIG. 18), the second sensor 499*b*, and the third sensor 499*c*. The first sensor 499*a* may sense a change in position between the AF magnet 472 and the AF coil 471. The second sensor 499*b* may sense a change in position between the first OIS magnet 474 and the first OIS coil 473. The third sensor 499*c* may sense a change in position between the third OIS magnet 478 and the third OIS coil 477.

According to embodiments of the disclosure, the camera module 400 may be configured such that each of the OIS coils 473, 475, and 477 includes at least two coils to improve a correction angle and/or correction performance in relation to an image stabilization function. Accordingly, an electromagnetic force sufficient to implement a movement of the lens assembly 421 may be secured. For example, the first OIS coil 473 may include a first coil 473*a* and a second coil 473*b* that are disposed to face the first OIS magnet 474. The second OIS coil 475 may include a third coil 475*a* and a fourth coil 475*b* that are disposed to face the second OIS magnet 476. The third OIS coil 477 may include a fifth coil 477*a* and a sixth coil 477*b* that are disposed to face the third OIS magnet 478. However, the number of coils included in each of the OIS coils 473, 475, and 477 is not limited to two, and each of the OIS coils 473, 475, and 477 may include three or more coils.

Hereinafter, an arrangement of the OIS magnets 474, 476, and 478 having four magnetic poles and the OIS coils 473, 475, and 477 will be described with reference to FIG. 24A. Although the following description is given based on the first OIS magnet 474 and the first OIS coil 473, contents to be described below may be identically applied to the second OIS magnet 476, the second OIS coil 475, the third OIS magnet 478, and the third OIS coil 477.

In an embodiment, the first OIS magnet 474 may be formed in a form in which the facing surface of the first OIS magnet 474 that faces the first OIS coil 473 has four magnetic poles. The facing surface of the first OIS magnet 474 may be formed such that N poles and S poles are arranged in a direction (e.g., the y-axis direction) parallel to a movement direction of the first OIS magnet 474. For example, the facing surface may include a first area 4741 having a first polarity (e.g., N pole), a second area 4742 having a second polarity (e.g., S pole) different from the first polarity, a third area 4743 having the first polarity, and a fourth area 4744 having the second polarity. The first area 4741 to the fourth area 4744 may be arranged in the y-axis direction. However, the sequence in which the N poles and the S poles are arranged may be changed.

In an embodiment, the first OIS coil 473 may be configured such that each of the first coil 473*a* and the second coil 473*b* is disposed to face an area having the first polarity and an area having the second polarity. For example, the first coil 473*a* and the second coil 473*b* may overlap the facing surface of the first OIS magnet 474 in the x-axis direction. When viewed in the x-axis direction, the first coil 473*a* may be disposed such that one portion overlaps the first area 4741 and another portion overlaps the second area 4742. When viewed in the x-axis direction, the second coil 473*b* may be disposed such that one portion overlaps the third area 4743 and another portion overlaps the fourth area 4744.

In an embodiment, the camera module 400 may include the second sensor 499*b* for sensing the relative positions between the first OIS coil 473 and the first OIS magnet 474. For example, the second sensor 499*b* may include a Hall sensor configured to sense a magnetic field. The second sensor 499*b* may be disposed between the first coil 473*a* and the second coil 473*b* to face the facing surface of the first OIS magnet 474. The second sensor 499*b* may be disposed to partially overlap an area having the first polarity and an area having the second polarity. For example, when viewed in the x-axis direction, the second sensor 499b may overlap the second area 4742 and the third area 4743. However, the position of the second sensor 499b is not limited to the illustrated embodiment. According to various embodiments, the second sensor 499b may be located inside the first coil 473a to overlap the first area 4741 and the second area 4742, or may be located inside the second coil 473b to overlap the third area 4743 and the fourth area 4744.

Hereinafter, an arrangement of the OIS magnets 474, 476, and 478 having three magnetic poles and the OIS coils 473, 475, and 477 will be described with reference to FIG. 24B. Although the following description is given based on the first OIS magnet 474 and the first OIS coil 473, contents to be described below may be identically applied to the second OIS magnet 476, the second OIS coil 475, the third OIS magnet 478, and the third OIS coil 477. For example, with an increase in a correction angle (e.g., about 3° or more) for correcting a shake caused by large hand shaking, a stroke of lens shift for an image stabilization function may be lengthened, and a driving force may be decreased by a damping structure for reducing high-frequency shake and vibration. Accordingly, the camera module 400 may employ a magnet having three or more magnetic poles to secure a driving force required for lens shift and smoothly perform signal processing for a movement distance.

In an embodiment, the first OIS magnet 474 may be formed in a form in which the facing surface of the first OIS magnet 474 that faces the first OIS coil 473 has three magnetic poles. For example, the facing surface may include a first area 4741 having a first polarity (e.g., N pole), a second area 4742 having a second polarity (e.g., S pole) different from the first polarity, and a third area 4743 having the first polarity. In an embodiment, the second sensor 499b may be disposed in an area overlapping the first area 4741 and the second area 4742 and may detect a signal depending on a movement of the first OIS magnet 474 in the y-axis direction. For example, a signal detected by the second sensor 499b may be the magnetic flux density of the first OIS magnet 474, and as the first OIS magnet 474 moves in the y-axis direction relative to the second sensor 499b, the magnetic flux density detected by the second sensor 499b may vary. The camera module 400 may determine position information or movement information of the guide member 440, on which the first OIS magnet 474 (or, the first OIS magnet 474) is disposed, in the y-axis direction using the magnetic flux density detected by the second sensor 499b. However, a detection signal detected by the second sensor 499b is not limited to the magnetic flux density.

In an embodiment, the second sensor 499b may sense the relative positions between the first OIS coil 473 and the first OIS magnet 474, based on a sensed signal. For example, the second sensor 499b may detect the position of the first OIS magnet 474 in the y-axis direction, based on a third signal corrected using a first signal sensed from an area corresponding to the first area 4741 and a second signal sensed from an area corresponding to the second area 4742. For example, the third signal may be determined by dividing the sum of the first signal and the second signal by the difference between the first signal and the second signal as in Equation 1. Contents related to Equation 1 below may be identically applied to the third sensor 499c and the third OIS magnet 478.

$$\text{Third Signal} = \frac{\text{First Signal} + \text{Second Signal}}{\text{First Signal} - \text{Second Signal}} \quad [\text{Equation 1}]$$

According to various embodiments (not illustrated), a plurality of second sensors 499b may be disposed. For example, the second sensors 499b may include sensor 2-1 located inside the first coil 473a and sensor 2-2 located inside the second coil 473b. The camera module 400 may detect the relative positions between the first OIS coil 473 and the first OIS magnet 474, based on signals sensed from the plurality of second sensors 499b (e.g., sensor 2-1 and sensor 2-2).

According to various embodiments, the camera module 400 may further include a fourth sensor (not illustrated) that senses a change in position between the second OIS magnet 476 and the second OIS coil 475. For example, based on a signal (e.g., the magnetic flux density of the third OIS magnet 478) sensed by the third sensor 499c and a signal (e.g., the magnetic flux density of the second OIS magnet 476) sensed by the fourth sensor, the camera module 400 may more accurately detect movement information or position information of the first carrier (e.g., the first carrier 430 of FIGS. 8 to 11), on which the second OIS magnet 476 and the third OIS magnet 478 are disposed, in the x-axis direction.

In an embodiment, the first coil 473a and the second coil 473b may overlap the facing surface of the first OIS magnet 474 in the x-axis direction. When viewed in the x-axis direction, the first coil 473a may be disposed such that one portion overlaps the first area 4741 and another portion overlaps the second area 4742. When viewed in the x-axis direction, the second coil 473b may be disposed such that one portion overlaps the second area 4742 and another portion overlaps the third area 4743.

In an embodiment, the second sensor 499b may be disposed inside the first coil 473a or the second coil 473b to face the facing surface of the first OIS magnet 474. For example, when viewed in the x-axis direction, the second sensor 499b may be located inside the first coil 473a to overlap the first area 4741 and the second area 4742. However, the position of the second sensor 499b is not limited to the illustrated embodiment. According to various embodiments, the second sensor 499b may be located inside the second coil 473b to overlap the second area 4742 and the third area 4743.

According to embodiments of the disclosure, the OIS magnets 474, 476, and 478 may be formed in a shape extending in a direction (e.g., the x-axis direction or the y-axis direction) substantially perpendicular to the optical axis L, and the OIS coils 473, 475, and 477 may include two or more coils facing the OIS magnets 474, 476, and 478. Accordingly, the camera module 400 may secure an electromagnetic force for increasing an OIS correction angle without an increase in the thickness (e.g., the height in the z-axis direction) of the camera module 400. For example, the camera module 400 according to embodiments of the disclosure may provide an improved OIS function by increasing a correction angle, which is limited to about ±1°, to about ±3°.

An electronic device according to an example embodiment of the disclosure may include: a housing and a camera module comprising a camera, at least part of which is disposed in the housing. The camera module may include a camera housing, a sensor assembly including an image sensor fixed to the camera housing, and a lens unit including at least one lens, at least part of which is accommodated in a space formed by the camera housing and the sensor assembly, the lens unit being configured to move at least in part relative to the camera housing and the sensor assembly. The lens unit may include a lens assembly including a lens, a first carrier to which the lens assembly is coupled, a second carrier in which the first carrier is accommodated to be movable in a direction perpendicular to an optical axis of the lens, a stopper coupled to the second carrier to cover at least part of the first carrier, and a first damper (the term "damping member" may be used interchangeably with the term "damper" and may include a vibration or shock absorbing material), at least part of which is disposed between the stopper and the first carrier.

In various example embodiments, the second carrier may be disposed in the camera housing to be movable in a direction of the optical axis relative to the camera housing, and the first carrier and the lens assembly may be configured to move together with the second carrier in the direction of the optical axis.

In various example embodiments, the first carrier may be configured to move relative to the second carrier and the camera housing in a direction of a first shift axis perpendicular to the optical axis or a direction of a second shift axis perpendicular to the optical axis and the first shift axis, and the lens assembly may be configured to move together with the first carrier in the direction of the first shift axis or the direction of the second shift axis.

In various example embodiments, the first carrier may include, on one surface facing the stopper, a first receiving portion in which the first damper is accommodated.

In various example embodiments, the first damper may comprise a cured liquid material disposed in the first receiving portion, the liquid material having a specified viscosity before curing.

In various example embodiments, the stopper may include a first protrusion, at least part of the first protrusion being disposed inside the first damper, and the first protrusion may extend from at least part of the stopper toward the first receiving portion.

In various example embodiments, the stopper may further include a base portion having an opening surrounding the lens assembly, and the first protrusion may extend from an inner periphery of the base portion surrounding the opening.

In various example embodiments, the stopper may include a first surface facing the first carrier and a second surface facing away from the first surface, and at least a partial area of the first surface may be brought into contact with the first damper.

In various example embodiments, the stopper may include, in a partial area thereof, a hole overlapping the first damper in a direction of the optical axis. The first damper may make contact with a partial area of the first surface adjacent to the hole, and at least part of the first damper may be accommodated in the hole.

In various example embodiments, the camera housing may include a frame surrounding the lens unit in a lateral direction and a cover coupled to the frame and covering part of the lens unit, and the second carrier of the lens unit may be disposed inside the frame to be movable in a direction of the optical axis.

In various example embodiments, the camera module may further include a second damper disposed between the frame and the stopper.

In various example embodiments, the frame may include a plurality of sidewalls facing directions perpendicular to the optical axis and surrounding the lens unit, and at least a part of the plurality of sidewalls may include a second receiving portion in which the second damping member is accommodated.

In various example embodiments, the stopper may include a base portion having an opening surrounding the lens assembly and an extending portion extending from the base portion in the direction of the optical axis, and the second damper may make contact with the extending portion.

In various example embodiments, the first carrier may include a second protrusion, at least part of the second protrusion being disposed inside the second damper, and the second protrusion may extend from an edge of the first carrier toward the second damper through at least part of the extending portion of the stopper.

In various example embodiments, the camera module may further include: a driving member configured to move all or part of the lens unit, and the driving member may include an auto focus (AF) coil and an AF magnet configured to move the second carrier in the direction of the optical axis relative to the frame, and an optical image stabilization (OIS) coil and an OIS magnet configured to move the first carrier in a direction perpendicular to the optical axis relative to the frame and the second carrier.

In various example embodiments, the AF coil may be disposed on a first sidewall of the frame, the AF magnet may be disposed on the second carrier to face the AF coil, the camera module may further include a third damper disposed on the first sidewall of the frame to make contact with the AF magnet, and at least part of the third damper may be accommodated inside the AF coil.

In various example embodiments, the lens unit may further include a guide disposed between the first carrier and the second carrier, the guide may be disposed on the second carrier to be movable in the direction of the first shift axis, and the first carrier may be disposed on the guide to be movable in the direction of the second shift axis and may be configured to move together with the guide in the direction of the first shift axis relative to the second carrier.

In various example embodiments, the lens unit may further include a first guide ball disposed between the first carrier and the guide configured to guide a movement of the first carrier relative to the guide and a second guide ball disposed between the guide and the second carrier configured to guide a movement of the guide relative to the second carrier. The first carrier and the guide may include a first receiving recess in which the first guide ball is accommodated to be rotatable, and the guide and the second carrier may include a second receiving recess in which the second guide ball is accommodated to be rotatable.

In various example embodiments, the first damper may contain a material having a viscosity not less than 75000 mPa*s and nor more than 95000 mPa*s.

A camera module according to an example embodiment of the disclosure may include: a fixed structure including a camera housing and an image sensor fixed to the camera housing, a lens unit including at least one lens, at least part of which is accommodated in the camera housing, the lens unit configured to move all or part of the lens unit relative to the fixed structure, and a driving member configured to move all or part of the lens unit, the driving member including a plurality of coils disposed on the camera housing and a plurality of magnets disposed on the lens unit. The lens unit may include a lens assembly including a lens, an auto focus (AF) carrier disposed in the camera housing to be movable in a direction of an optical axis of the lens, and an optical image stabilization (OIS) carrier to which the lens assembly is coupled and disposed inside the AF carrier to be movable in a direction perpendicular to the optical axis. The plurality of coils may include an AF coil disposed on a first sidewall of the camera housing and a plurality of OIS coils disposed on a second sidewall, a third sidewall, and a fourth sidewall of the camera housing, respectively. The plurality of magnets may include an AF 472 magnet disposed on the AF carrier facing the AF coil and a plurality of OIS magnets disposed on the OIS carrier facing the plurality of OIS coils, respectively. Each of the plurality of OIS magnets may include a first area in which a facing surface that faces the plurality of OIS coils has a first polarity, a second area having a second polarity different from the first polarity, and a third area having the first polarity. Each of the plurality of OIS coils may include a first coil having one portion facing the first area and another portion facing the second area and a second coil having one portion facing the second area and another portion facing the third area.

In various example embodiments, the OIS carrier may include a guide disposed to be movable relative to the AF carrier in a direction of a first shift axis perpendicular to the optical axis and a first carrier disposed to be movable relative to the guide in a direction of a second shift axis perpendicular to the optical axis and the first shift axis. The plurality of OIS magnets may include a first OIS magnet disposed on the guide and a second OIS magnet and a third OIS magnet disposed on the first carrier. The plurality of OIS coils may include a first OIS coil disposed on the second sidewall facing the first OIS magnet, a second OIS coil disposed on the third sidewall facing the second OIS magnet, and a third OIS coil disposed on the fourth sidewall facing the third OIS magnet. The first carrier and the guide may be configured to move in the direction of the first shift axis relative to the AF carrier by an interaction between the first OIS coil and the first OIS magnet. The first carrier may be configured to move in the direction of the second shift axis relative to the guide by an interaction between the second OIS coil and the second OIS magnet or an interaction between the third OIS coil and the third OIS magnet.

In various example embodiments, the camera module may further include a plurality of sensor modules including at least one sensor configured to sense a change in position between the plurality of OIS coils and the plurality of OIS magnets, and each of the plurality of sensor modules may be disposed to overlap the first area and the second area or overlap the second area and the third area when the facing surface is viewed.

In various example embodiments, each of the plurality of sensor modules may be disposed such that one portion faces the first area and another portion faces the second area. Positions of the plurality of OIS magnets may be detected based on a third signal determined using a first signal sensed from an area corresponding to the first area and a second signal sensed from an area corresponding to the second area. The third signal may be determined by dividing the sum of the first signal and the second signal by the difference between the first signal and the second signal.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will further be understood by those skilled in the art that various changes in form and detail may be made without departing from the true spirit and full scope of the disclosure including the appended claims and their equivalents. It will also be understood that any of the embodiment(s) described herein may be used in conjunction with any other embodiment(s) described herein.

What is claimed is:

1. An electronic device comprising:
a housing and a camera module including a camera, at least part of which is disposed in the housing,
wherein the camera module includes:
a camera housing;
a sensor assembly including an image sensor, the sensor assembly being fixed to the camera housing; and
a lens unit, at least part of which is accommodated in a space formed by the camera housing and the sensor assembly, the lens unit being configured to move at least in part relative to the camera housing and the sensor assembly, and
wherein the lens unit includes:
a lens assembly including a lens;
a first carrier to which the lens assembly is coupled;
a second carrier in which the first carrier is accommodated to be movable in a direction perpendicular to an optical axis of the lens;
a stopper coupled to the second carrier to cover at least part of the first carrier; and
a first damper, at least part of which is disposed between the stopper and the first carrier.

2. The electronic device of claim 1, wherein the second carrier is disposed in the camera housing to be movable in a direction of the optical axis relative to the camera housing, and
wherein the first carrier and the lens assembly are configured to move together with the second carrier in the direction of the optical axis.

3. The electronic device of claim 1, wherein the first carrier is configured to move relative to the second carrier and the camera housing in a direction of a first shift axis perpendicular to the optical axis or a direction of a second shift axis perpendicular to the optical axis and the first shift axis, and
wherein the lens assembly is configured to move together with the first carrier in the direction of the first shift axis or the direction of the second shift axis.

4. The electronic device of claim 1, wherein the first carrier includes, on one surface facing the stopper, a first receiving portion in which the first damper is accommodated.

5. The electronic device of claim 4, wherein the first damper comprises a cured liquid material disposed in the first receiving portion, wherein the liquid material has a specified viscosity and prior to curing.

6. The electronic device of claim 4, wherein the stopper includes a first protrusion, at least part of which is disposed inside the first damper, and
wherein the first protrusion extends from at least part of the stopper toward the first receiving portion.

7. The electronic device of claim 6, wherein the stopper further includes a base portion having an opening surrounding the lens assembly, and
wherein the first protrusion extends from an inner periphery of the base portion to surround the opening.

8. The electronic device of claim 1, wherein the stopper includes a first surface facing the first carrier and a second surface facing away from the first surface, and
wherein at least a partial area of the first surface is brought into contact with the first damper.

9. The electronic device of claim 8, wherein the stopper includes, in a partial area thereof, a hole overlapping the first damper in a direction of the optical axis, and
wherein the first damper contacts a partial area of the first surface adjacent to the hole, and at least part of the first damper is accommodated in the hole.

10. The electronic device of claim 1, wherein the camera housing includes a frame surrounding the lens unit in a lateral direction and a cover coupled to the frame to cover part of the lens unit, and
wherein the second carrier of the lens unit is disposed inside the frame to be movable in a direction of the optical axis.

11. The electronic device of claim 10, wherein the camera module further includes a second damper disposed between the frame and the stopper.

12. The electronic device of claim 11, wherein the frame includes a plurality of sidewalls facing directions perpendicular to the optical axis to surround the lens unit, and
wherein at least a part of the plurality of sidewalls includes a second receiving portion in which the second damper is accommodated.

13. The electronic device of claim 12, wherein the stopper includes a base portion having an opening surrounding the lens assembly and an extending portion extending from the base portion in the direction of the optical axis, and
wherein the second damper contacts the extending portion.

14. The electronic device of claim 13, wherein the first carrier includes a second protrusion, at least part of which is disposed inside the second damper, and
wherein the second protrusion extends from an edge of the first carrier toward the second damper through at least part of the extending portion of the stopper.

15. The electronic device of claim 10, wherein the camera module further includes a driving member configured to move all or part of the lens unit, and
wherein the driving member includes:
an auto focus (AF) coil and an AF magnet configured to move the second carrier in the direction of the optical axis relative to the frame; and
an optical image stabilization (OIS) coil and an OIS magnet configured to move the first carrier in a direction perpendicular to the optical axis relative to the frame and the second carrier.

16. The electronic device of claim 15, wherein the AF coil is disposed on a first sidewall of the frame,
wherein the AF magnet is disposed on the second carrier facing the AF coil,
wherein the camera module further includes a third damper disposed on the first sidewall of the frame contacting the AF magnet, and
wherein at least part of the third damper is accommodated inside the AF coil.

\* \* \* \* \*